United States Patent
Jeong

(10) Patent No.: US 8,965,314 B2
(45) Date of Patent: Feb. 24, 2015

(54) IMAGE DISPLAY DEVICE AND METHOD FOR OPERATING THE SAME PERFORMING NEAR FIELD COMMUNICATION WITH A MOBILE TERMINAL

(75) Inventor: Youngho Jeong, Seoul (KR)

(73) Assignee: LG Electronics Inc., Seoul (KR)

( * ) Notice: Subject to any disclaimer, the term of this patent is extended or adjusted under 35 U.S.C. 154(b) by 278 days.

(21) Appl. No.: 13/559,289

(22) Filed: Jul. 26, 2012

(65) Prior Publication Data
US 2013/0044051 A1 Feb. 21, 2013

(30) Foreign Application Priority Data

Aug. 19, 2011 (KR) .................. 10-2011-0082965

(51) Int. Cl.
*H04B 5/02* (2006.01)
*H04N 21/41* (2011.01)
*H04N 21/442* (2011.01)
*H04N 21/422* (2011.01)
*H04N 21/441* (2011.01)
*H04N 21/485* (2011.01)

(52) U.S. Cl.
CPC ..... *H04N 21/4126* (2013.01); *H04N 21/44218* (2013.01); *H04N 21/42222* (2013.01); *H04N 21/441* (2013.01); *H04N 21/485* (2013.01)
USPC ...................... 455/151.1; 455/352; 455/414.1

(58) Field of Classification Search
CPC ............. H04N 5/00; H04N 7/173; H04B 5/02
USPC ................. 455/41.1, 352, 151.1, 151.2, 414.1
See application file for complete search history.

(56) References Cited

U.S. PATENT DOCUMENTS

| 2005/0159823 A1 | 7/2005 | Hayes et al. | |
| 2010/0081375 A1* | 4/2010 | Rosenblatt et al. | 455/41.1 |
| 2013/0005250 A1* | 1/2013 | Kim et al. | 455/41.1 |

FOREIGN PATENT DOCUMENTS

| EP | 2073183 A1 | 6/2009 | |
| WO | WO 2009/114247 * | 9/2009 | H04N 5/00 |
| WO | WO 2009/114247 A2 | 9/2009 | |

OTHER PUBLICATIONS

Ballagas et al., "The Smart Phone: A Ubiquitous Input Device", IEEE CS and IEEE ComSoc, Jan.-Mar. 2006, pp. 70-77, XP002447195.
Jabbar et al., "Viewer Identification and Authentication in IPTV using RFID Technique", IEEE Transactions on Consumer Electronics, vol. 54, No. 1, Feb. 2008, pp. 105-109, XP011225510.

* cited by examiner

*Primary Examiner* — Blane J Jackson
(74) *Attorney, Agent, or Firm* — Birch, Stewart, Kolasch & Birch, LLP

(57) ABSTRACT

An image display device and a method for operating the same are provided. In the method for operating the image display device which can perform near field communication with a mobile terminal, an image is displayed on a display, device information including motion information or position information of the mobile terminal is received based on the near field communication, and a corresponding menu is displayed on the display or a corresponding operation is performed according to the received motion information or position information. This method can improve user convenience when the image display device is used.

19 Claims, 64 Drawing Sheets

(a)　　　　　　　　(b)　　　　　　　　(c)

IMAGE DISPLAY DEVICE AND METHOD FOR OPERATING THE SAME PERFORMING NEAR FIELD COMMUNICATION WITH A MOBILE TERMINAL

CROSS-REFERENCE TO RELATED APPLICATION

This application claims the benefit of Korean Application No. 10-2011-0082965, filed on Aug. 19, 2011 in the Korean Intellectual Property Office, the disclosure of which is incorporated herein by reference.

BACKGROUND OF THE INVENTION

1. Field of the Invention

The present invention relates to an image display device and a method for operating the same, and more particularly to an image display device and a method for operating the same which can improve user convenience when using the image display device.

2. Description of the Related Art

An image display device is an apparatus having a function to display an image that can be viewed by the user. The user can view broadcasts through the image display device. The image display device displays a broadcast that the user has selected from among broadcasts transmitted by a broadcast station. Currently, broadcasting is transitioning from analog broadcasting to digital broadcasting throughout the world.

Digital broadcasting transmits digital video and audio signals. Compared to analog broadcasting, digital broadcasting is more robust to external noise, resulting in less data loss, and is also advantageous in terms of error correction while providing clear high-resolution images or screens. Digital broadcasting can also provide bi-directional services, unlike analog broadcasting.

SUMMARY OF THE INVENTION

Therefore, the present invention has been made in view of the above problems, and it is an object of the present invention to provide an image display device and a method for operating the same which can improve user convenience when using the image display device.

It is another object of the present invention to provide an image display device and a method for operating the same which can improve user convenience based on motion information or position information from a mobile terminal.

In accordance with an aspect of the present invention, the above and other objects can be accomplished by the provision of a method for operating an image display device which can perform near field communication with a mobile terminal, the method including displaying an image on a display, receiving device information including motion information or position information of the mobile terminal based on the near field communication, and displaying a corresponding menu on the display or performing a corresponding operation according to the received motion information or position information.

In accordance with another aspect of the present invention, there is provided a method for operating an image display device, the method including starting data communication with a mobile terminal, displaying an image on a display, receiving device information including motion information or position information of the mobile terminal, and displaying a corresponding menu on the display or performing a corresponding operation according to the received motion information or position information.

In accordance with another aspect of the present invention, there is provided an image display device including a display, an interface unit for receiving device information including motion information or position information of a mobile terminal from the mobile terminal or a remote control device, and a controller for performing a control operation for displaying a corresponding menu on the display or performing a corresponding operation according to the received motion information or position information.

According to an embodiment of the present invention, it is possible to improve user convenience by starting data communication through near field communication with a mobile terminal and then displaying a different menu or performing a different operation according to motion information or position information from the mobile terminal.

Especially, it is possible to provide a menu or the like suitable for user convenience by displaying a different menu or performing a different operation according to an attribute of a displayed screen, in consideration of motion information or position information from the mobile terminal In addition, since it is possible to perform a login operation of an image display device according to continuous motion information or position information from a mobile terminal, it is possible to reliably perform login.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

The present invention will be described in more detail with reference to the attached drawings.

The words "module" or "unit", which are appended to terms describing components, are merely used for ease of explanation of the present invention and have no specific meaning or function with respect to the components. Thus, the words "module" and "unit" may be used interchangeably.

Figure 1A:
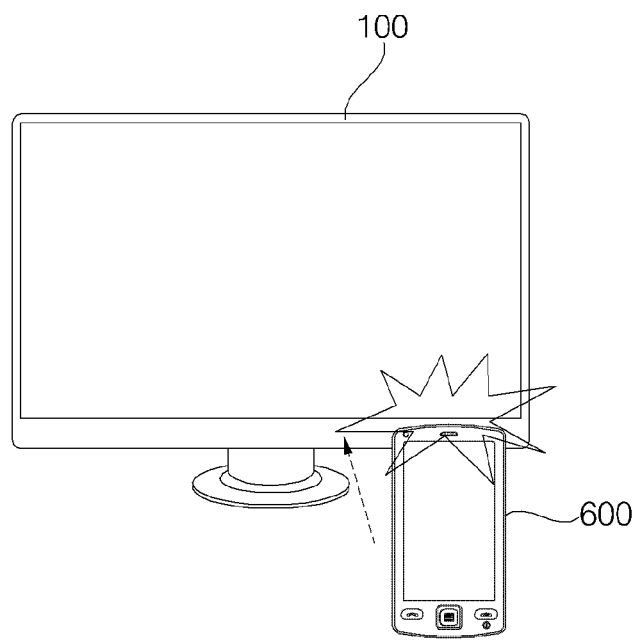
FIGS. 1A and 1B illustrate local area communication between an image display device according to an embodiment of the present invention.
Figure 1B:
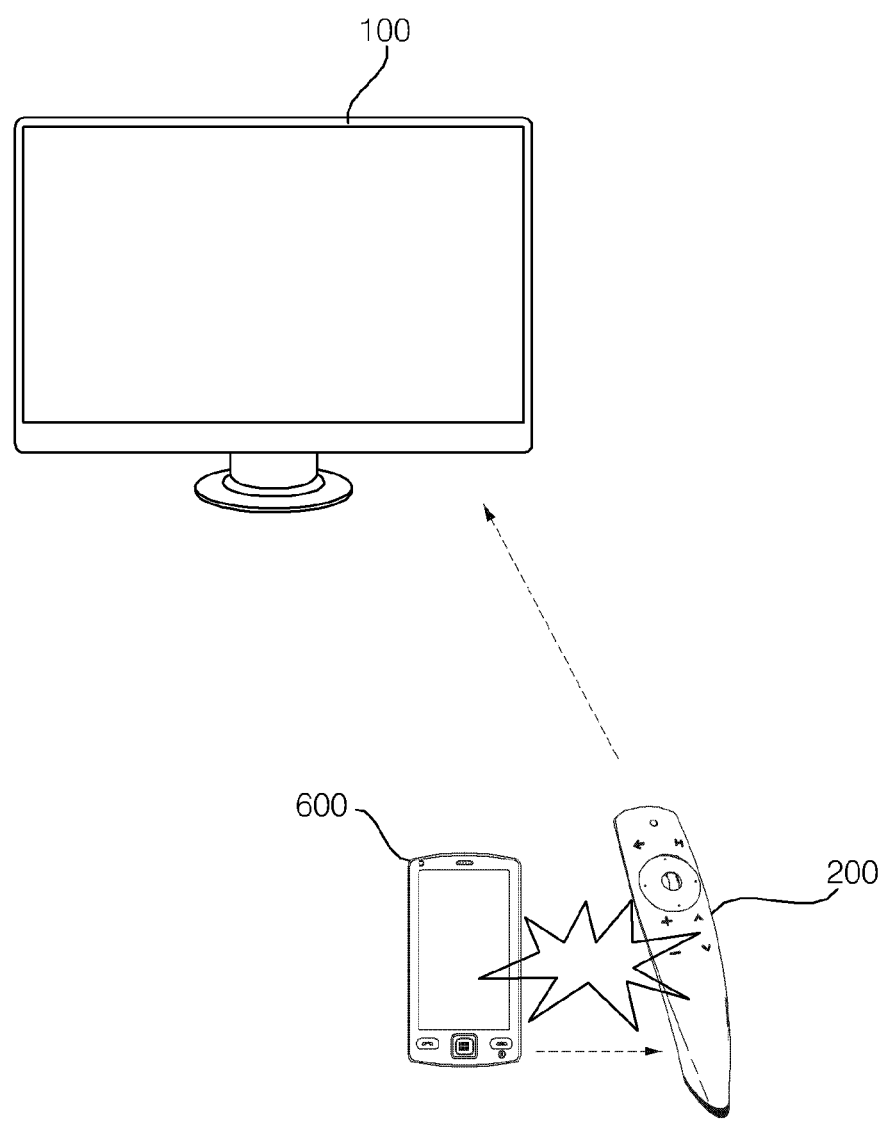

FIGS. 1A and 1B illustrate local area communication between an image display device according to an embodiment of the present invention.

First, as shown in FIG. 1A, the image display device 100 according to an embodiment of the present invention can transmit or receive data to or from a mobile terminal 600 through local area communication. Specifically, the image display device 100 can transmit or receive data using a Near Field Communication (NFC) scheme.

For example, when the mobile terminal 600 has approached the image display device 100 within a predetermined distance, the mobile terminal 600 or the image display device 100 provides a magnetic field in a direction toward the image display device 100 or the mobile terminal 600 and a change in the magnetic field may cause the image display device 100 to start data communication with the mobile terminal 600. Here, the image display device 100 may receive personal information or device information from the mobile terminal 600.

The NFC scheme is a contactless local area wireless communication technology that uses a frequency band of 13.56 MHz and provides compatibility with conventional contactless smartcard technology and Radio Frequency Identification (RFID) technology.

In order to perform local area communication of the NFC scheme, each of the image display device 100 and the mobile terminal 600 according to an embodiment of the present invention includes an NFC module. This NFC module will be described later with reference to FIG. 10.

Although the example of FIG. 1B is similar to the example of FIG. 1A, there is a difference in that near field communication is performed between a remote control device 200 of an image display device 100 and a mobile terminal 600 rather than between the image display device 100 and the mobile terminal 600.

For example, when the mobile terminal 600 has approached the remote control device 200 within a predetermined distance, the mobile terminal 600 or the remote control device 200 provides a magnetic field in a direction toward the remote control device 200 or the mobile terminal 600 and a change in the magnetic field may cause the remote control device 200 to start data communication with the mobile terminal 600. Here, the remote control device 200 may receive personal information or device information from the mobile terminal 600.

In order to perform local area communication of the NFC scheme, each of the remote control device 200 and the mobile terminal 600 according to an embodiment of the present invention includes an NFC module. This NFC module will be described later with reference to FIG. 12.

The remote control device 200 may transmit information received from the mobile terminal 600 to the image display device 100. Here, the remote control device 200 and the image display device 100 may use a communication scheme, different from the NFC scheme, such as an infrared scheme, an RF scheme, or a Wi-Fi scheme.

On the other hand, the image display device 100 according to an embodiment of the present invention may be a TV, a monitor, a laptop, a computer, a tablet PC, or the like which can display a broadcast.

In addition, the mobile terminal 600 associated with the present invention may be a mobile phone, a smartphone, laptop, a tablet PC, or the like.

Figure 2:
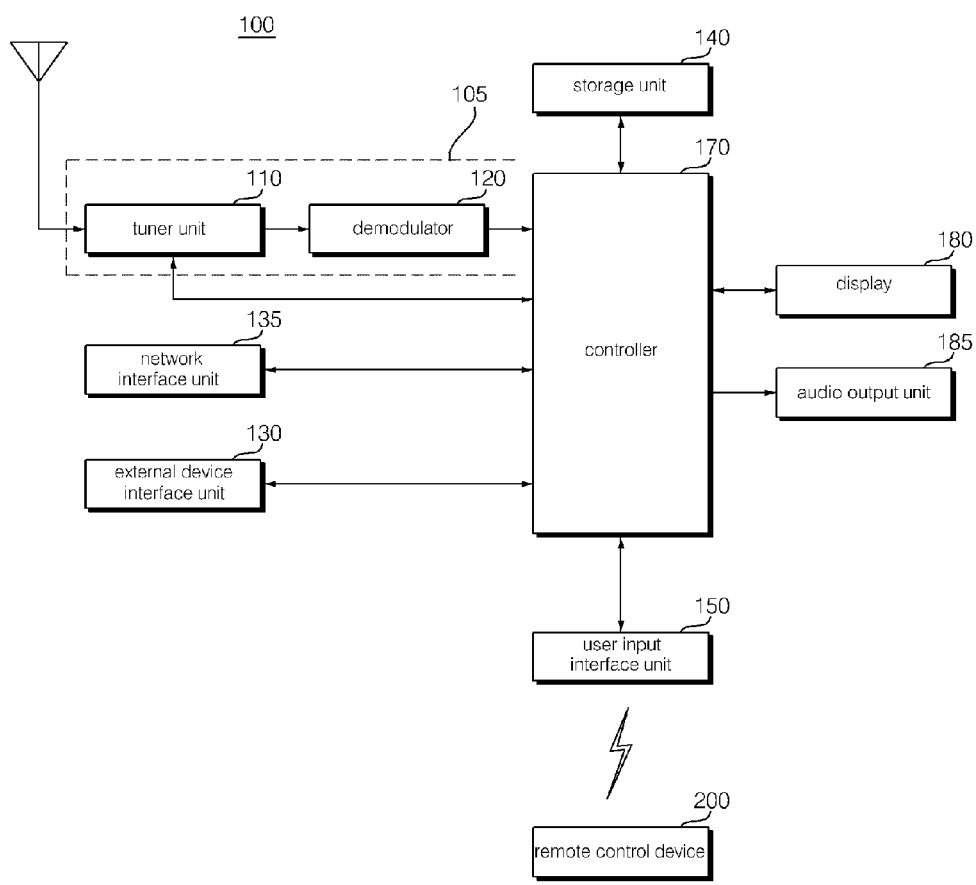
FIG. 2 is a block diagram of an image display device according to an embodiment of the present invention.

FIG. 2 is a block diagram of an image display device according to an embodiment of the present invention.

As shown in FIG. 2, the image display device 100 according to an embodiment of the present invention may include a broadcast receiving unit 105, an external device interface unit 130, a storage unit 140, a user input interface unit 150, a sensor unit (not shown), a controller 170, a display 180, an audio output unit 185, and a remote control device 200.

The broadcast receiving unit 105 may include a tuner unit 110, a demodulator 120, and a network interface unit 135. Of course, the broadcast receiving unit 105 may be designed such that the broadcast receiving unit 105 includes the tuner unit 110 and the demodulator 120 and does not include the network interface unit 135 and may also be designed such that the broadcast receiving unit 105 includes the network interface unit 135 and does not include the tuner unit 110 and the demodulator 120.

The tuner unit 110 selects an RF broadcast signal corresponding to a channel selected by the user or corresponding to all stored channels from among Radio Frequency (RF) broadcast signals received through an antenna. In addition, the tuner unit 110 converts the selected RF broadcast signal into an intermediate frequency signal or a baseband image or audio signal.

For example, the tuner unit 110 converts the selected RF broadcast signal into a digital IF signal (DIF) when the selected RF broadcast signal is a digital broadcast signal and converts the selected RF broadcast signal into an analog baseband image or audio signal (CVBS/SIF) when the selected RF broadcast signal is an analog broadcast signal. That is, the tuner unit 110 may process a digital broadcast signal or an analog broadcast signal. The analog baseband image or audio signal (CVBS/SIF) output from the tuner unit 110 may be directly input to the controller 170.

The tuner unit 110 may receive an RF broadcast signal of a single carrier according to an Advanced Television System Committee (ATSC) scheme or RF broadcast signals of multiple carriers according to a Digital Video Broadcasting (DVB) scheme.

The tuner unit 110 may sequentially select RF broadcast signals of all broadcast channels stored through a channel storage function from among RF broadcast signals received through an antenna and then convert the selected RF broadcast signals into an intermediate frequency signal or a baseband image or audio signal.

The tuner unit 110 may also include a plurality of tuners to receive broadcast signals of a plurality of channels. The tuner unit 110 may also include a single tuner to simultaneously receive broadcast signals of a plurality of channels.

The demodulator 120 receives the digital IF signal (DIF) produced through conversion by the tuner unit 110 and performs a demodulation operation on the digital IF signal.

The demodulator 120 may output a stream signal (TS) after performing demodulation and channel decoding. Here, the stream signal may be a signal in which a video signal, an audio signal, or a data signal are multiplexed.

The stream signal output from the demodulator 120 may be input to the controller 170. The controller 170 outputs video to the display 180 and outputs audio to the audio output unit 185 after performing demultiplexing, image/audio signal processing, and the like.

The external device interface unit 130 may transmit or receive data to or from an external device connected to the external device interface unit 130. To accomplish this, the external device interface unit 130 may include an A/V input/output unit (not shown) or a wireless communication unit (not shown).

The external device interface unit 130 may be connected wirelessly and/or by wire to an external device such as a Digital Versatile Disc (DVD) player, a Blu-ray player, a game console, a camera, a camcorder, a computer (or laptop), or a set-top box and may perform an input/output operation with the external device.

The A/V input/output unit (not shown) may receive video and audio signals from the external device. The wireless communication unit (not shown) may perform local area wireless communication with another electronic device.

The network interface unit 135 provides an interface for connecting the image display device 100 to a wired/wireless network including the Internet. For example, the network interface unit 135 may receive content or data provided by an Internet or content provider or a network operator.

The network interface unit 135 may perform data communication with an electronic device adjacent to the image display device 100. Here, the network interface unit 135 may also receive device information of another electronic device, remote-controllable channel information, frequency information, or code information of another electronic device, or the like.

The storage unit 140 may store programs for all signal processing and control of the controller 170 and may also store signal-processed video, audio, or data signals.

The storage unit 140 may perform a function to temporarily store video, audio, or data signals input to the external device interface unit 130. The storage unit 140 may also store information regarding broadcast channels through a channel storage function such as a channel map function.

Although the storage unit 140 is provided separately from the controller 170 in the embodiment illustrated in FIG. 2, the present invention is not limited to this embodiment. For example, the storage unit 140 may be included in the controller 170.

The user input interface unit 150 may deliver a signal input by the user to the controller 170 or may deliver a signal from the controller 170 to the user.

For example, the user input interface unit 150 may receive a user input signal for power on/off channel selection, screen setting, or the like from the remote control device 200, deliver a user input signal received from a local key (not shown) such as a power key, a channel key, a volume key, or a setting key to the controller 170, deliver a user input signal received from a sensor unit (not shown) that senses user gesture to the controller 170, or transmit a signal from the controller 170 to the sensor unit (not shown).

According to an embodiment of the present invention, the user input interface unit 150 may receive personal information from the remote control device 200. The user input interface unit 150 may receive information of a web server, which is currently connected through personal information, in addition to the personal information.

For example, when the mobile terminal 600 and the remote control device 200 have approached each other within a predetermined distance to perform NFC, the remote control device 200 may receive personal information stored in the mobile terminal 600. The remote control device 200 may transmit personal information to the image display device 100 according to an IR or RF scheme. Here, the user input interface unit 150 delivers the received personal information to the controller 170.

On the other hand, the personal information may include personal ID information, password information, personal email information, or the like of the mobile terminal 600. The personal information may also include personal ID information, password information, personal email information, or the like of the image display device 100. The personal information may be personal ID information or password information that can be commonly used in various electronic devices including the mobile terminal 600. The personal information may also be personal ID information, password information, or the like for a web server that is previously stored in the mobile terminal 600. The personal information may also be personal ID information, password information, or the like for a web server which can be used not only in the mobile terminal 600 but also in the image display device 100. The personal information may also be personal ID information, password information, or the like for a web server connected to the image display device 100.

On the other hand, the user input interface unit 150 may also receive, from the remote control device 200, device information of another electronic device, remote-controllable channel information, frequency information, or code information of another electronic device, or the like transmitted from any electronic device adjacent to the image display device 100.

The controller 170 may demultiplex an input stream through the image display device 100, the demodulator 120, or the external device interface unit 130, process the demultiplexed signals, and generate and output signals for video or audio output.

The video signal which has been image-processed by the controller 170 may be input to the display 180 and an image corresponding to the video signal may then be displayed on the display 180. The video signal which has been image-processed by the controller 170 may also be input to an external output device through the external device interface unit 130.

The audio signal processed by the controller 170 may be audibly output to the audio output unit 185. The audio signal processed by the controller 170 may also be input to an external output device through the external device interface unit 130.

Although not shown in FIG. 2, the controller 170 may include a demultiplexer, an image processor, or the like. This will be described later with reference to FIG. 3.

In addition, the controller 170 may control overall operation of the image display device 100. For example, the controller 170 may control the tuner unit 110 to tune to an RF broadcast corresponding to a stored channel or a channel selected by the user.

The controller 170 may control the image display device 100 by an internal program or a user command received through the user input interface unit 150.

On the other hand, the controller 170 may control the display 180 to display an image. Here, the image displayed on the display 180 may be a still image or a moving image and may also be a 2D image or a 3D image.

The controller 170 may also generate a 3D object corresponding to an object included in an image displayed on the display 180 and display the 3D object on the display 180. For example, the object may be at least one of a connected web screen (associated with newspaper, magazine, or the like), an Electronic Program Guide (EPG), various menus, a widget, an icon, a still image, a moving image, and text.

The controller 170 may also determine the position of the user based on an image captured through a capture unit (not shown). For example, the controller 170 may determine the distance (expressed in z-axis coordinate) between the user and the image display device 100. The controller 170 may also determine x-axis and y-axis coordinates of a position on the display 180 corresponding to the position of the user.

According to an embodiment of the present invention, the controller 170 may perform a control operation for displaying a corresponding menu on the display 180 or performing a corresponding operation based on received motion information or position information of the mobile terminal 600.

For example, the controller 170 may perform a control operation for displaying a first menu on the display 180 upon receiving rotation information of a first angle from the mobile terminal 600 and may perform a control operation for displaying a second menu on the display 180 upon receiving rotation information of a second angle from the mobile terminal 600.

The controller 170 may perform a control operation for displaying a different menu or performing a different operation depending on the characteristics of a screen displayed on the display 180.

For example, the controller 170 may perform a control operation for displaying broadcast program information on the display 180 upon receiving rotation information of the first angle from the mobile terminal 600 while a broadcast image is being displayed on the display 180 and may perform a control operation for displaying a previous Internet screen (or webpage) on the display 180 upon receiving rotation information of the first angle from the mobile terminal 600 while an Internet screen is being displayed on the display 180.

The controller 170 may also perform a control operation for performing login based on received motion information or position information of the mobile terminal 600. Specifically, when continuous motion information or position information has been received from the mobile terminal 600, the controller 170 may perform a control operation for performing login to the image display device 100, login to a server connected to the image display device 100, or login to a web server subscribed to by personal information of the user of the mobile terminal if a continuous operation corresponding to the continuous motion information or position information matches a preset operation.

In addition, although not shown, the image display device 100 may further include a channel browsing processor that generates a thumbnail image corresponding to a channel signal or an external input signal. The channel browsing processor may receive a stream signal (TS) output from the demodulator 120 or a stream signal output from the external device interface unit 130 and extract an image from the received stream signal to generate a thumbnail image. The generated thumbnail image may be stream-decoded together with a decoded image or the like and the decoded thumbnail image may then be input to the controller 170. Using the input thumbnail image, the controller 170 may display a thumbnail list including a plurality of thumbnail images on the display 180.

The thumbnail list may be displayed in a simple view scheme such that the thumbnail list is displayed on a partial area on the display 180 while an image is being displayed on the display 180 or may be displayed a full view scheme such that the thumbnail list is displayed on a most area of the display 180. Thumbnail images of the thumbnail list may be sequentially updated.

The display 180 converts an image signal, a data signal, an OSD signal, or a control signal processed by the controller 170 or an image signal, a data signal, or a control signal received from the external device interface unit 130 to generate a drive signal.

The display 180 may be a PDP, an LCD, an OLED, a flexible display, or the like and may also be a 3D display.

The display 180 may also be constructed of a touchscreen to be used not only as an output device but also as an input device.

The audio output unit 185 receives an audio-processed signal from the controller 170 and audibly outputs the audio-processed signal.

The capture unit (not shown) captures an image of the user. Although the capture unit (not shown) may be implemented using a single camera, the present invention is not limited thereto and the capture unit (not shown) may also be implemented using a plurality of cameras. The capture unit (not shown) may be embedded in the image display device 100 above the display 180 and may also be separately arranged. Information of an image captured by the capture unit (not shown) may be input to the controller 170.

The controller 170 may detect user gesture based on an image captured by the capture unit (not shown), a sensed signal from the sensor unit (not shown), or a combination of the captured image and the sensed signal.

The remote control device 200 transmits a user input to the user input interface unit 150. To accomplish this, the remote control device 200 uses Bluetooth, Radio Frequency (RF) communication, Infrared (IR) communication, Ultra Wideband (UWB), ZigBee, NFC, or the like.

The remote control device 200 may receive a video, audio, or data signal output from the user input interface unit 150. The remote control device 200 may display an image or output sound based on the received video, audio, or data signal.

The remote control device 200 according to an embodiment of the present invention may receive motion information or position information of the mobile terminal 600 through near field communication or the like with the mobile terminal 600. The motion information or position information of the mobile terminal 600 may be information of rotation parallel to the surface of the mobile terminal 600 or information of rotation parallel to the image display device 100.

The remote control device 200 may transmit the received motion information or position information to the image display device 100. Here, the remote control device 200 may use an IR or RF scheme as a communication scheme.

The embodiments of the present invention are described mainly with reference to the case in which the remote control device 200 is a pointing device that can display a pointer corresponding to motion of the user. That is, the remote control device 200 may transmit personal information or the like to the image display device 100 using an RF scheme.

On the other hand, the image display device 100 described above may be a digital broadcast receiver that can receive a stationary or mobile digital broadcast.

The block diagram of FIG. 2 illustrating the configuration of the image display device 100 serves only to explain an embodiment of the present invention. The image display device 100 may also be configured such that some components of the image display device 100 are integrated or omitted or the image display device 100 includes additional components depending on the specifications of the image display device 100 which is actually implemented. For example, two or more components of the image display device 100 may be combined into a single component or a single component thereof may be separated into two more components as needed. The functions of the components of the image display device 100 are set forth herein only to explain the embodiments of the present invention and the specific operations and configurations of the components should not be construed as limiting the scope of the present invention.

Unlike that shown in FIG. 2, the image display device 100 may not include the tuner unit 110 and the demodulator 120 shown in FIG. 2 and may receive and reproduce video content through the network interface unit 135 or the external device interface unit 130.

Figure 3:
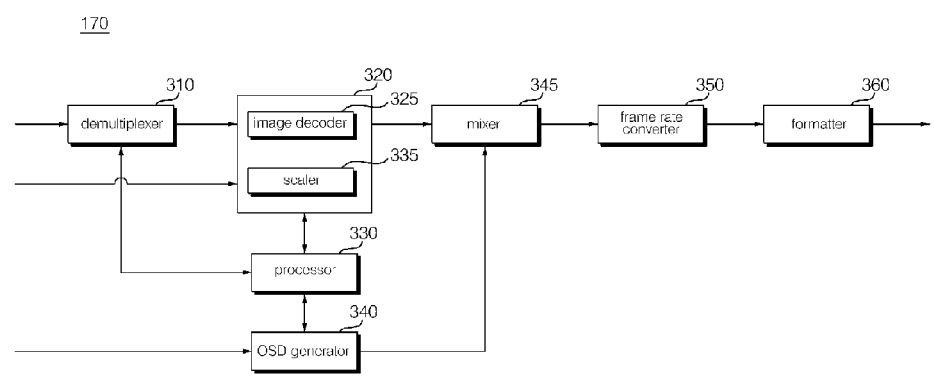
FIG. 3 is an internal block diagram of the controller of FIG. 2.

FIG. 3 is an internal block diagram of the controller of FIG. 2.

As shown in FIG. 3, the controller 170 according to an embodiment of the present invention may include a demultiplexer 310, an image processing unit 320, a processor 330, an OSD generator 340, a mixer 345, a Frame Rate Converter (FRC) 350, and a formatter 360. The controller 170 may further include an audio processor (not shown) and a data processor (not shown).

The demultiplexer 310 demultiplexes an input stream. For example, when an MPEG-2 TS is input to the demultiplexer 310, the demultiplexer 310 demultiplexes the MPEG-2 TS into image, audio, and data signals. Here, the stream signal input to the demultiplexer 310 may be a stream signal output from the tuner unit 110, the demodulator 120, or the external device interface unit 130.

The image processing unit 320 may perform image processing on the demultiplexed image. To accomplish this, the image processing unit 320 may include an image decoder 325 and a scaler 335.

The image decoder 325 decodes the demultiplexed image signal and the scaler 335 scales the resolution of the decoded image signal to allow the display 180 to output the decoded image signal.

The image decoder 325 may include decoders of various standards.

The processor 330 may control overall operation of the components of the image display device 100 or the components of the controller 170. For example, the processor 330 may control the tuner unit 110 to tune to an RF broadcast corresponding to a channel selected by the user or a stored channel.

The processor 330 may control the image display device 100 according to a user command input through the user input interface unit 150 or according to an internal program.

The processor 330 may perform data transmission control with the network interface unit 135 or the external device interface unit 130.

The processor 330 may control operations of the demultiplexer 310, the image processing unit 320, and the OSD generator 340 in the controller 170.

The OSD generator 340 generates an OSD signal according to user input or by itself. For example, the OSD generator 340 may generate a signal for displaying various information in a graphic or text form on the screen of the display 180. The generated OSD signal may include various data such as a user interface screen, various menu screens, widgets, and icons of the image display device 100. The generated OSD signal may also include a 2D object or a 3D object.

The OSD generator 340 may generate a pointer that can be displayed on the display 180 based on a pointing signal received from the remote control device 200. Specifically, the pointer may be generated by a pointing signal processor (not shown) which may be included in the OSD generator 340. Of course, the pointing signal processor (not shown) may not be provided in the OSD generator 340 and may be provided separately.

In association with an embodiment of the present invention, when login has been performed into the image display device 100, the OSD generator 340 may generate or configure a preset personal screen. When login has been performed to a connected server, the OSD generator 340 may generate or configure at least a part of a server connection screen received from the server to allow the server connection screen to be displayed on the display 180. In addition, based on information regarding a web server that has been connected by personal information, the OSD generator 340 may generate or configure at least a part of a corresponding web server connection screen.

The mixer 345 may mix the OSD signal generated by the OSD generator 340 and the decoded image signal produced through image processing by the image processing unit 320. Here, each of the OSD signal and the decoded image signal may include at least one of a 2D signal and a 3D signal. The mixed image signal is provided to the frame rate converter (FRC) 350.

The frame rate converter 350 may convert the frame rate of an input image. The frame rate converter 350 may also directly output the input image without frame rate conversion.

The formatter 360 may receive and output the signals (i.e., the OSD signal and the decoded image signal) mixed by the mixer 345 after changing the format of the signals so as to be suitable for the display 180. For example, the formatter 360 may output R, G, and B data signals which may be output through Low Voltage Differential Signaling (LVDS) or mini-LVDS.

The formatter 360 may separate input signals into a 2D image signal and a 3D image signal for 3D display. The formatter 360 may also change the format of the 3d image signal or may convert a 2D image signal into a 3D image signal.

The audio processor (not shown) in the controller 170 may perform audio processing on the demultiplexed audio signal. To accomplish this, the audio processor (not shown) may include various decoders.

The audio processor (not shown) in the controller 170 may perform bass, treble, or volume control.

The data processor (not shown) in the controller 170 may perform data processing on the demultiplexed data signal. For example, the data processor (not shown) may decode the demultiplexed data signal when the demultiplexed data signal is an encoded data signal. The encoded data signal may be Electronic Program Guide (EPG) information that includes start time, end time, and the like of a broadcast program that is broadcast through each channel.

Although FIG. 3 shows an example in which the OSD generator 340 mixes signals from the OSD generator 340 and the image processing unit 320 and the formatter 360 then performs 3D processing or the like on the mixed signals, the present invention is not limited to this example and the mixer 345 may be located next to the formatter 360.

The block diagram of FIG. 3 illustrating the configuration of the controller 170 serves only to explain the embodiment of the present invention. The controller 170 may also be configured such that some components of the controller 170 are integrated or omitted or the controller 170 includes additional components depending on the specifications of the controller 170 which is actually implemented.

Specifically, the frame rate converter 350 and the formatter 360 may not be provided in the controller 170 and may be provided separately.

Figure 4:
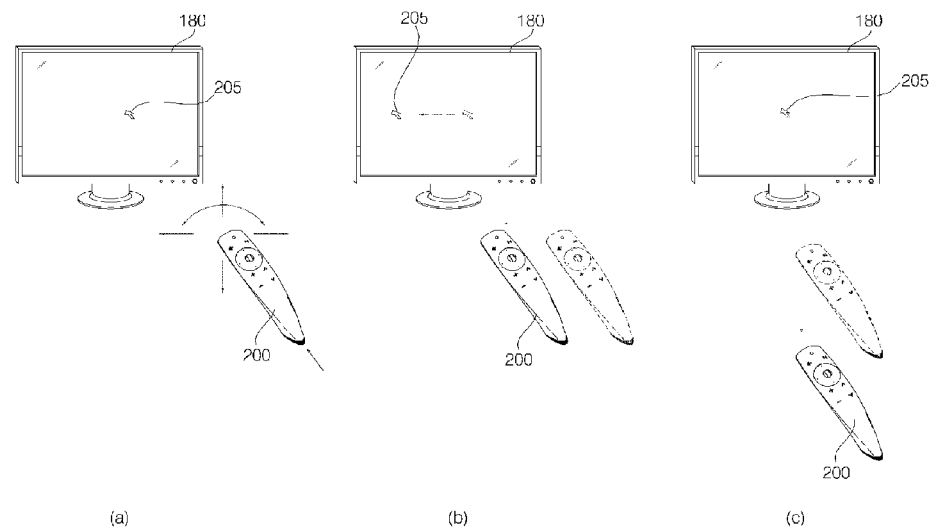
FIG. 4 illustrates a method for controlling the remote control device of FIG. 2.

FIG. 4 illustrates a method for controlling the remote control device of FIG. 2.

FIG. 4(a) illustrates an example in which a pointer 205 corresponding to the remote control device 200 is displayed on the display 180.

The user may move or rotate the remote control device 200 up and down (i.e., vertically), left and right (as shown in FIG. 4(b)), or forward and backward (as shown in FIG. 4(c)). The pointer 205 displayed on the display 180 of the image display device corresponds to movement of the remote control device

200. Since the pointer 205 is displayed on the display 180 such that the pointer 205 moves according to 3D movement of the remote control device 200 as shown in FIG. 4, the remote control device 200 may be referred to as a pointing device.

FIG. 4(b) illustrates an example in which, when the user moves the remote control device 200 to the left, the pointer 205 displayed on the display 180 of the image display device moves to the left according to movement of the remote control device 200.

Information regarding movement of the remote control device 200 detected by the sensor of the remote control device 200 is transmitted to the image display device. The image display device may calculate coordinates of the pointer 205 from the information regarding movement of the remote control device 200. The image display device may display the pointer 205 according to the calculated coordinates.

FIG. 4(c) illustrates an example in which the user moves the remote control device 200 away from the display 180 while pressing a specific button on the remote control device 200.

This allows a selection region on the display 180 corresponding to the pointer 205 to be zoomed in and magnified. On the contrary, when the user moves the remote control device 200 nearer to the display 180 while pressing a specific button on the remote control device 200, a selection region on the display 180 corresponding to the pointer 205 is zoomed out and demagnified. On the contrary, the selection region may be zoomed out when the remote control device 200 moves away from the display 180 and may be zoomed in when the remote control device 200 moves nearer to the display 180.

Detection of up-and-down movement and left-and-right movement of the remote control device 200 may be disabled when the specific button on the remote control device 200 is being pressed. That is, up, down, left and right movement of the remote control device 200 may not be detected and only forward-and-backward movement thereof may be detected when the remote control device 200 is moving away from or nearer to the display 180. When the specific button on the remote control device 200 is not being pressed, only the pointer 205 moves according to up, down, left, and right movement of the remote control device 200.

The moving speed or direction of the pointer 205 may correspond to a moving speed or direction of the remote control device 200.

Figure 5:
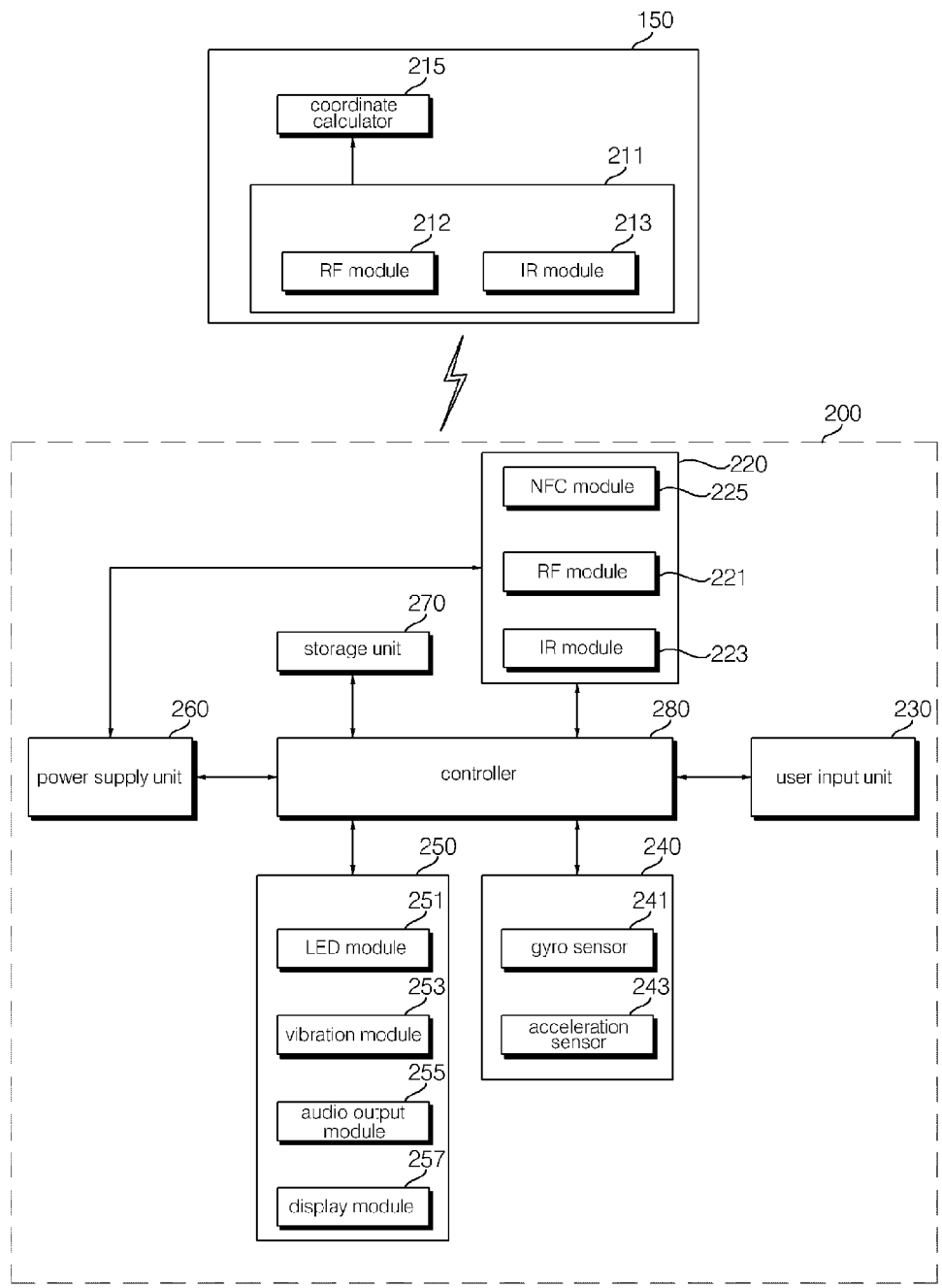
FIG. 5 is an internal block diagram of a remote control device 200 of FIG. 2.

FIG. 5 is an internal block diagram of the remote control device 200 of FIG. 2.

As shown in FIG. 5, the remote control device 200 may include a wireless communication unit 220, a user input unit 230, a sensor unit 240, an output unit 250, a power supply unit 260, a storage unit 270, and a controller 280.

The wireless communication unit 220 transmits and receives a signal to and from one of the image display devices according to the embodiments of the present invention described above. The following description is given with reference to one image display device 100 from among the image display devices according to the above embodiments of the present invention as an example.

In this embodiment, the remote control device 200 may include an RF module 221 that can transmit and receive a signal to and from the image display device 100 according to an RF communication standard. The remote control device 200 may include an IR module 223 that can transmit and receive a signal to and from the image display device 100 according to an IR communication standard.

The remote control device 200 may include an NFC module 225 for near field communication with an electronic device.

The remote control device 200 may transmit information regarding movement or the like of the remote control device 200 to the image display device 100 through the RF module 221.

The remote control device 200 may receive a signal transmitted by the image display device 100 through the RF module 221. The remote control device 200 may transmit a command regarding power on/off, channel change, volume change, or the like to the image display device 100 through the IR module 223 as needed.

According to this embodiment, the remote control device 200 may receive motion information or position information of the mobile terminal 600 through near field communication or the like with the mobile terminal 600.

The remote control device 200 may transmit the received motion information or position information of the mobile terminal 600 to the image display device 100. Here, an IR scheme or an RF scheme may be used as a communication scheme.

The user input unit 230 may include a keypad, a button, a touchpad, a touchscreen, or the like. The user may manipulate the user input unit 230 to input a command associated with the image display device 100 to the remote control device 200. When the user input unit 230 includes a hard key button, the user may input a command associated with the image display device 100 to the remote control device 200 by pushing the hard key button. When the user input unit 230 includes a touchscreen, the user may input a command associated with the image display device 100 to the remote control device 200 by touching a soft key on the touchscreen. The user input unit 230 may include various types of input means such as a scroll key or a jog key which can be manipulated by the user without limiting the scope of the present invention.

The sensor unit 240 may include a gyro sensor 241 and an acceleration sensor 243. The gyro sensor 241 may sense information associated with motion of the remote control device 200.

For example, the gyro sensor 241 may sense information associated with operation of the remote control device 200 with respect to the x, y, and z axes. The acceleration sensor 243 may sense information associated with movement speed or the like of the remote control device 200. The remote control device 200 may further include a distance sensor which can sense the distance between the remote control device 200 and the display 180.

The output unit 250 may output an image or audio signal corresponding to manipulation of the user input unit 230 or corresponding to a signal transmitted by the image display device 100. Through the output unit 250, the user can determine whether or not the user input unit 230 is being manipulated or whether or not the image display device 100 is being controlled.

For example, the output unit 250 may include an LED module 251 which is lit when the user input unit 230 has been manipulated or when a signal has been transmitted or received to or from the image display device 100 through the wireless communication unit 220, a vibration module which vibrates in the same case, an audio output module 255 which outputs sound in the same case, or a display module 257 which displays an image in the same case.

The power supply unit 260 supplies power to the remote control device 200. When the remote control device 200 does not move for a predetermined time, the power supply unit 260 may stop supplying power to reduce power waste. The power supply unit 260 may resume power supply when a specific key provided on the remote control device 200 has been manipulated.

The storage unit 270 may store various types of programs, application data, or the like required to control or operate the remote control device 200. In the case in which the remote control device 200 transmits and receives a signal to and from the image display device 100 wirelessly through the RF module 221, the remote control device 200 and the image display device 100 transmit and receive a signal through a predetermined frequency band. The controller 280 of the remote control device 200 may store and read information regarding the frequency band, which allows the remote control device 200 to wirelessly transmit and receive a signal to and from the image display device 100 that is paired with the remote control device 200, in and from the storage unit 270.

The controller 280 controls operations associated with control of the remote control device 200. The controller 280 may transmit a signal corresponding to manipulation of a specific key of the user input unit 230 or a signal corresponding to motion of the remote control device 200 sensed by the sensor unit 240 to the image display device 100 through the wireless communication unit 225.

The controller 280 may perform a control operation for transmitting motion information or position information of the mobile terminal, which has been received through near field communication with an electronic device, to the image display device 100 through the wireless communication unit 220. Specifically, when a specific key on the user input unit 230 has been input, the controller 280 may perform a control operation for transmitting the received motion information or position information of the mobile terminal to the image display device 100 through the wireless communication unit 220.

Figure 6:
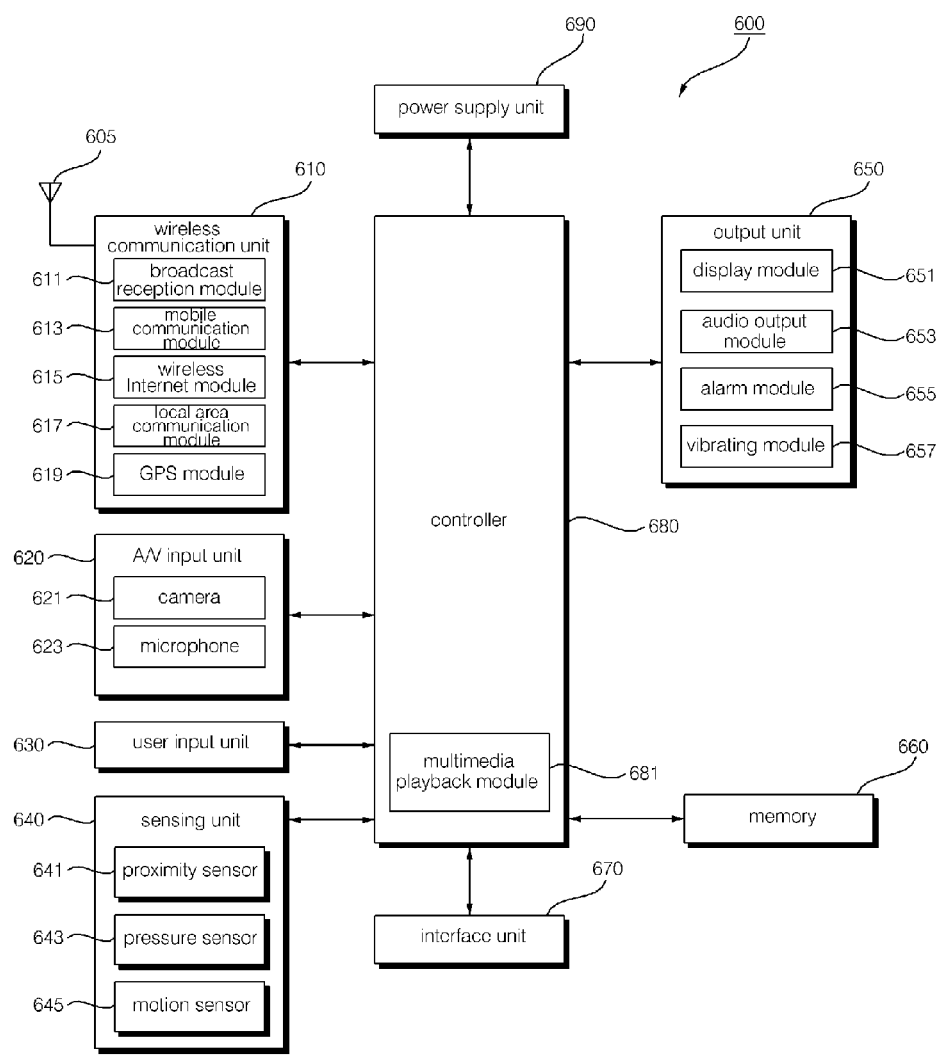
FIG. 6 is an internal block diagram of a mobile terminal associated with the present invention.

FIG. 6 is an internal block diagram of a mobile terminal associated with the present invention.

As shown in FIG. 6, the mobile terminal 600 may include a wireless communication unit 610, an Audio/Video (AV) input unit 620, a user input unit 630, a sensing unit 640, an output unit 650, a memory 660, an interface unit 670, a controller 680, and a power supply unit 690.

The wireless communication unit 610 may include a broadcast reception module 611, a mobile communication module 613, a wireless Internet module 615, a local area communication module 617, and a Global Positioning System (GPS) module 619.

The broadcast reception module 611 receives at least one of a broadcast signal and broadcast-related information from an external broadcast management server through a broadcast channel. The broadcast channel may include a satellite channel, a terrestrial channel, or the like.

The broadcast-related information may be information relating to a broadcast channel, a broadcast program, or a broadcast service provider. The broadcast-related information may also be provided through a mobile communication network. In this case, the broadcast-related information may be received by the mobile communication module 613. The broadcast-related information may be provided in various forms.

A broadcast signal and/or broadcast related information received through the broadcast reception module 611 may be stored in the memory 660.

The mobile communication module 613 transmits and receives a wireless signal to and from at least one of a base station, an external terminal, and a server over a mobile communication network. The wireless signal may include a voice call signal, a video call signal, or various types of data associated with transmission and reception of a text/multimedia message.

The wireless Internet module 615 is an internal or external module for wireless Internet access which may be provided to the mobile terminal 600.

The local area communication module 617 is a module for local area communication. Here, Bluetooth, Radio Frequency Identification (RFID), Infrared Data Association (IrDA,), Ultra Wideband (UWB), ZigBee, or Near Field Communication (NFC) may be used as a local area communication technology.

According to an embodiment of the present invention, the local area communication module 617 includes an NFC module. The local area communication module 617 may start data communication with another electronic device, specifically, an image display device, through the NFC module. Detailed operations of the NFC module will be described later with reference to FIG. 10.

The GPS module 619 receives location information from multiple GPS satellites.

The A/V input unit 620 is provided to input an audio or video signal and may include a camera 621 and a microphone 623. The camera 621 processes an image frame such as a still image (or photograph) or a moving image (or video) obtained through an image sensor in a video communication mode or an image capture mode. The processed picture frame may be displayed on the display module 651.

The picture frame processed at the camera 621 may be stored in the memory 660 or may be transmitted to the outside through the wireless communication unit 610. Two or more cameras 621 may be provided depending on the configuration of the mobile terminal.

The microphone 623 receives an external audio signal in a voice or video communication mode, a record mode, or a voice recognition mode and processes the same into audio data. In the voice or video communication mode, the processed audio data may be converted into a form transmittable to a mobile communication base station through the mobile communication module 613.

The user input unit 630 generates key input data corresponding to a key input operation that a user has performed to control the operation of the terminal. The user input unit 630 may include a key pad, a dome switch, or a (resistive/capacitive) touchpad that can receive a command or information through a push or touch operation by the user. In the case in which the touchpad forms a multilayer structure with the display module 651 that is described later, the touchpad may be referred to as a "touchscreen".

The sensing unit 640 detects a current state of the mobile terminal 600 such as whether the mobile terminal 600 is opened or closed, the position of the mobile terminal 600, or whether or not the user is in contact with the mobile terminal 600 and generates a sensing signal for controlling the operation of the mobile terminal 600. The sensing unit 640 may sense whether the mobile terminal 600 is opened or closed when the mobile terminal 600 is a slide phone. The sensing unit 640 may also be responsible for providing sensing functions associated with whether or not the power supply unit 690 is supplying power or whether or not the interface unit 670 is coupled to an external device.

The sensing unit 640 may include a detection sensor 641, a pressure sensor 643 and a motion sensor 645. The detection sensor 641 may detect an approaching object or whether an object is present near the mobile terminal 600 without mechanical contact.

The pressure sensor 643 may determine whether pressure is being applied to the mobile terminal 600 or may measure the magnitude of pressure, if any, applied to the mobile terminal 600. The pressure sensor 643 may be installed in a certain part of the mobile terminal 600 where the detection of pressure is necessary, depending on the use environment of the mobile terminal 600.

The motion sensor 645 may detect the location, motion, or the like of the mobile terminal 600 using an acceleration sensor, a gyro sensor, a gravity sensor, or the like.

As a sensor for measuring angular velocity, the gyro sensor may determine a rotated direction (angle) of the mobile terminal 600 relative to a reference direction.

The output unit 650 is provided to output audio signals, video signals, or alarm signals. The output unit 650 may include the display module 651, an audio output module 653, an alarm module 655, and a haptic module 657.

The display module 651 displays information processed in the mobile terminal 600. For example, when the mobile terminal 600 is in a voice or video communication mode, the display module 651 displays a communication-related User Interface (UI) or Graphical User Interface (GUI). When the mobile terminal 600 is in a video communication mode or an image capture mode, the display module 651 may individually or simultaneously display captured or received images and may display a corresponding UI or GUI.

In the case in which the display module 651 forms a multilayer structure with the touchpad to construct a touchscreen as described above, the display module 651 may not only be used as an output device but may also be used as an input device which allows the user to input information by touch.

The audio output module 653 outputs audio data received from the wireless communication unit 610 or stored in the memory 660 when the mobile terminal 600 is in an incoming call receiving mode (i.e., a ringing mode), a voice or video communication mode, a record mode, a voice recognition mode, or a broadcast reception mode. The audio output module 653 outputs audio signals associated with functions performed by the mobile terminal 600, for example, an audio signal associated with an incoming call sound (i.e., ringtone) or a message receipt sound. The audio output module 653 may include a speaker, a buzzer, or the like.

The alarm module 655 outputs a signal notifying the user that an event has occurred in the mobile terminal 600. Examples of the event occurring in the mobile terminal 600 include incoming call reception, message reception, and key signal input. The alarm module 655 may output a signal notifying the user of the occurrence of an event in a different form from the audio or video signal. For example, the alarm module 655 may output the notification signal through vibration.

The haptic module 657 may provide various haptic effects that can be perceived by the user. A typical example of the haptic effect generated by the haptic module 657 is vibration.

The memory 660 may store a program for processing and control by the controller 680 and may function to temporarily store input or output data items (for example, a phonebook, messages, still images, and moving images).

The interface unit 670 functions to interface with all external devices connected to the mobile terminal 600. The interface unit 670 may receive power or data from such an external device and provide the same to each internal component of the mobile terminal 600 and may transmit internal data of the mobile terminal 600 to the external device.

The controller 680 generally controls the operation of each component to control the overall operation of the mobile terminal 600. For example, the controller 680 performs control and processing associated with voice communication, data communication, video communication, and the like. The controller 680 may include a multimedia playback module 681 for multimedia reproduction. The multimedia playback module 681 may be implemented by hardware in the controller 680 or may be implemented by software separately from the controller 680.

According to an embodiment of the present invention, the controller 680 may perform a control operation for transmitting motion information or position information of the mobile terminal 600 sensed by the motion sensor 645 to be transmitted to the image display device 100 or the remote control device 200.

Specifically, in the case in which the mobile terminal 600 performs near field communication with the image display device 100 or the remote control device 200 through the NFC module in the wireless communication unit 610, the controller 680 may perform a control operation for transmitting the motion information or position information of the mobile terminal 600 to the image display device 100 or the remote control device 200 through the NFC module in the wireless communication unit 610.

Under control of the controller 680, the power supply unit 690 receives external power or internal power and supplies power required for operation to each component.

The mobile terminal 600 constructed as described above may be implemented such that it can operate in communication systems, including a wired/wireless communication system and a satellite based communication system, which can transmit data through frames or packets.

Figure 7:
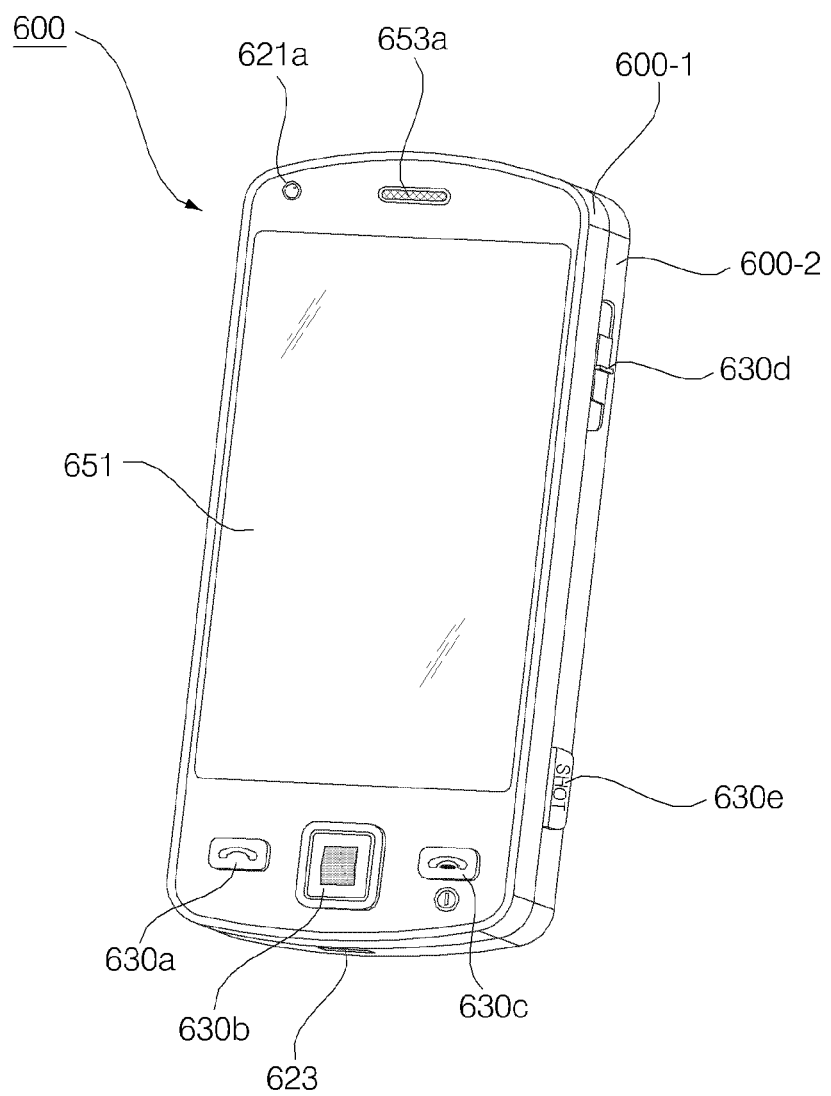
FIG. 7 is a front perspective view of the mobile terminal shown in FIG. 6.
Figure 8:
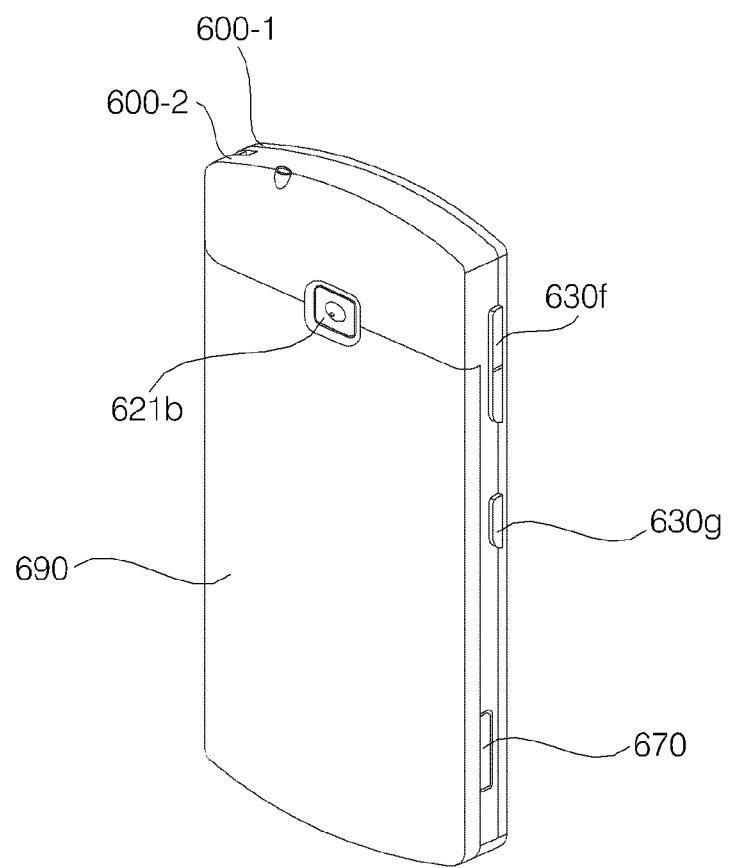
FIG. 8 is a rear perspective view of the mobile terminal shown in FIG. 6.

FIG. 7 is a front perspective view of the mobile terminal shown in FIG. 6 and FIG. 8 is a rear perspective view of the mobile terminal shown in FIG. 6.

Referring to FIG. 7, a case defining the external appearance of the mobile terminal 600 includes a front case 600-1 and a rear case 600-2. A variety of electronic parts are provided in a space defined within the front and rear cases 600A-1 and 600-2.

A display module 651, a first audio output module 653*a*, a first camera 621*a*, and first to third user input units 630*a*, 630*b*, and 630*c* may be arranged in a main body of the mobile terminal 600, specifically, in the front case 600-1. A fourth user input unit 630*d*, a fifth user input unit 630*e*, and a microphone 623 may be arranged on a side surface of the rear case 600-2.

A touchpad may be formed in a layered structure overlapping the display module 651 such that the display module 651 operates as a touchscreen allowing the user to input information through touch.

The first audio output module 653*a* may be implemented in a receiver or speaker form. The first camera 621*a* may be implemented in a form suitable for capturing a still or moving image of the user or the like. The microphone 623 may be implemented in a form suitable for receiving sound such as user voice.

The first to fifth user input units 630*a*, 630*b*, 630*c*, 630*d*, and 630*e* and sixth to seventh user input units 630*f* and 630*g* may be collectively referred to as a user input unit 630. The user input unit 630 may be of any type, provided that the user input unit 630 is operated in a tactile manner such that it is operated through tactile interaction with the user.

For example, the user input unit 630 may be implemented as a dome switch or a touchpad that can receive a command or information through a push or touch operation by the user. The user input unit 630 may also be implemented as a jog wheel or a joystick. In terms of functionality, the first to third user input units 630*a*, 630*b*, and 630*c* allow the user to input a command such as start, end, or screen scroll and the fourth user input unit 630*d* allows the user to select an operating mode of the mobile terminal 600. The fifth user input unit 630*e* may function as a hot key for activating a special function of the mobile terminal 600.

Figure 9:
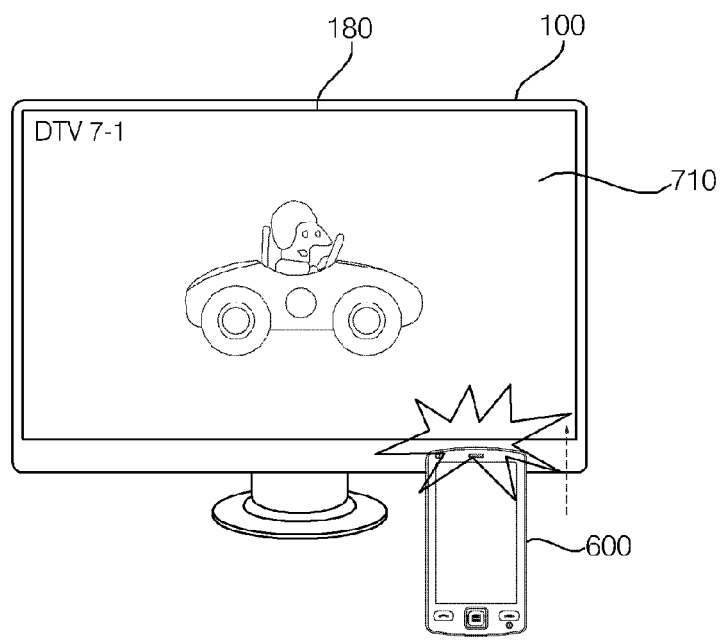
FIGS. 9 and 10 are used to explain near field communication of FIG. 1A.
Figure 10:
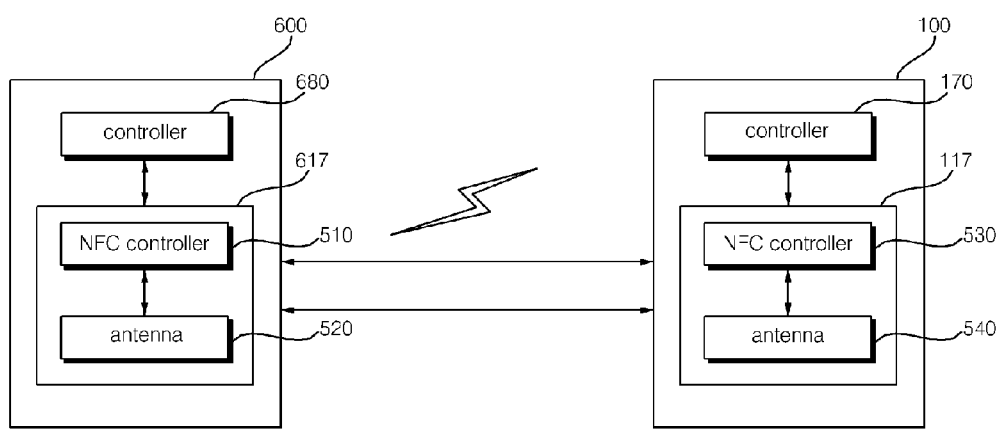

FIGS. 9 and 10 are used to explain near field communication of FIG. 1A.

As shown in FIG. 9, near field communication may start when the mobile terminal 600 and the image display device 100 have approached each other within a predetermined distance while a broadcast image 710 is being displayed on the display 180 of the image display device 100, which is referred to as tagging.

That is, the image display device 100 of the mobile terminal 600 may transmit or receive data through an NFC scheme.

To accomplish this, as shown in FIG. 10, the mobile terminal 600 may include an NFC module 617 including an NFC controller 510 and an antenna 520. In addition, the image display device 100 may include an NFC module 117 including an NFC controller 530 and an antenna 540.

For example, when the mobile terminal 600 is brought near the image display device 100 within a predetermined distance or when the mobile terminal 600 is brought near the image display device 100 within a predetermined distance, a magnetic field is provided and the image display device 100 can receive device information from the mobile terminal 600 according to a change in the magnetic field. Here, the device information may include motion information, position information, or personal user information.

Specifically, information exchange between the mobile terminal 600 and the image display device 100 may be performed based on one of a peer to peer mode, a read/write mode, and a card emulation (CE) mode of NFC.

The device information of the mobile terminal 600 may be stored in the form of a tag in the NFC module 617 or may be stored in the memory 660 of the mobile terminal 600. In order to transmit the device information to the image display device 100, the controller 680 of the mobile terminal 600 may perform a control operation for transmitting the device information to the NFC module 617 and the NFC controller 510 may perform a control operation for converting the device information to be transmitted through the antenna 520.

The antenna 540 of the image display device 100 receives the device information transmitted from the mobile terminal 600 and the received device information is delivered to the controller 170 of the image display device 100 via the NFC controller 530 of the image display device 100.

In another example, when the mobile terminal 600 is brought near the image display device 100 within a predetermined distance or when the mobile terminal 600 is brought near the image display device 100 within a predetermined distance, a magnetic field is provided and the mobile terminal 600 can receive device information from the image display device 100 according to a change in the magnetic field.

Here, the device information of the image display device 100 may be stored in the form of a tag in the NFC module 117 or may be stored in the storage unit 140 of the image display device 100. In order to transmit the device information to the mobile terminal 600, the controller 170 of the image display device 100 may perform a control operation for transmitting the device information to the NFC module 117 and the NFC controller 530 may perform a control operation for converting the device information to be transmitted through the antenna 540.

The antenna 520 of the mobile terminal 600 receives the device information transmitted from the image display device 100 and the received device information is delivered to the controller 680 of the mobile terminal 600 via the NFC controller 510 of the mobile terminal 600.

Figure 11:
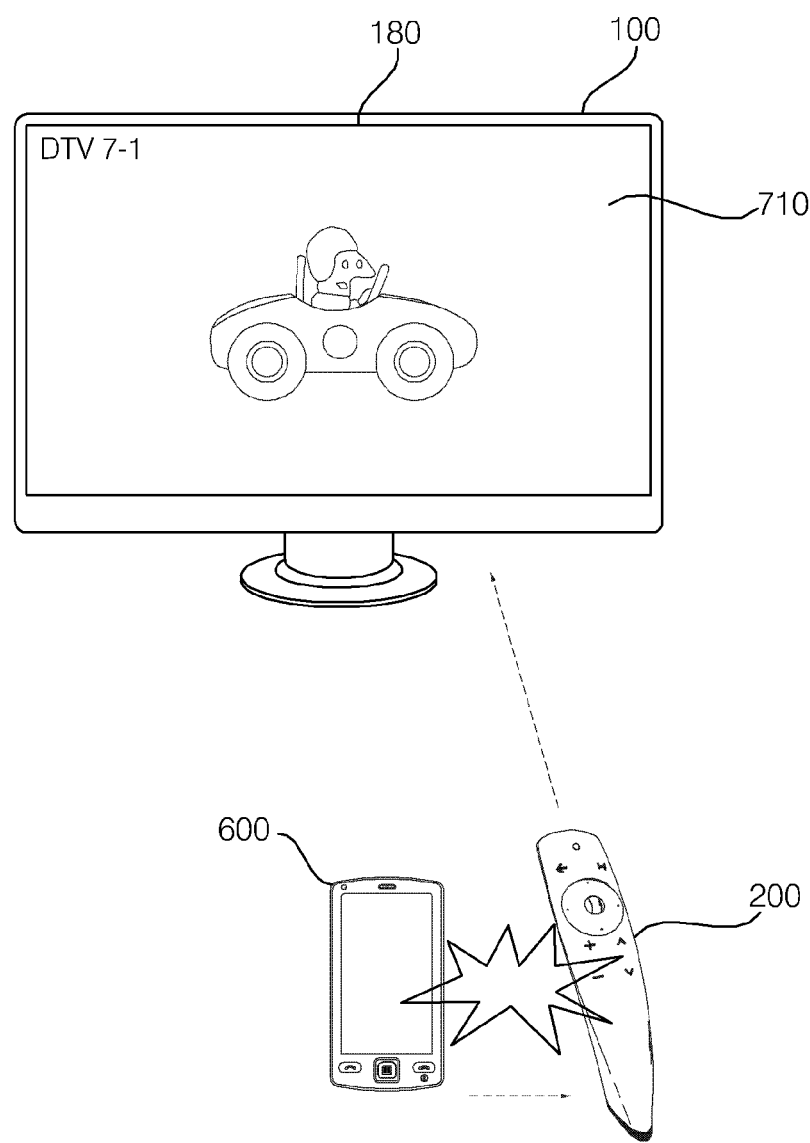
FIGS. 11 and 12 are used to explain near field communication of FIG. 1B.
Figure 12:
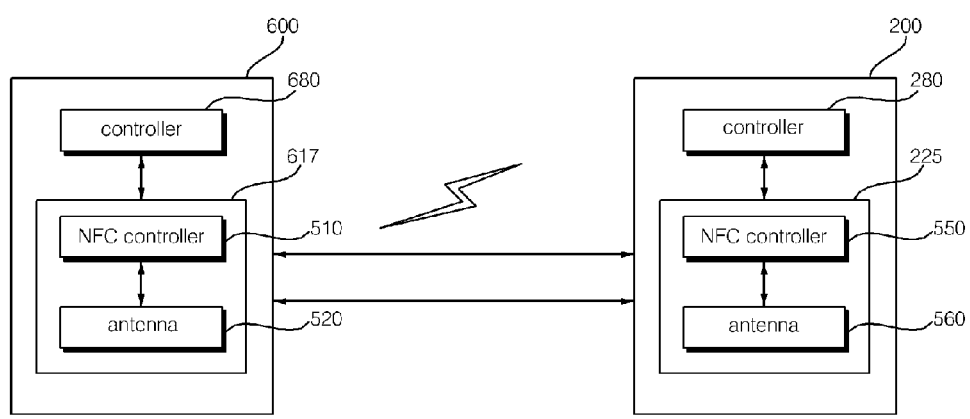

FIGS. 11 and 12 are used to explain near field communication of FIG. 1B.

As shown in FIG. 11, near field communication may start when the mobile terminal 600 and the remote control device 200 have approached each other within a predetermined distance while a broadcast image 710 is being displayed on the display 180 of the image display device 100.

To accomplish this, as shown in FIG. 12, the mobile terminal 600 may include an NFC module 617 including an NFC controller 510 and an antenna 520. In addition, the remote control device 200 may include an NFC module 225 including an NFC controller 550 and an antenna 560.

Specifically, information exchange between the mobile terminal 600 and the remote control device 200 may be performed based on one of a peer to peer mode, a read/write mode, and a card emulation (CE) mode of NFC.

In a manner similar to that described above with reference to FIGS. 10 and 11, the device information of the mobile terminal 600 may be transmitted to the remote control device 200 through near field communication. The controller 280 of the remote control device 200 receives and transmits the device information to the image display device 100. Here, an RF communication scheme or an IR communication scheme may be used as a communication scheme. Here, the device information may include motion information, position information, or personal user information.

The controller 170 of the image display device 100 receives the device information of the mobile terminal 600 via the user input interface unit 150.

In another example, the device information of the remote control device 200 may be transmitted to the mobile terminal 600 in a manner similar to that described above with reference to FIGS. 10 and 11.

Figure 13:
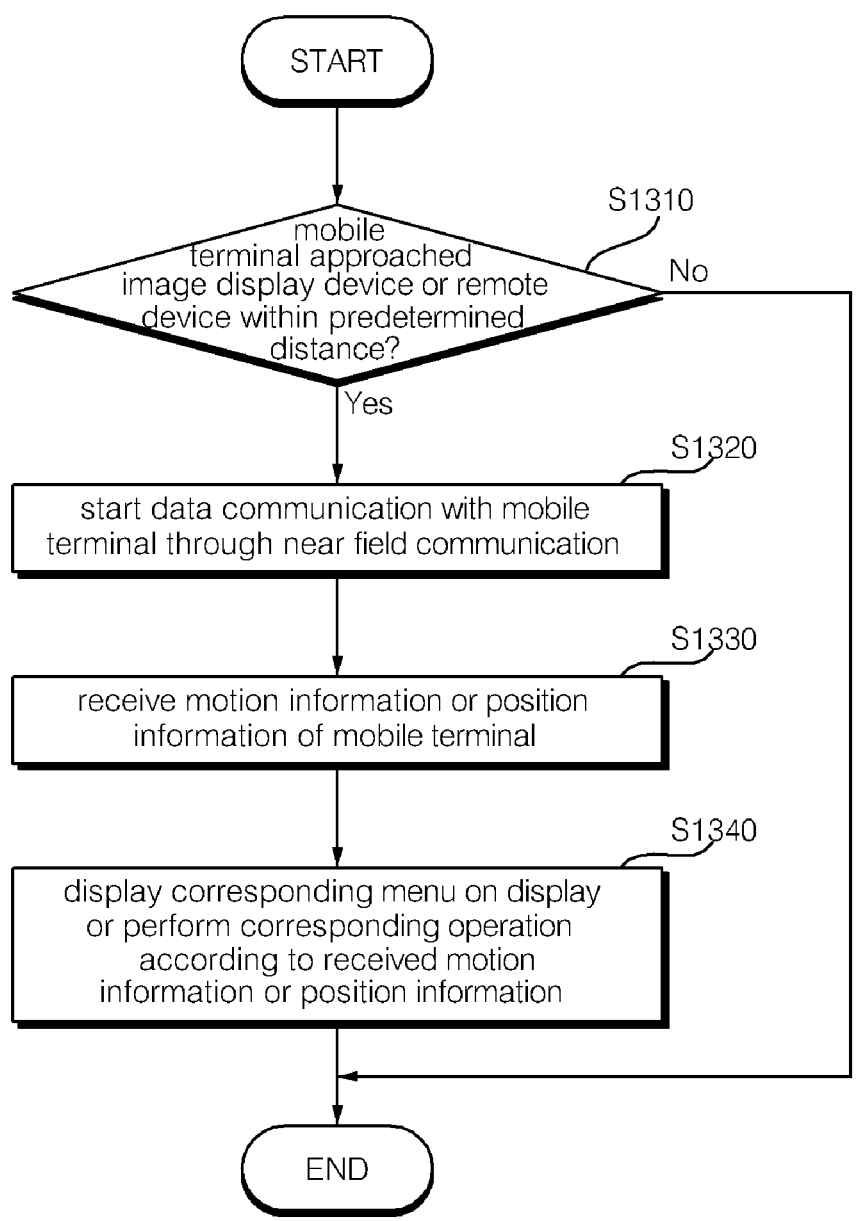
FIG. 13 is a flowchart illustrating a method for operating an image display device according to an embodiment of the present invention.

FIG. 13 is a flowchart illustrating a method for operating an image display device according to an embodiment of the present invention and FIG. 14A to FIG. 28D are used to explain various examples of the operation method of FIG. 13.

First, as shown in FIG. 13, when the mobile terminal 600 has approached the image display device 100 or the remote control device 200 within a predetermined distance (S1310), the image display device 100 or the remote control device 200 starts near field communication with the mobile terminal 600 (S1320). Then, the image display device 100 or the remote control device 200 receives motion information or position information of the mobile terminal 600 (S1330). Then, the image display device 100 or the remote control device 200 displays a corresponding menu on the display 180 or performs corresponding operation according to the received motion information or position information (S1340).

That is, the image display device 100 or the remote control device 200 receives personal information or device information from the mobile terminal 600 as described above with reference to FIGS. 9 to 12.

Alternatively, the mobile terminal 600 receives device information of the image display device 100 or the remote control device 200 as described above with reference to FIGS. 9 to 12.

The following description will be given focusing on the case in which the image display device 100 or the remote control device 200 receives device information from the mobile terminal 600.

When the remote control device 200 has received device information from the mobile terminal 600, the remote control device 200 may transmit the device information to the image display device 100.

As a result, the controller 170 of the image display device 100 may receive device information from the mobile terminal 600 as near field communication starts.

Here, the device information may include not only motion information or position information of the mobile terminal but also personal ID information, password information, personal email information, manufacturer information of the mobile terminal, product name information of the mobile terminal, and communication provider information of the mobile terminal.

In the case in which near field communication starts when the mobile terminal 600 has moved or rotated by a predetermined angle, the received device information may include motion information or position information of the mobile terminal 600. In this case, step 51320 and step 51330 may be performed.

That is, the mobile terminal 600 may transmit motion information or position information to the image display device 100 when near field communication has started.

The controller 170 of the image display device 100 may perform a control operation for receiving motion information or position information from the mobile terminal 600 and displaying a preset menu or performing a preset operation according to the motion information or position information.

Specifically, motion of the mobile terminal 600 may be detected by the motion sensor 645 provided in the mobile terminal 600. For example, when the mobile terminal 600 has rotated, rotation information of the mobile terminal 600 (such as rotation angle information) may be detected using the acceleration sensor, the gyro sensor, the gravity information, or the like. Alternatively, position information of the mobile terminal 600 which has rotated may be detected.

The detected rotation information or position information may be transmitted to the image display device 100 through the NFC module 617 of the mobile terminal 600.

The image display device 100 receives the rotation information or position information in the device information through the NFC module 117 of the image display device 100 and the received rotation information or position information is delivered to the controller 170.

The controller 170 of the image display device 100 performs a control operation for displaying a corresponding menu or performing a corresponding operation based on the received rotation information or position information.

For example, the controller 170 of the image display device 100 may perform a control operation for displaying a first menu when first rotation information corresponding to a first rotation angle has been received and may perform a control operation for displaying a second menu different from the first menu when second rotation information corresponding to a second rotation angle has been received. That is, the menu that is displayed may vary according to the rotation information or position information.

In another example, the controller 170 of the image display device 100 may perform a control operation for displaying a first menu when first rotation information corresponding to a first rotation angle has been received while a first image is being displayed on the display 180 of the image display device 100 and may perform a control operation for displaying a second menu when first rotation information corresponding to a first rotation angle has been received while a second image is being displayed on the display 180 of the image display device 100. That is, the menu that is displayed may vary depending on the attributes of a screen displayed on the display 180.

In another example, the controller 170 of the image display device 100 may perform a control operation for performing a first operation when first rotation information corresponding to a first rotation angle has been received and may perform a control operation for performing a second operation different from the first operation when second rotation information corresponding to a second rotation angle has been received. That is, the operation that is performed may vary depending on the rotation information or position information.

Specifically, a home screen may be displayed, volume control may be performed, channel adjustment may be performed, or broadcast program information may be displayed depending on the rotation information or position information.

In another example, the controller 170 of the image display device 100 may perform a control operation for performing a first operation when first rotation information corresponding to a first rotation angle has been received while a first image is being displayed on the display 180 of the image display device 100 and may perform a control operation for performing a second operation when first rotation information corresponding to a first rotation angle has been received while a second image is being displayed on the display 180 of the image display device 100. That is, the operation that is performed may vary depending on the attributes of a screen displayed on the display 180.

In another example, login of the image display device 100 may be performed according to the received motion information or position information. Specifically, when specific continuous motion information or position information has been received, the controller 170 of the image display device 100 may perform a control operation for performing a login operation according to setting.

After login is completed, the controller 170 of the image display device 100 may perform a control operation for displaying a personal setting screen for the logged-in user.

Such login may also be login to a server connected to the image display device 100 or login to a web server subscribed to by personal information.

Various examples of a menu that is displayed or an operation that is performed according to received rotation information or position information according to embodiments of the present invention are described below with reference to FIGS. 14A to 28D.

Figure 14A:
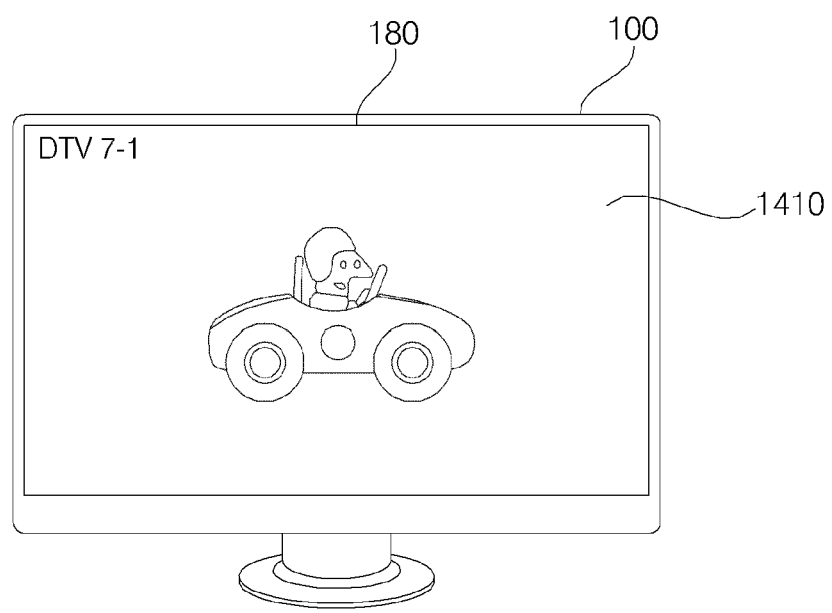
FIG. 14A to FIG. 28D are used to explain various examples of the operation method of FIG. 13.

First, FIG. 14A illustrates an example in which a broadcast image 1410 is displayed on the display 180 of the image display device 100.

Figure 14B:
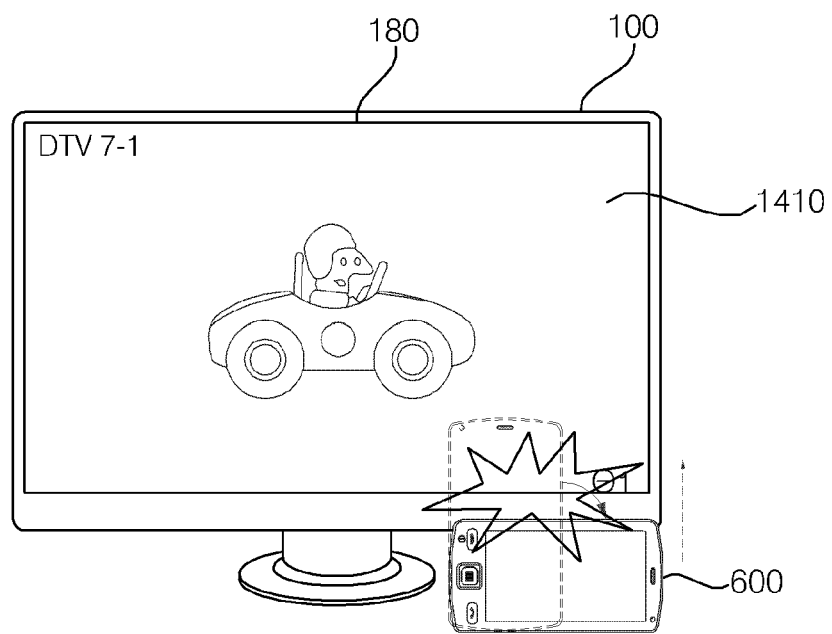

Then, near field communication starts when the mobile terminal 600 has approached the image display device 100 within a predetermined range with the mobile terminal 600 being rotated by (or being at) a first rotation angle $\theta 1$, for example, about 90 degrees, as shown in FIG. 14B. Through near field communication, device information of the mobile terminal 600 is transmitted to the image display device 100. Here, brining the mobile terminal 600 near the image display device 100 within a predetermined range with the mobile terminal 600 being rotated by (or being at) a specific angle is also referred to as "tagging".

Specifically, first rotation information $\theta 1$ or first position information from among the device information is transmitted from the mobile terminal 600 to the image display device 100.

Figure 14C:
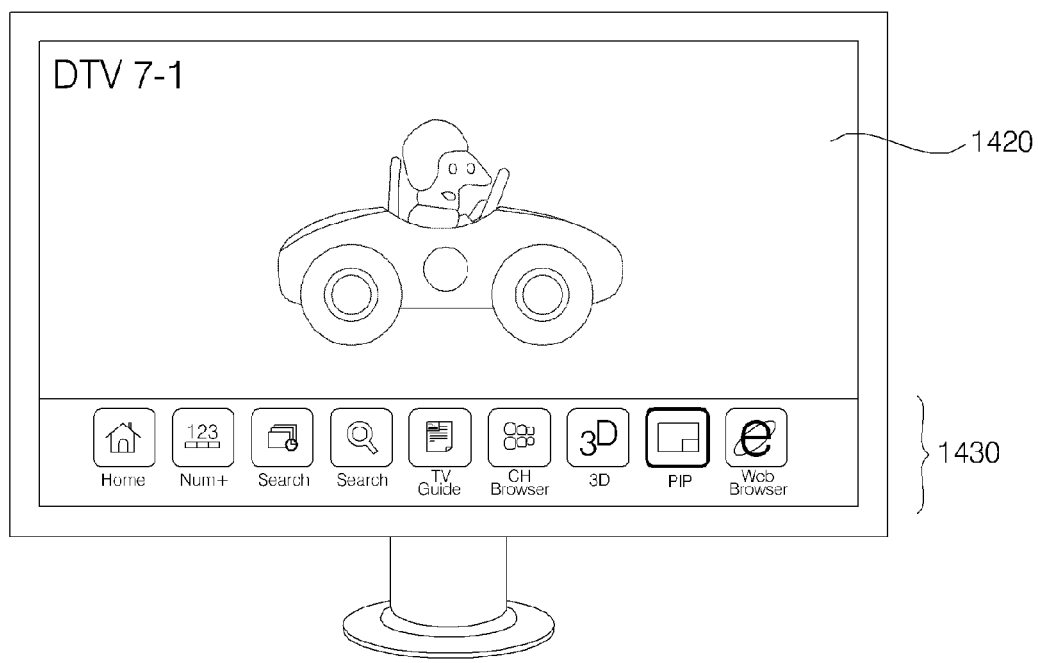

Upon receiving the first rotation information $\theta 1$ or the first position information, the controller 170 of the image display device 100 may perform a control operation for displaying a first menu 1430 on the display 180 according to the received first rotation information $\theta 1$ or first position information as shown in FIG. 14C. The first menu 1430 may be generated by the controller 170, specifically, by the OSD generator 340.

The first menu 1430 may be displayed overlapping a broadcast image 1420. Here, the broadcast image 1420 may be displayed in a reduced size due to the first menu 1430.

In FIG. 14C, a home screen shortcut item, a broadcast channel number item, a "recently viewed" view item, a search item, a guide item, a channel browser item, a switch-to-3D item, a Picture In Picture (PIP) item, and a web browser item are shown as items of the first menu 1430.

Figure 15A:
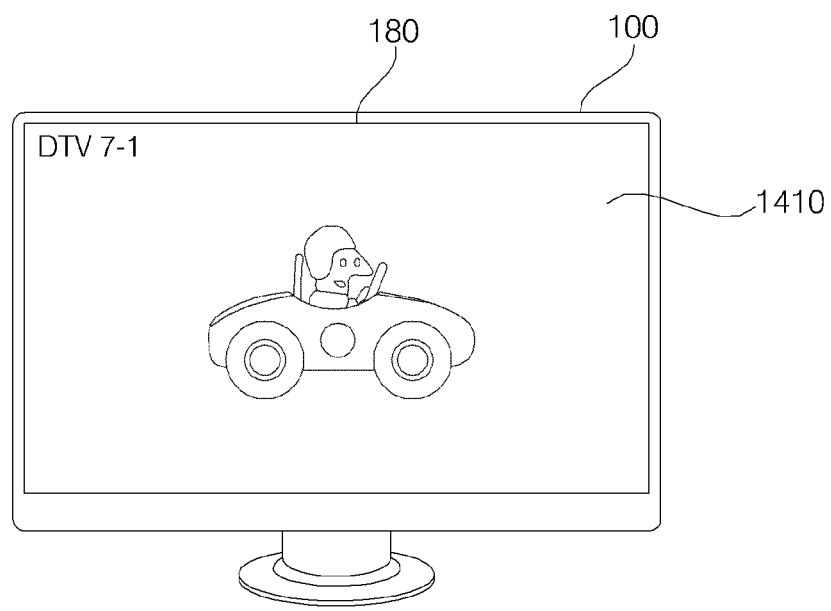
Figure 15B:
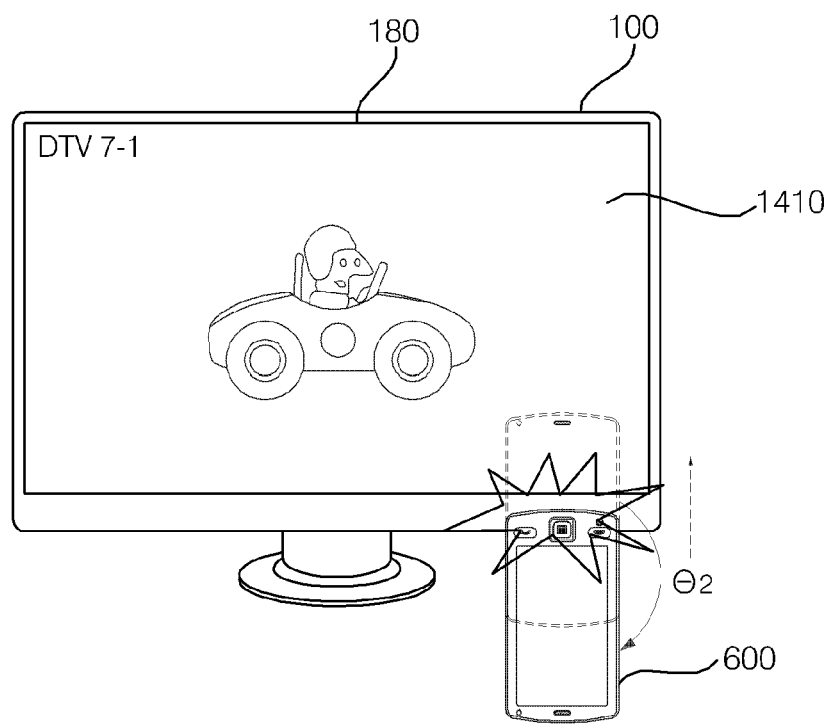
Figure 15C:
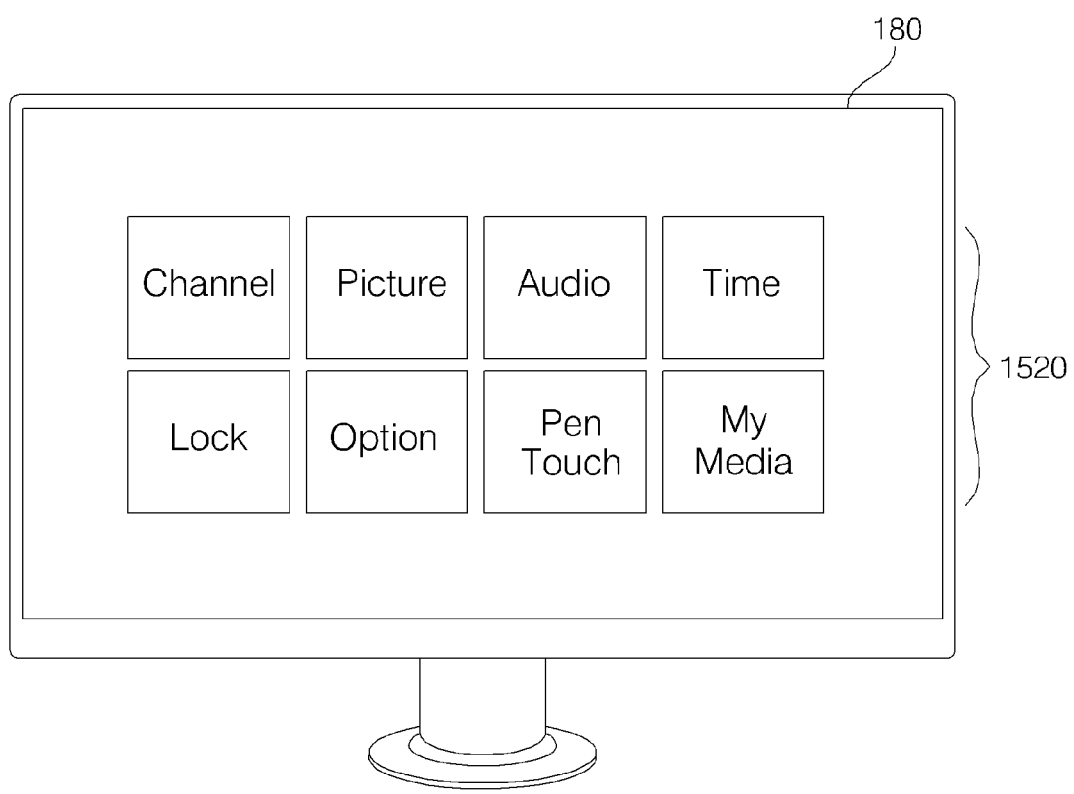

FIGS. 15A to 15C are similar to FIGS. 14A to 14C. However, there is a difference in that a second menu 1520 is displayed on the display 180 as shown in FIG. 15C when the mobile terminal 600 has been rotated by (or is at) a second rotation angle $\theta 2$, for example, by about 180 degrees, as shown in FIG. 15B.

That is, near field communication starts when the mobile terminal 600 has approached the image display device 100 within a predetermined range with the mobile terminal 600 being rotated by (or being at) the second rotation angle $\theta 2$ as shown in FIG. 15B. Through near field communication, device information of the mobile terminal 600 is transmitted to the image display device 100.

Specifically, second rotation information $\theta 2$ or second position information from among the device information is transmitted from the mobile terminal 600 to the image display device 100.

Upon receiving the second rotation information $\theta 2$ or the second position information, the controller 170 of the image display device 100 may perform a control operation for displaying a second menu 1520 on the display 180 according to the received second rotation information $\theta 2$ or second position information as shown in FIG. 15C.

In FIG. 15C, a channel related item, a picture related item, an audio related item, a time related item, a lock related item, a touch pen related item, an option related item, and a media related item are shown as items of the second menu 1520.

Although the second menu 1520 is displayed on a full area of the display 180 in the example illustrated in FIG. 15C, the second menu 1520 may also be displayed overlapping a broadcast image.

In addition, although the first rotation angle $\theta 1$ and the second rotation angle $\theta 2$ are illustrated as rotation angles of the mobile terminal 600 and different menus 1430 and 1520 are displayed according to the first and second rotation angles in the examples of FIGS. 14A to 15C, the rotation angles may be divided into 4 angles and 4 different menus may be displayed according to the 4 rotation angles or the rotation angles may be divided into 8 angles and 8 different menus may be displayed according to the 8 rotation angles.

FIGS. 16A to 17C correspond respectively to FIGS. 14A to 15C. However, there is a difference in that near field communication is performed between the mobile terminal 600 and the remote control device 200, rather than between the mobile terminal 600 and the image display device 100, as shown in FIGS. 16A to 17C.

Figure 16A:
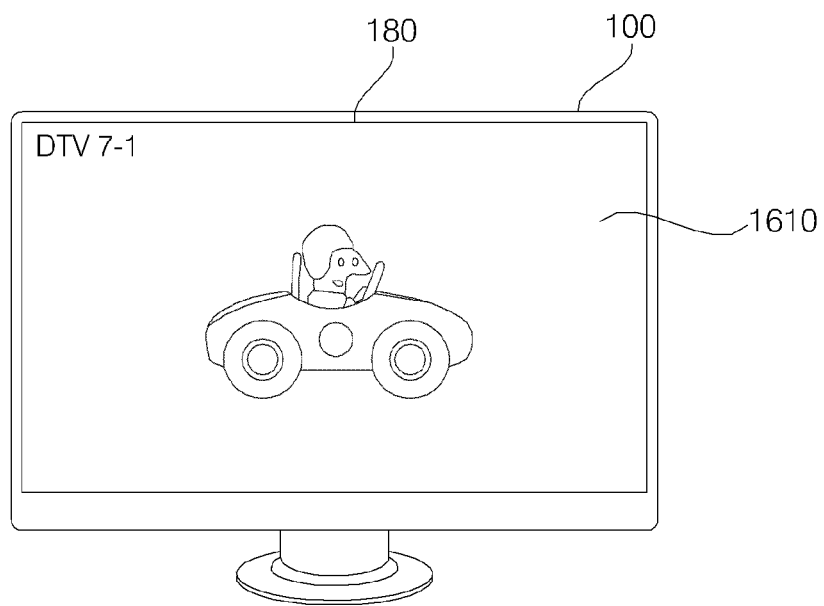

First, FIG. 16A illustrates an example in which a broadcast image 1610 is displayed on the display 180 of the image display device 100.

Figure 16B:
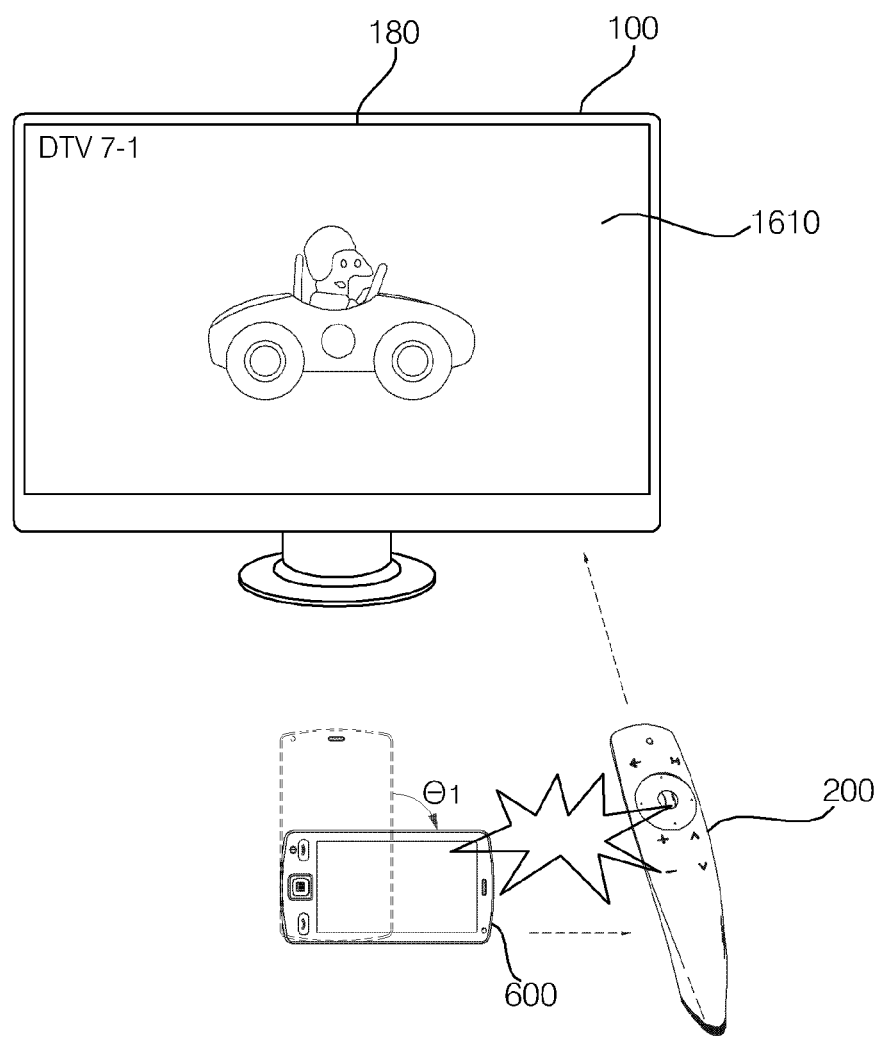

Then, near field communication starts when the mobile terminal 600 has approached the remote control device 200 within a predetermined range with the mobile terminal 600 being rotated by (or being at) the first rotation angle $\theta 1$, for example, about 90 degrees as shown in FIG. 16B. Thus, through near field communication, device information of the mobile terminal 600 is transmitted to the remote control device 200. Specifically, the first rotation information $\theta 1$ or the first position information from among the device information of the mobile terminal 600 is transmitted from the mobile terminal 600 to the remote control device 200.

The remote control device 200 then transmits the received device information to the image display device 100. For example, the first rotation information $\theta 1$ or the first position information from among the device information is transmitted from the remote control device 200 to the image display device 100 through an RF communication scheme or the like.

Figure 16C:
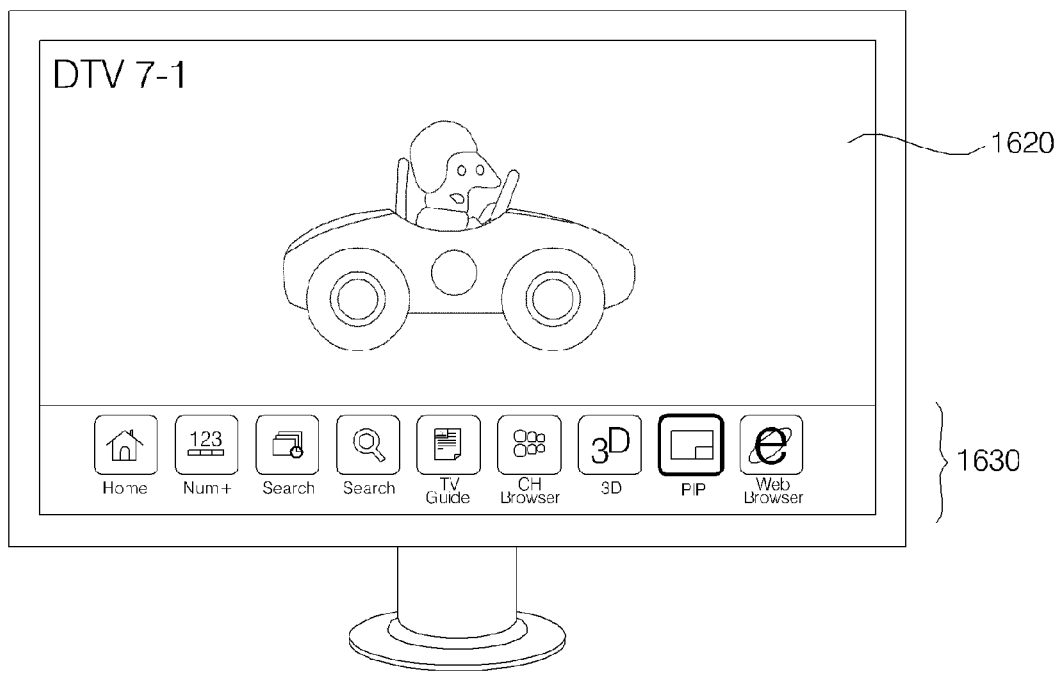

Upon receiving the first rotation information $\theta 1$ or the first position information, the controller 170 of the image display device 100 may perform a control operation for displaying a first menu 1630 on the display 180 according to the received first rotation information $\theta 1$ or first position information as shown in FIG. 16C. The first menu 1630 may be generated by the controller 170, specifically, by the OSD generator 340.

The first menu 1630 may be displayed overlapping a broadcast image 1620. Here, the broadcast image 1620 may be displayed in a reduced size due to the first menu 1630.

Figure 17A:
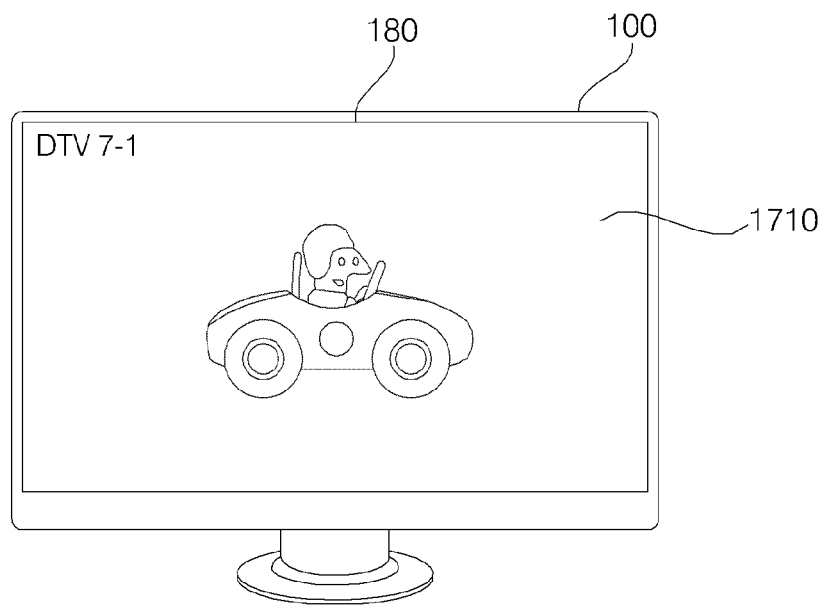
Figure 17B:
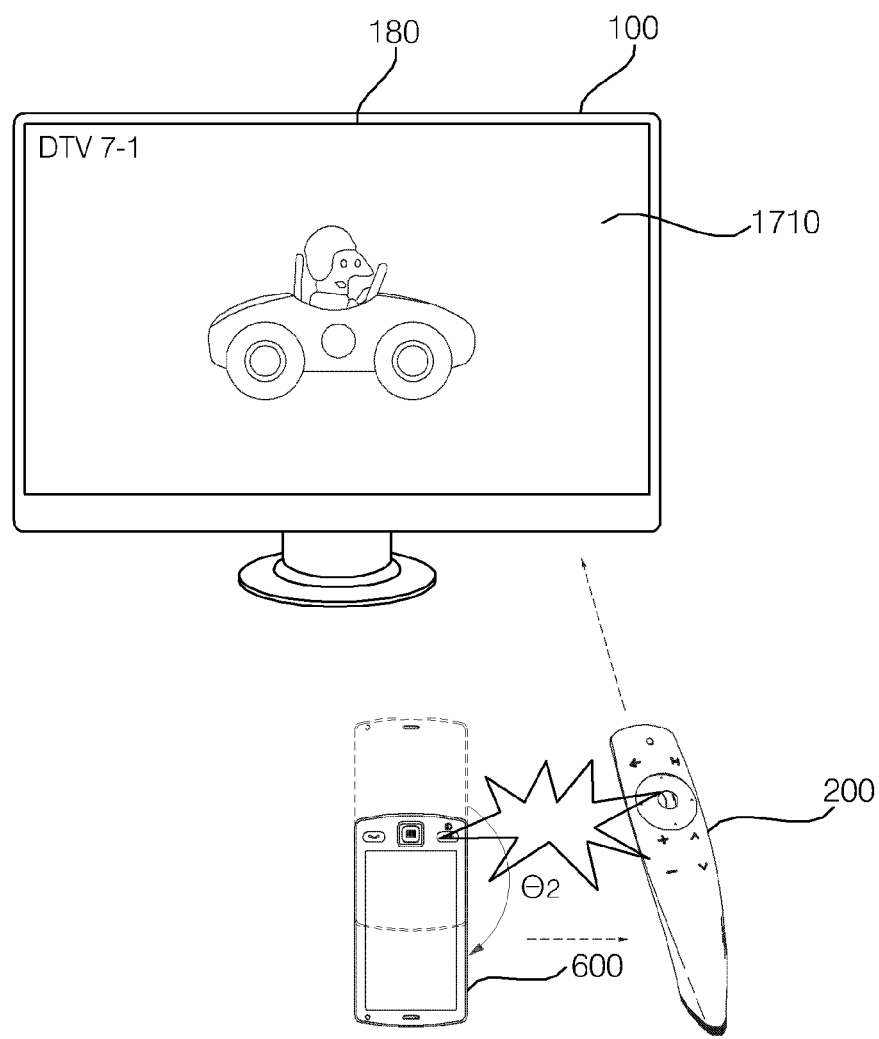
Figure 17C:
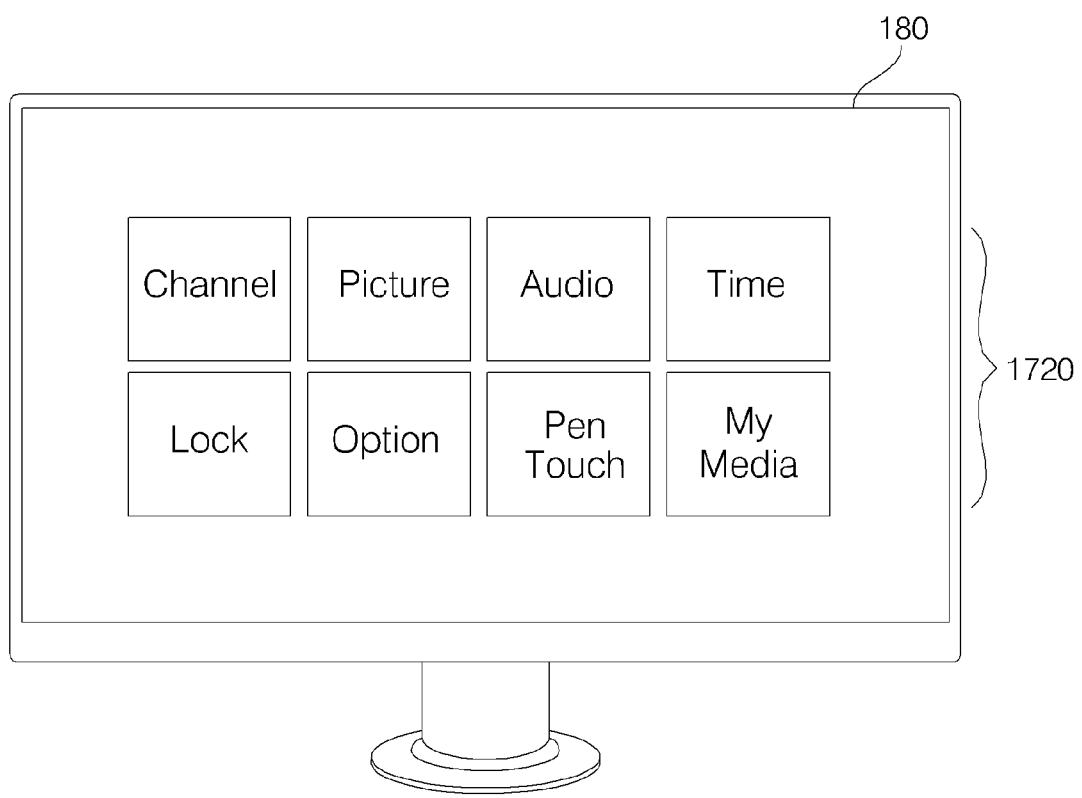

In addition, there is a difference in that a second menu 1720 is displayed on the display 180 as shown in FIG. 17C when the mobile terminal 600 has been rotated by a second rotation angle $\theta 2$, for example, about 180 degrees, as shown in FIG. 17B.

As described above, FIGS. 14A to 17C illustrate corresponding menus that are displayed when rotation information or position information has been received from the mobile terminal 600 while the broadcast image 1410 of the image display device 100 is being displayed.

The following FIGS. 18A to 19C illustrate various examples in which corresponding operations are performed when rotation information or position information has been received from the mobile terminal 600 while the broadcast image 1410 of the image display device 100 is being displayed.

Figure 18A:
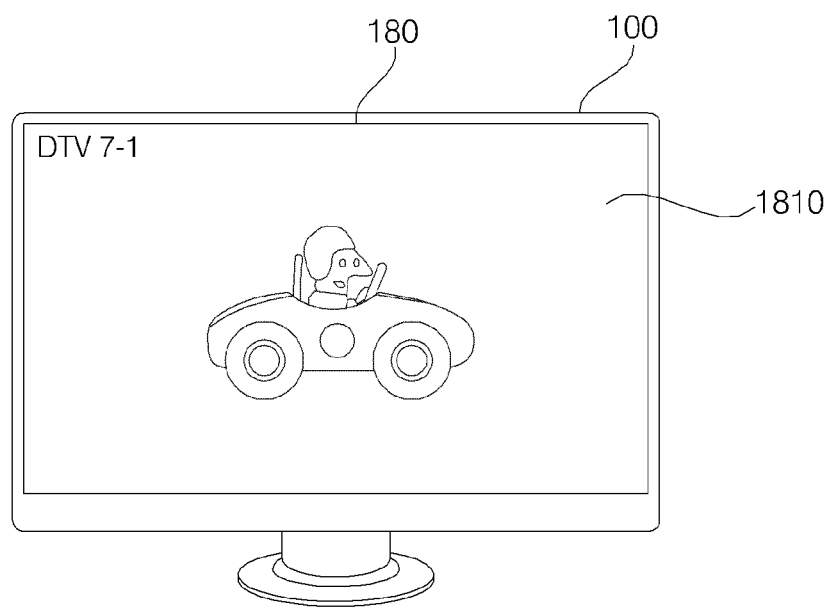

FIG. 18A illustrates an example in which a broadcast image 1810 is displayed on the display 180 of the image display device 100.

Figure 18B:
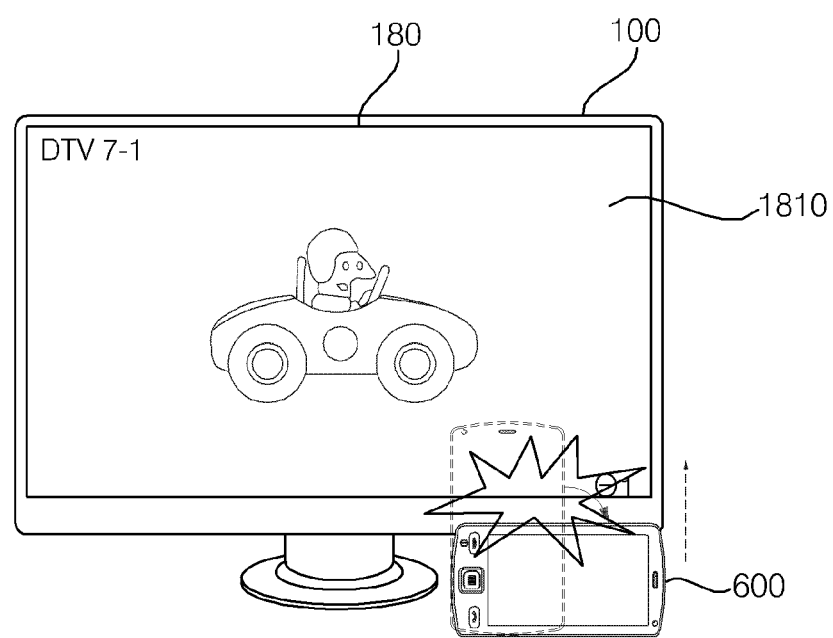

Then, near field communication starts when the mobile terminal 600 has approached the image display device 100 within a predetermined range with the mobile terminal 600 being rotated by (or being at) a first rotation angle $\theta 1$, for example, about 90 degrees, as shown in FIG. 18B. Through near field communication, the image display device 100 can receive device information of the mobile terminal 600. Specifically, first rotation information $\theta 1$ or first position information from among the device information may be transmitted from the mobile terminal 600 to the image display device 100.

Figure 18C:
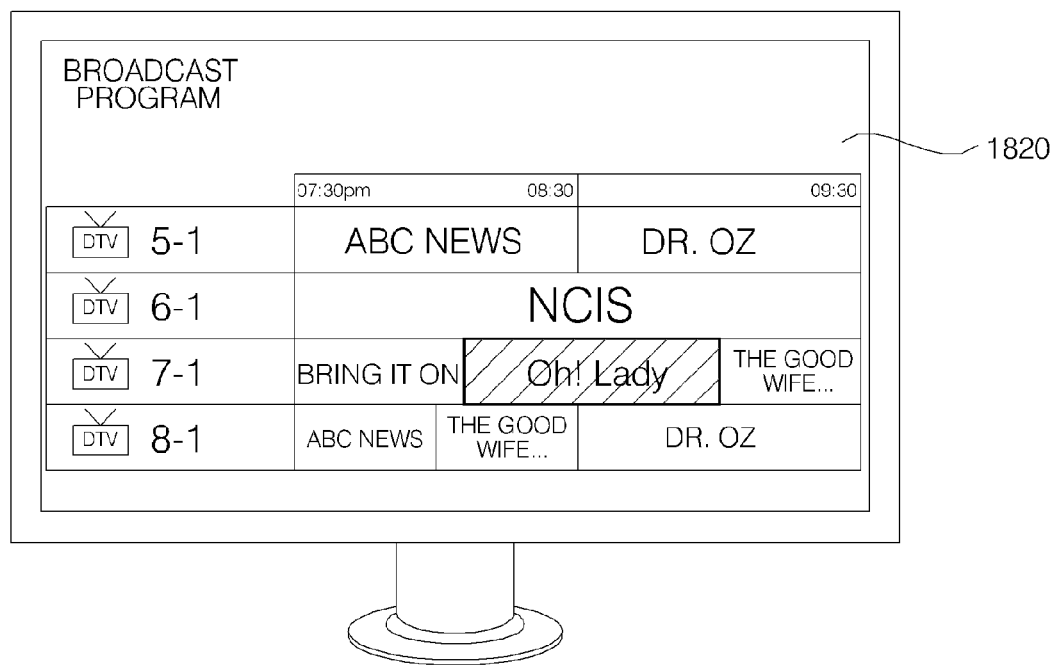

Upon receiving the first rotation information $\theta 1$ or the first position information, the controller 170 of the image display device 100 may perform a control operation for displaying a broadcast program information screen 1820, i.e., an EPG screen, on the display 180 according to the received first rotation information $\theta 1$ or first position information as shown in FIG. 18C. The broadcast program information screen 1820 may be generated by the controller 170, specifically, by the OSD generator 340.

Figure 19A:
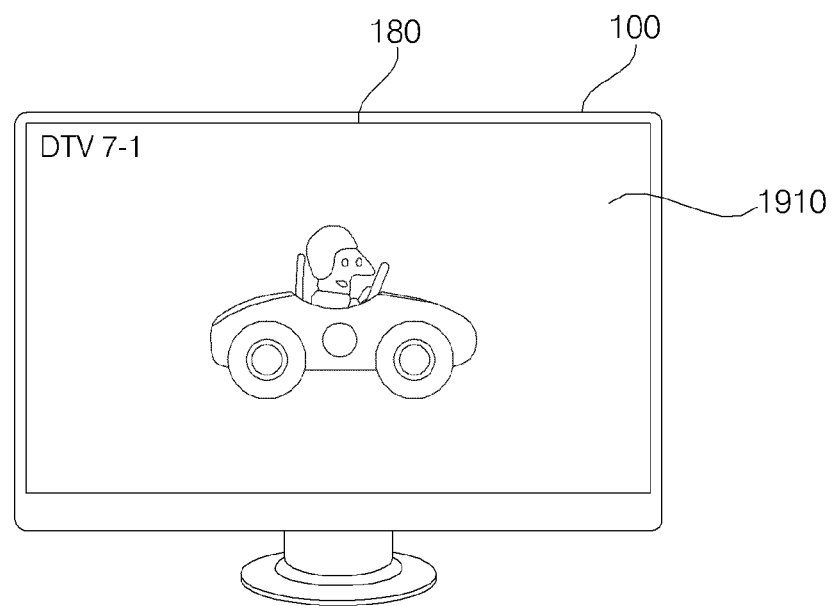
Figure 19B:
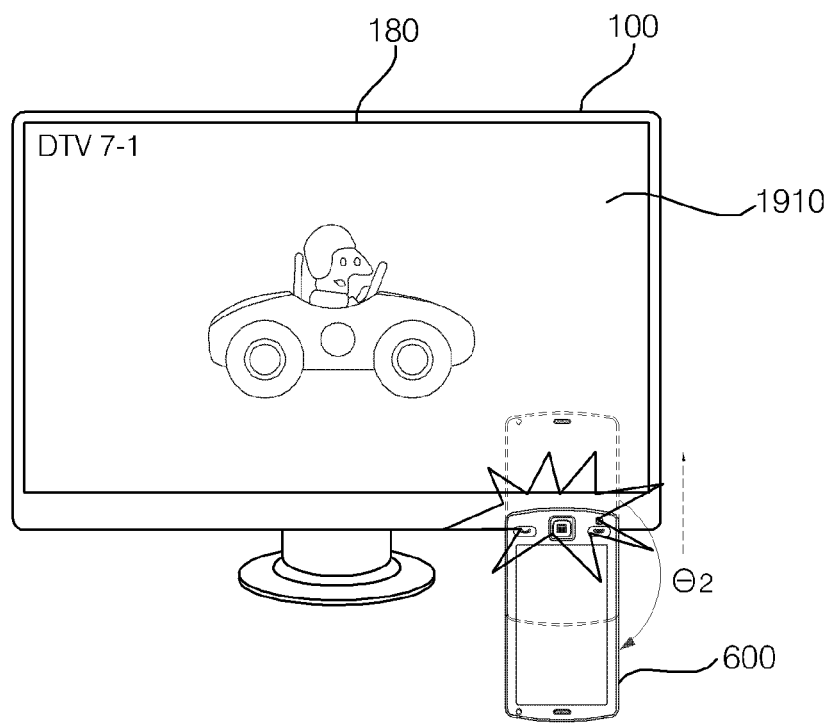
Figure 19C:
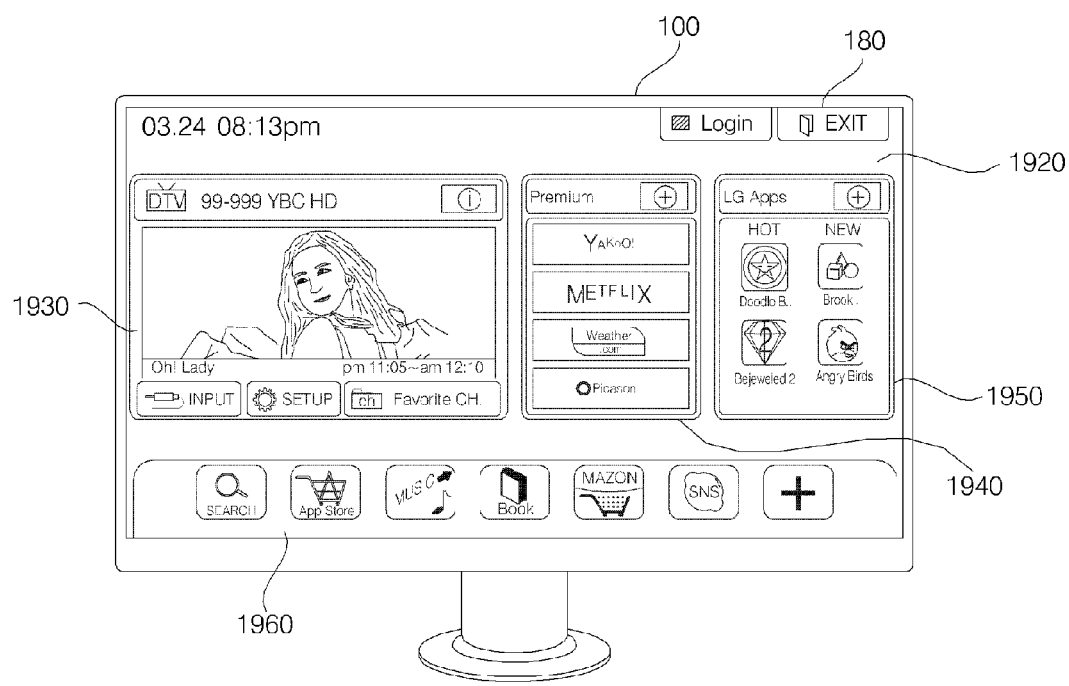

FIGS. 19A to 19C are similar to FIGS. 18A to 18C. However, there is a difference in that a home screen 1920 is displayed on the display 180 as shown in FIG. 19C when the mobile terminal 600 has been rotated by a second rotation angle $\theta 2$, for example, by about 180 degrees, as shown in FIG. 19B.

As a home screen of a smart TV, the home screen 1920 may include a region in which a broadcast image 1930 is displayed, a card object region in which card objects 1940 and 1950 are displayed, and an application region in which a favorite or application menu 1960 is displayed. A content provider card object 1940 indicating a content provider list and an application card object 1950 indicating an application list are shown in FIG. 19C.

The examples of FIGS. 18A to 19C may be applied to the case in which near field communication is performed between the mobile terminal 600 and the remote control device 200, similar to the examples of FIGS. 16A to 17C.

In addition, although the first rotation angle θ1 and the second rotation angle θ2 are illustrated as rotation angles by which the mobile terminal 600 rotates while a broadcast image is being displayed and the broadcast program information screen 1820 and the home screen 1920 are displayed according to the first and second rotation angles in the examples of FIGS. 18A to 19C, the rotation angles may be divided into 4 angles and 4 different operations may be performed according to the 4 rotation angles and the rotation angles may be divided into 8 angles and 8 different operations may be performed according to the 8 rotation angles. For example, various operations such as channel change, volume control, and channel browser execution may be performed according to rotation information when a broadcast image is displayed.

As described above, FIGS. 18A to 19C illustrate various examples in which corresponding operations are performed when rotation information or position information has been received from the mobile terminal 600 while a broadcast image of the image display device 100 is being displayed.

The following FIGS. 20A to 23C illustrate various examples in which corresponding operations are performed when rotation information or position information has been received from the mobile terminal 600 while a web screen or a content list screen rather than a broadcast image of the image display device 100 is being displayed.

Figure 20A:
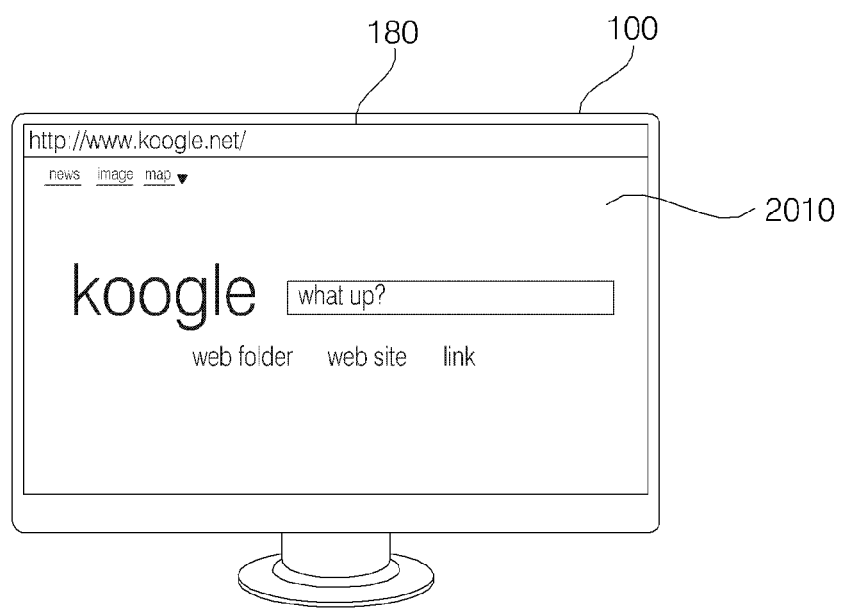

FIG. 20A illustrates an example in which a web screen 2010 is displayed on the display 180 of the image display device 100.

Figure 20B:
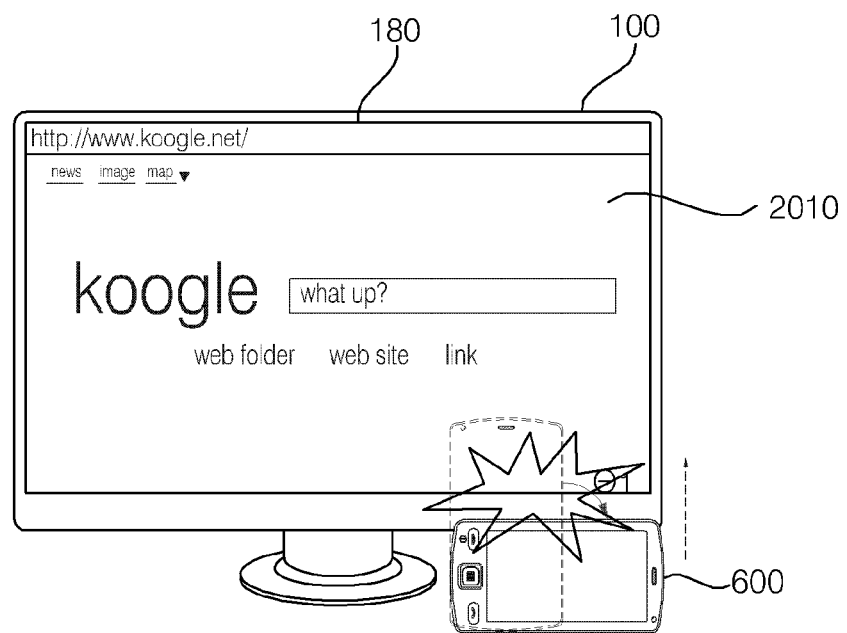

Then, near field communication starts when the mobile terminal 600 has approached the image display device 100 within a predetermined range with the mobile terminal 600 being rotated by a first rotation angle θ1, for example, about 90 degrees, as shown in FIG. 20B. Through near field communication, device information of the mobile terminal 600 is transmitted to the image display device 100.

Specifically, first rotation information θ1 or first position information from among the device information is transmitted from the mobile terminal 600 to the image display device 100.

Figure 20C:
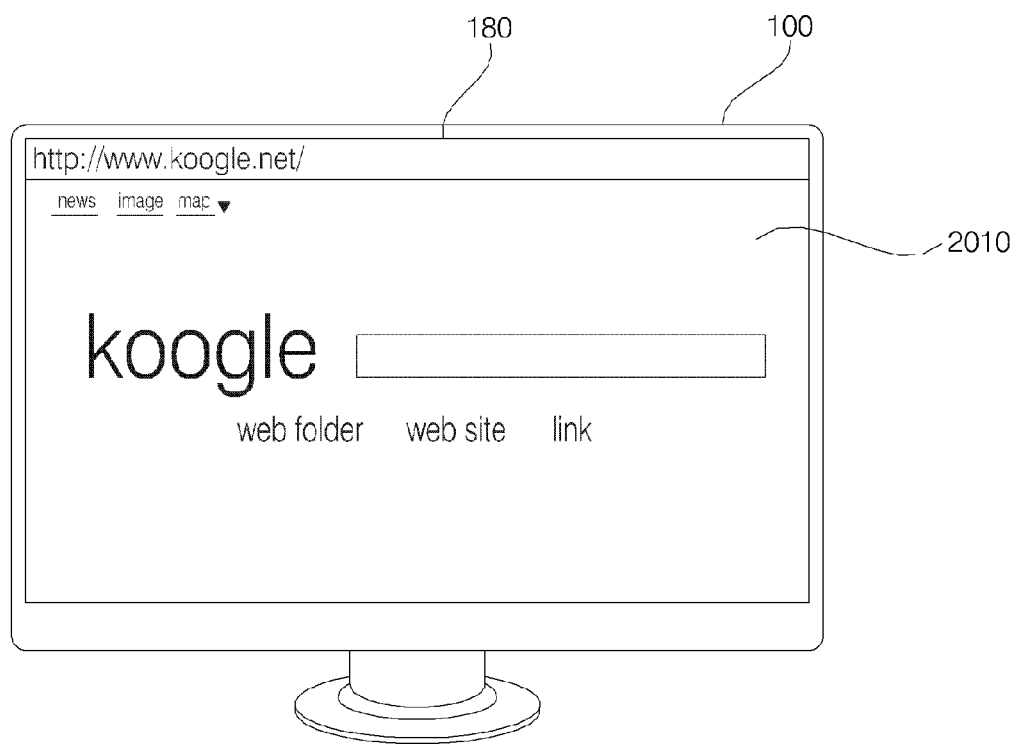

Upon receiving the first rotation information θ1 or the first position information, the controller 170 of the image display device 100 may perform a control operation for displaying a web screen 2015 previous to a connected web screen according to the received first rotation information θ1 or first position information as shown in FIG. 20C. Accordingly, it is possible to easily move to a previous web screen.

Figure 21A:
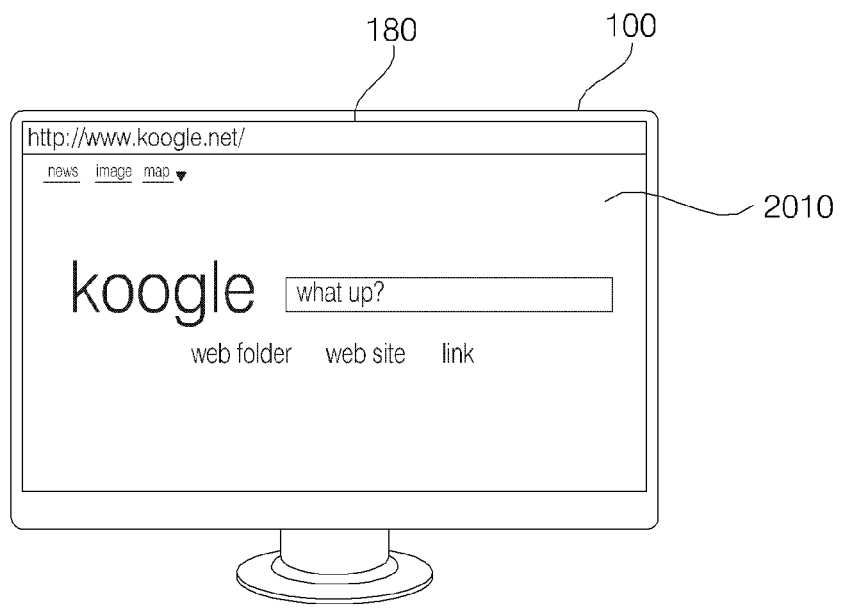
Figure 21B:
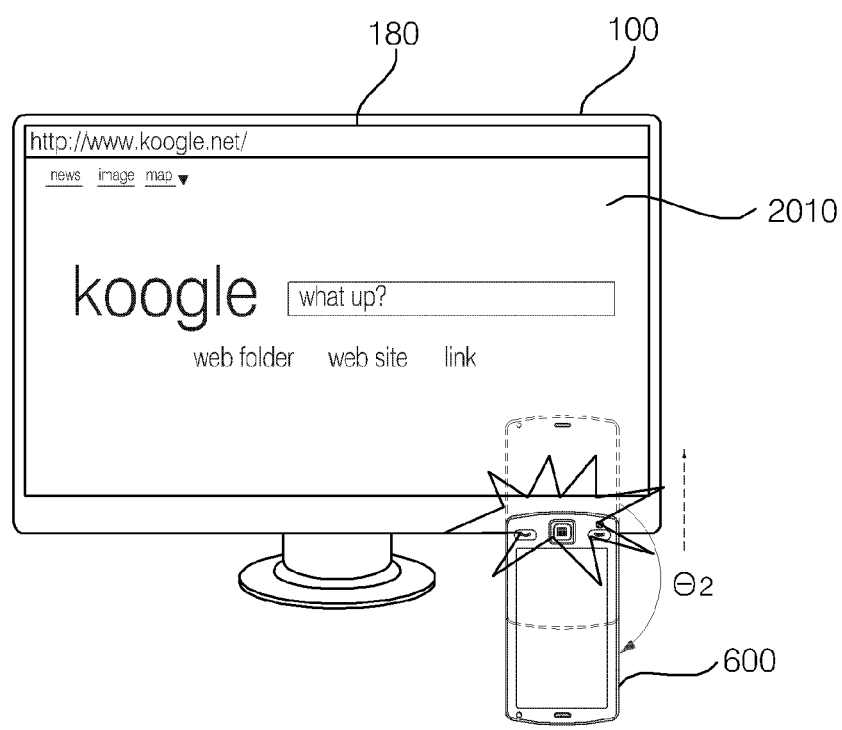
Figure 21C:
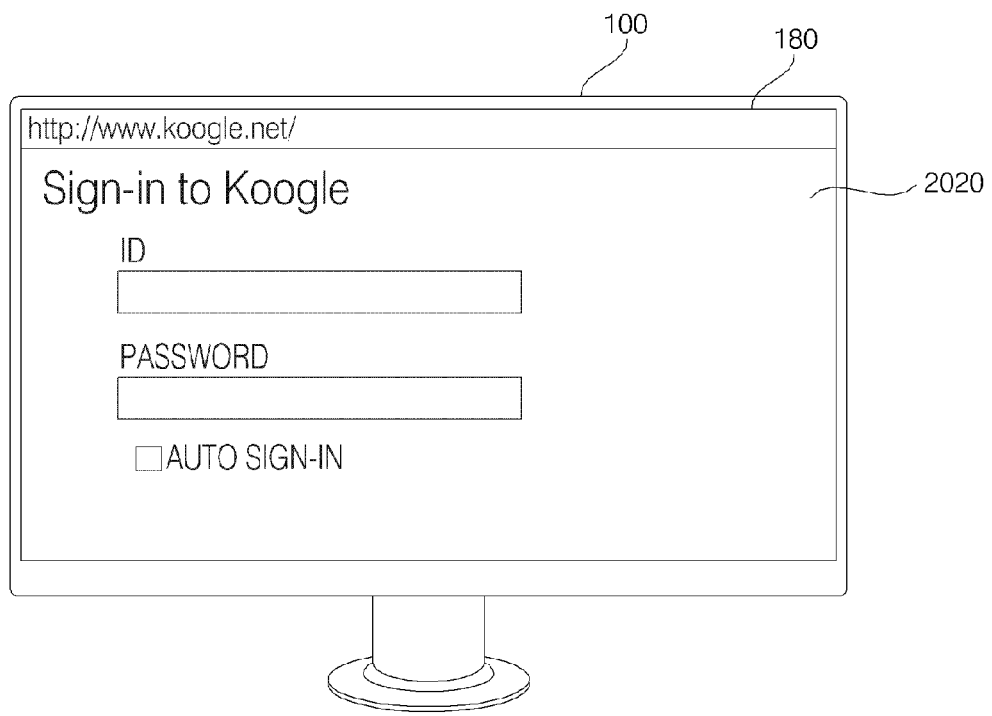

FIGS. 21A to 21C are similar to FIGS. 20A to 20C. However, there is a difference in that a web screen 2020 next to a connected web screen is displayed on the display 180 as shown in FIG. 21C when the mobile terminal 600 has been rotated by a second rotation angle θ2, for example, by about 180 degrees, as shown in FIG. 21B. Accordingly, it is possible to easily move to a next web screen.

As described above, different menus may be displayed or different operations may be performed depending on the attributes of a displayed screen even when the same rotation position or position information has been received.

Figure 22A:
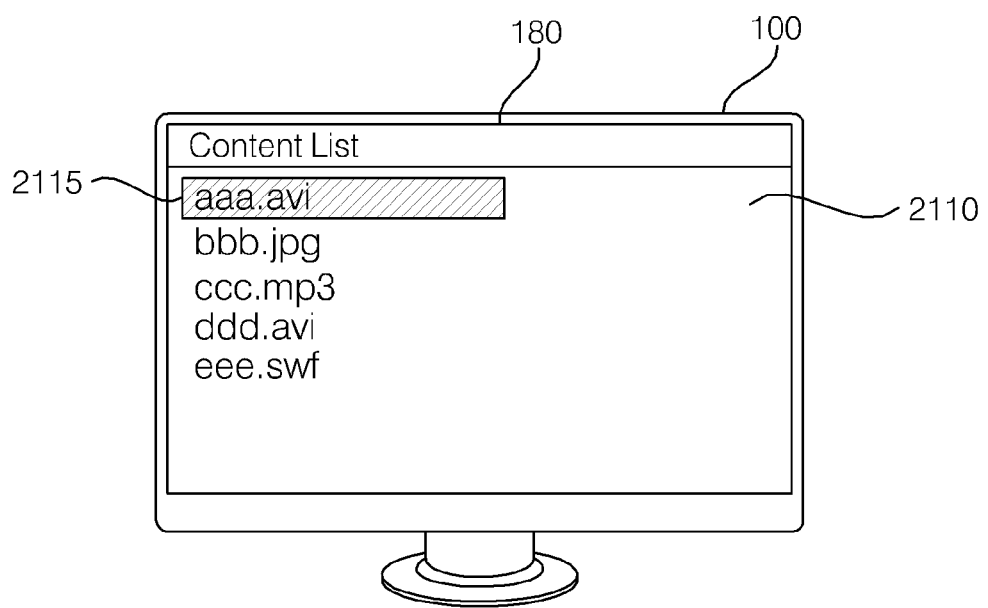

FIG. 22A illustrates an example in which a content list screen 2110 is displayed on the display 180 of the image display device 100 and an item "aaa.avi" in the content list screen 2110 is focused (or highlighted).

Figure 22B:
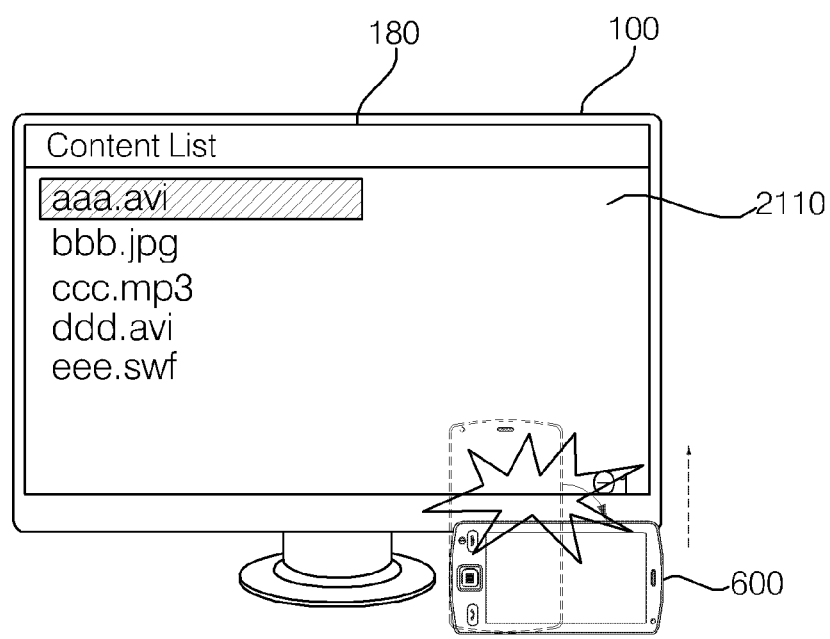

That is, near field communication starts when the mobile terminal 600 has approached the image display device 100 within a predetermined range with the mobile terminal 600 being rotated by the first rotation angle θ1, for example, by about 90 degrees, as shown in FIG. 22B. Through near field communication, device information of the mobile terminal 600 is transmitted to the image display device 100.

Specifically, first rotation information θ1 or first position information from among the device information is transmitted from the mobile terminal 600 to the image display device 100.

Figure 22C:
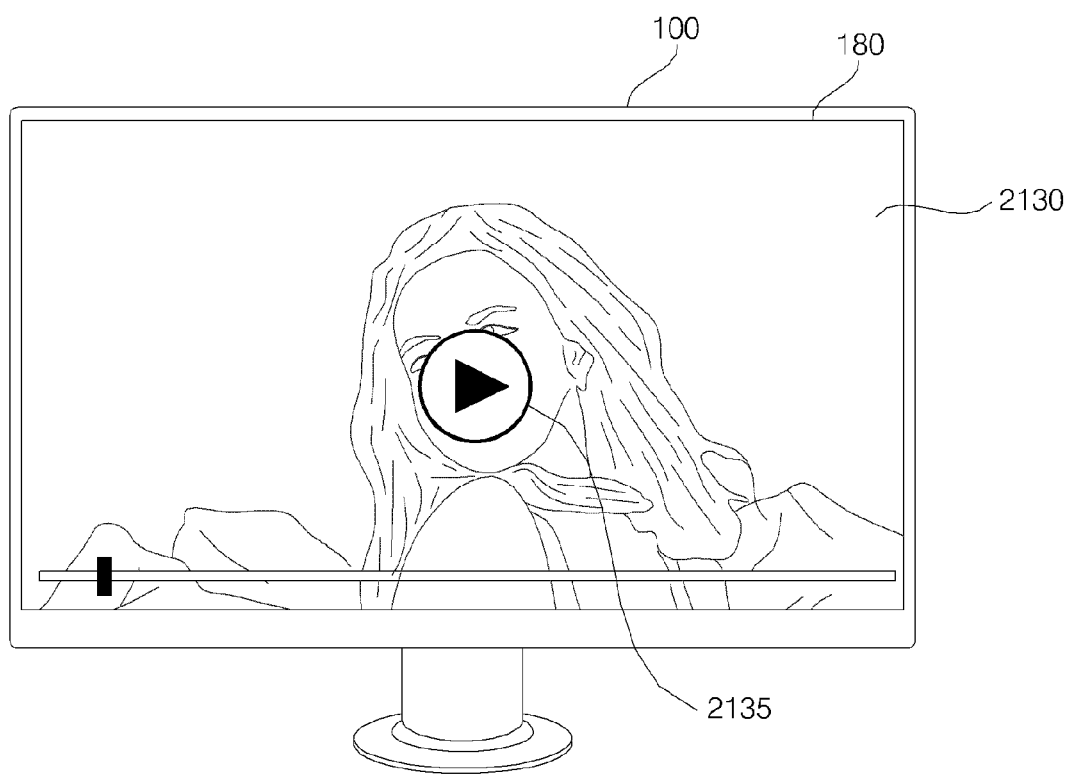

The controller 170 of the image display device 100 may perform a control operation for reproducing the focused item in the content list screen 2110 according to the received first rotation information θ1 or first position information as shown in FIG. 22C. FIG. 22C illustrates an example in which a reproduced screen 2130 of the focused item is displayed and an object 2135 indicating start of reproduction of the focused item is also displayed. Accordingly, it is possible to easily reproduce a desired content item.

Figure 23A:
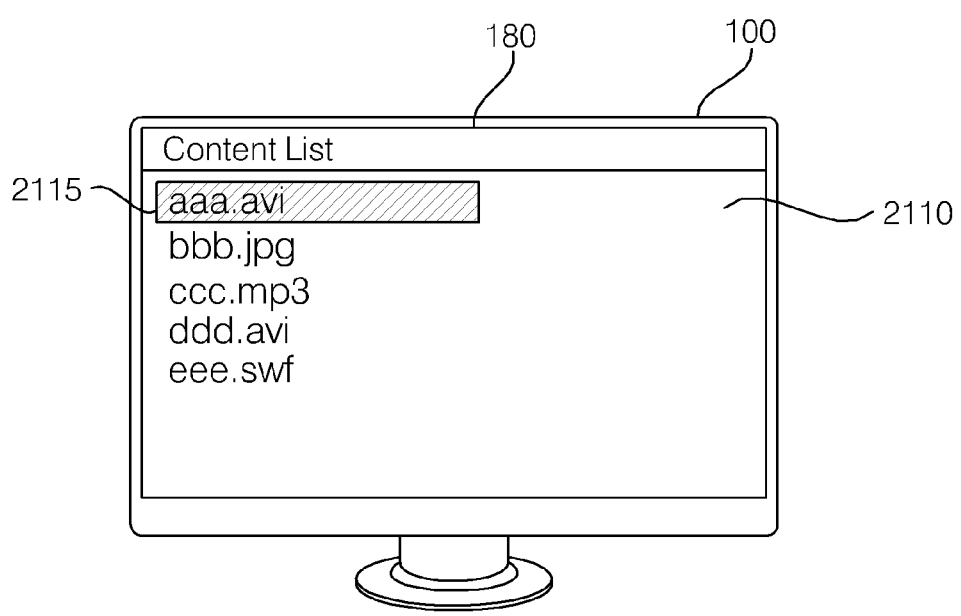
Figure 23B:
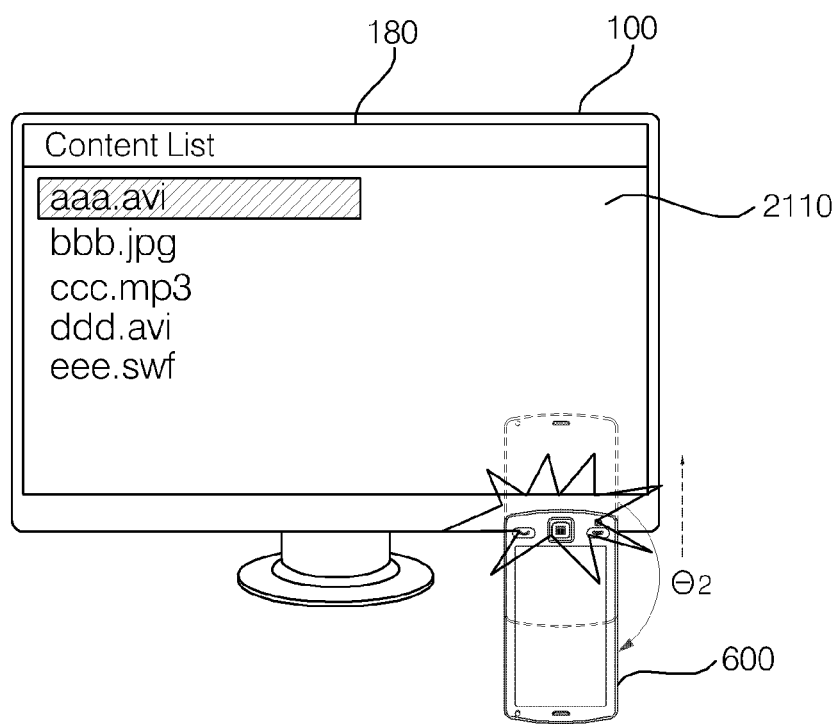
Figure 23C:
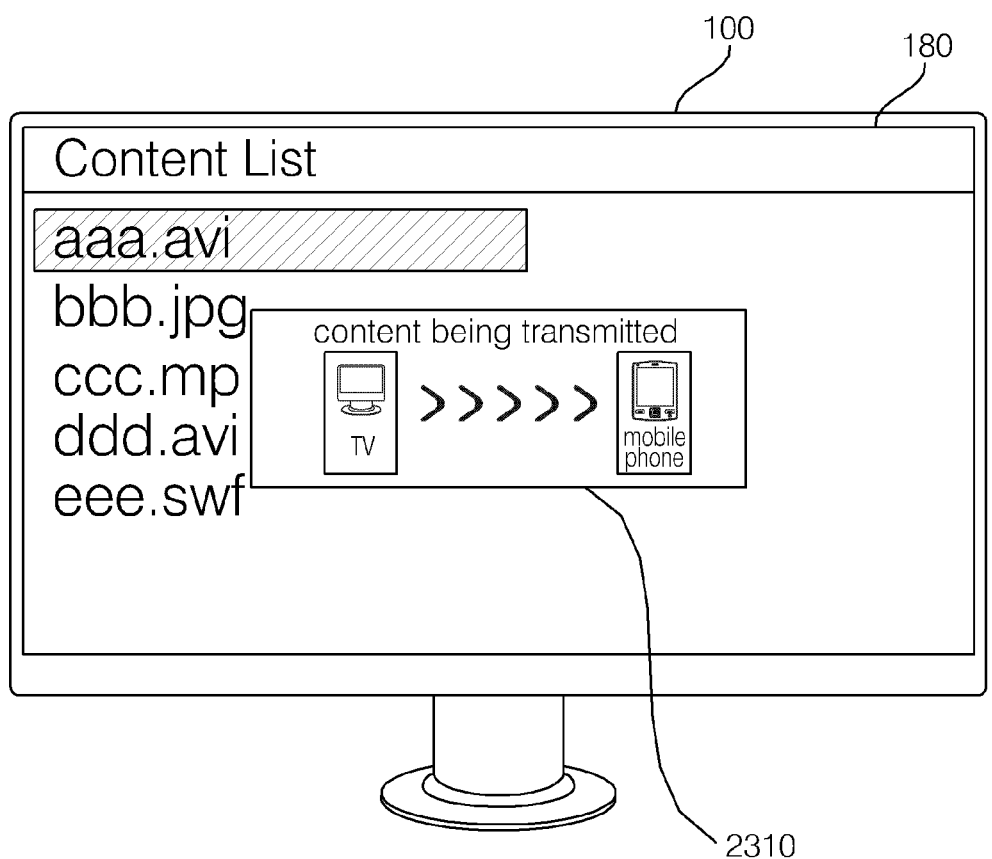

FIGS. 23A to 23C are similar to FIGS. 22A to 22C. However, the controller 170 may perform a control operation for transmitting a focused item "aaa.avi" in a content list screen 2110 as shown in FIG. 23C when the mobile terminal 600 has been rotated by a second rotation angle θ2, for example, by about 180 degrees, as shown in FIG. 23B. FIG. 23C illustrates an example in which an object 2310 indicating that the focused item is transmitted from the image display device to the mobile terminal is displayed on the display 180. Accordingly, it is possible to easily transmit a desired content item.

FIGS. 24A to 24G illustrate examples in which login of the image display device is performed according to continuous motion information or position information of the mobile terminal.

Figure 24A:
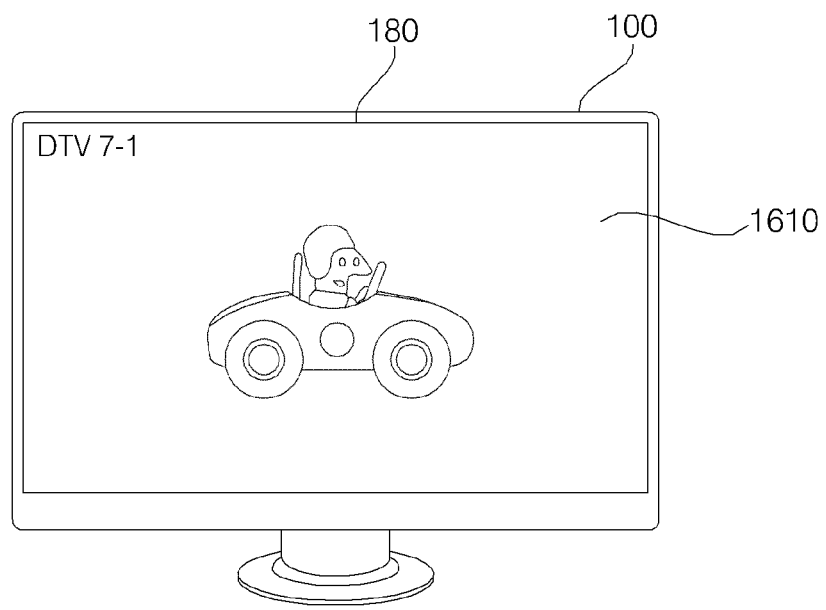

First, FIG. 24A illustrates an example in which a broadcast image 1610 is displayed on the display 180 of the image display device 100.

Figure 24B:
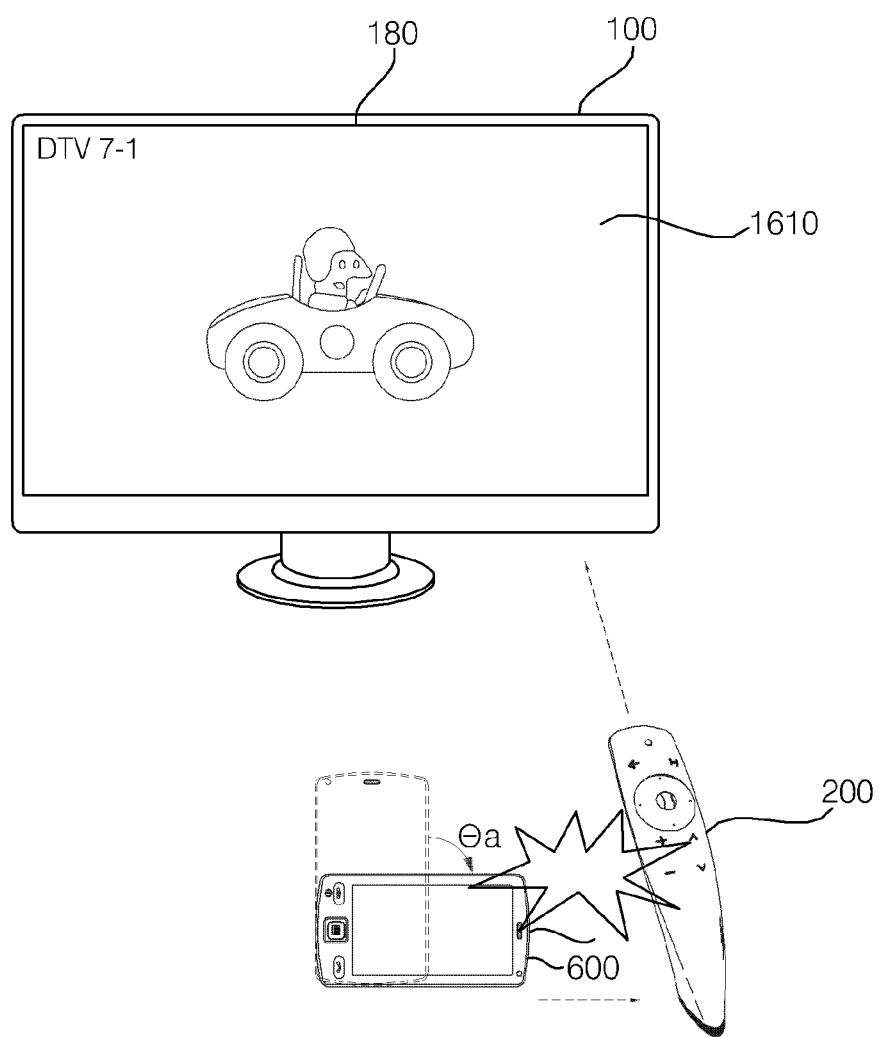

In addition, near field communication starts when the mobile terminal 600 has approached the remote control device 200 within a predetermined range with the mobile terminal 600 being rotated by a first rotation angle θa, for example, by about 90 degrees, as shown in FIG. 24B. Accordingly, the first rotation information θa or first position information is transmitted from the mobile terminal 600 to the image display device 100 via the remote control device 200.

Figure 24C:
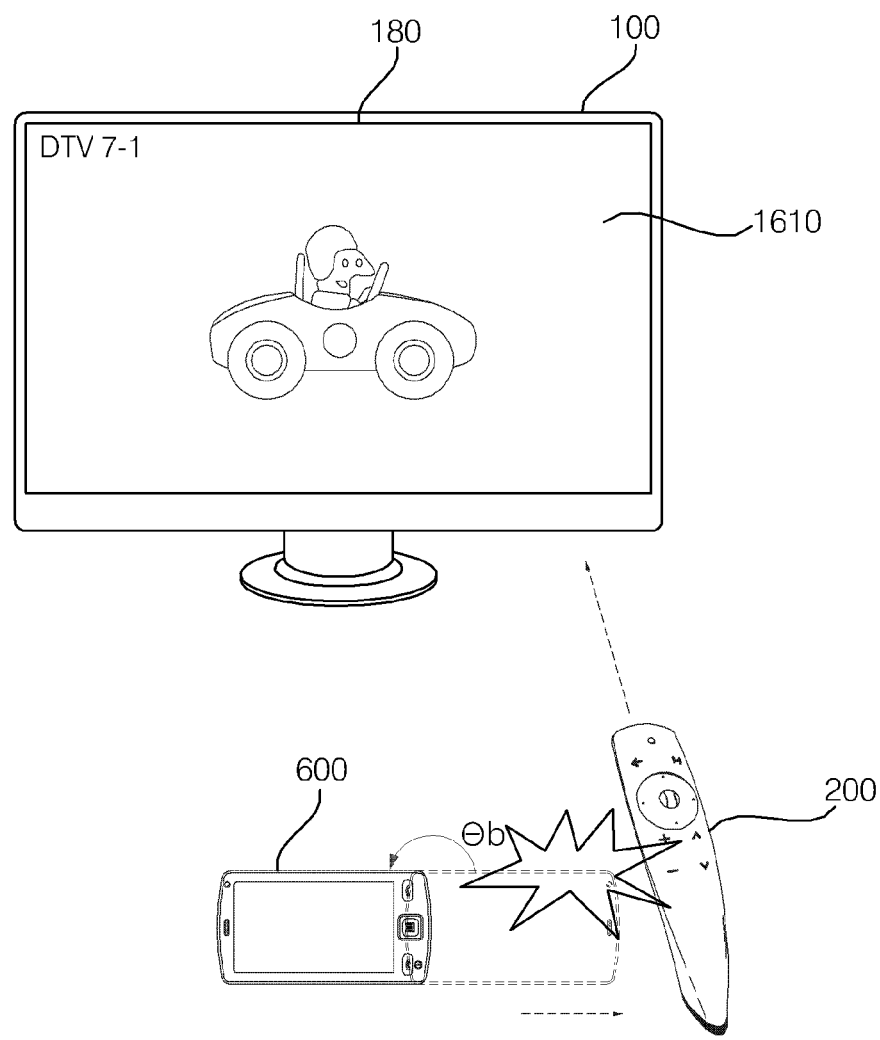

Then, when the mobile terminal 600 has approached the remote control device 200 within a predetermined range after the mobile terminal 600 is subsequently rotated by a second rotation angle θb, for example, by about −180 degrees, as shown in FIG. 24C, near field communication starts. Accordingly, the second rotation information θb or second position information is transmitted from the mobile terminal 600 to the image display device 100 via the remote control device 200.

Figure 24D:
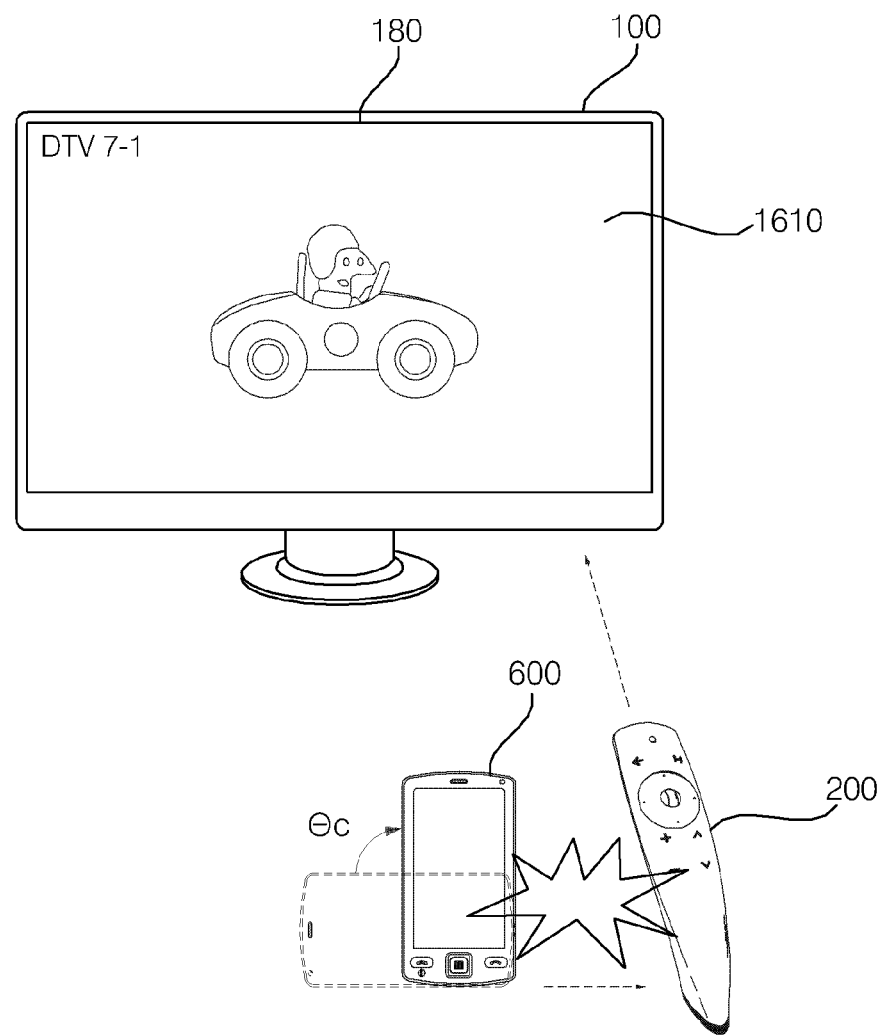

Then, when the mobile terminal 600 has approached the remote control device 200 within a predetermined range after the mobile terminal 600 subsequently is rotated by a third rotation angle θc, for example, by about +90 degrees, as shown in FIG. 24D, near field communication starts. Accordingly, the third rotation information θc or third position information is transmitted from the mobile terminal 600 to the image display device 100 via the remote control device 200.

When the first rotation angle information, the second rotation angle information, and the third rotation angle information are sequentially received from the mobile terminal within a predetermined time, the controller 170 of the image display device 100 may compare the received first to third rotation angle information with a stored angle information pattern and may then perform a control operation for performing login when the received first to third rotation angle information matches the stored angle information pattern.

Login is not automatically performed based on personal information of the user from among device information received from the mobile terminal 600 but instead login is performed according to continuous motion information or the like received from the mobile terminal 600 as shown in FIG. 24. Therefore, it is possible to prevent login from being automatically performed when the mobile terminal 600 has unintentionally approached the image display device 100 within a predetermined distance. Accordingly, it is possible to perform login with high reliability.

Figure 24E:
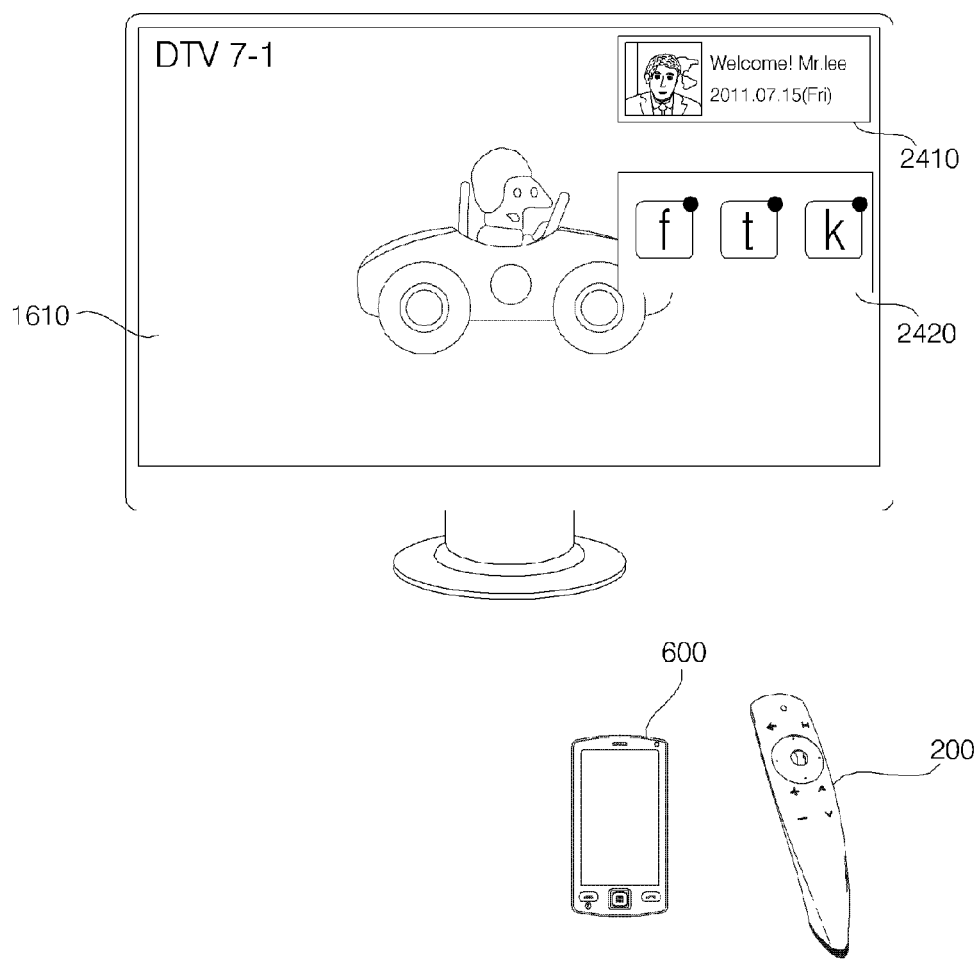

FIG. 24E illustrates an example in which the user of the mobile terminal has logged in to the image display device 100 while a broadcast image 1610 is being displayed.

In the example illustrated in FIG. 24E, an object 2410 indicating personal information of the user is displayed on the display 180.

When the mobile terminal 600 has already logged in to a web server, the image display device 100 may also perform login to the same web server. In the example illustrated in FIG. 24E, an object 2420 indicating that the image display device 100 has logged in to the same web server as that into which the mobile terminal 600 has logged is displayed on the display 180.

The image display device 100 may receive login web server information of the mobile terminal 600 together with device information of the mobile terminal when near field communication is performed. Accordingly, the controller 170 of the image display device 100 may perform a control operation for accessing the web server and logging into the web server.

Figure 24F:
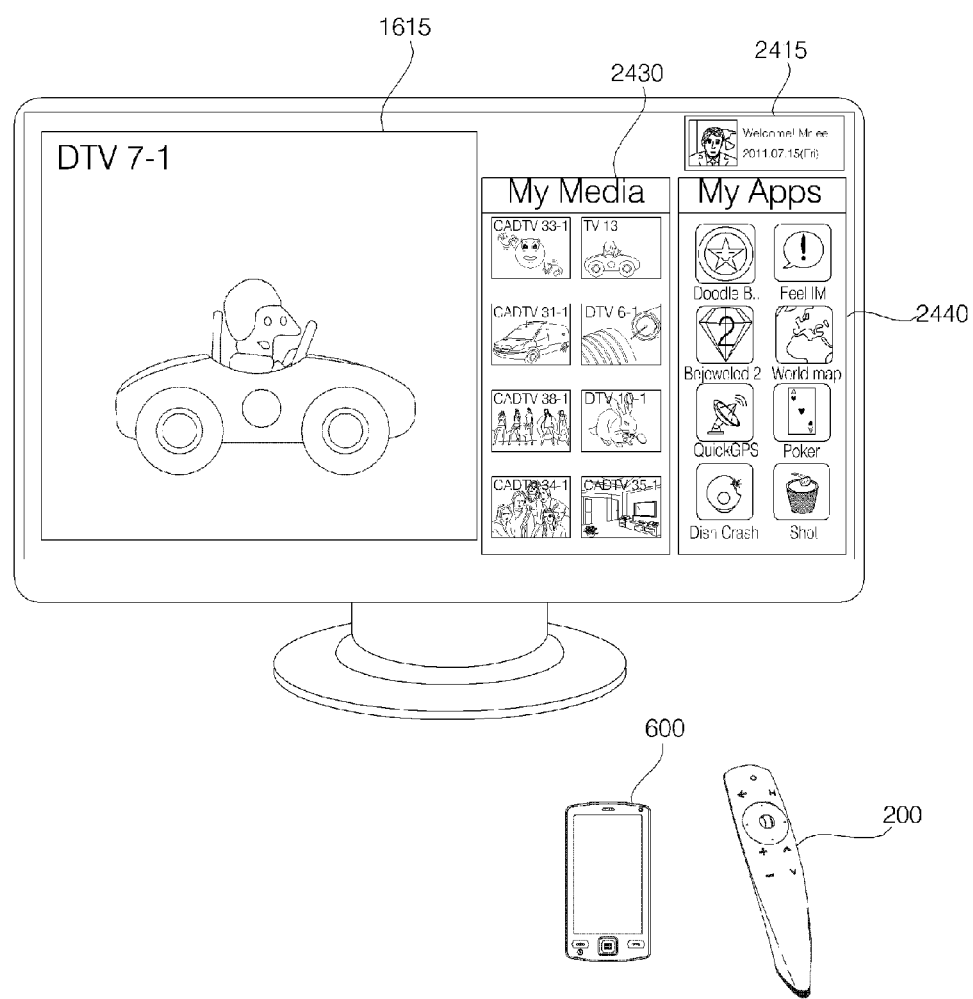

FIG. 24F illustrates another example in which the user of the mobile terminal has logged in to the image display device 100 while a broadcast image 1610 is being displayed.

In the example illustrated in FIG. 24F, an object 2415 indicating personal information of the user is displayed on the display 180. A media list 2430, an application list 2440, and the like set by the user may be additionally displayed. Various other lists such as a schedule list may also be additionally displayed.

Although a broadcast image 1615, the size of which has been reduced compared to that of FIG. 24E, is displayed in the example illustrated in FIG. 24F, the object 2415 and the lists 2430 and 2440 may be displayed overlaying a broadcast image 1615 without changing the size of the broadcast image 1615.

Figure 24G:
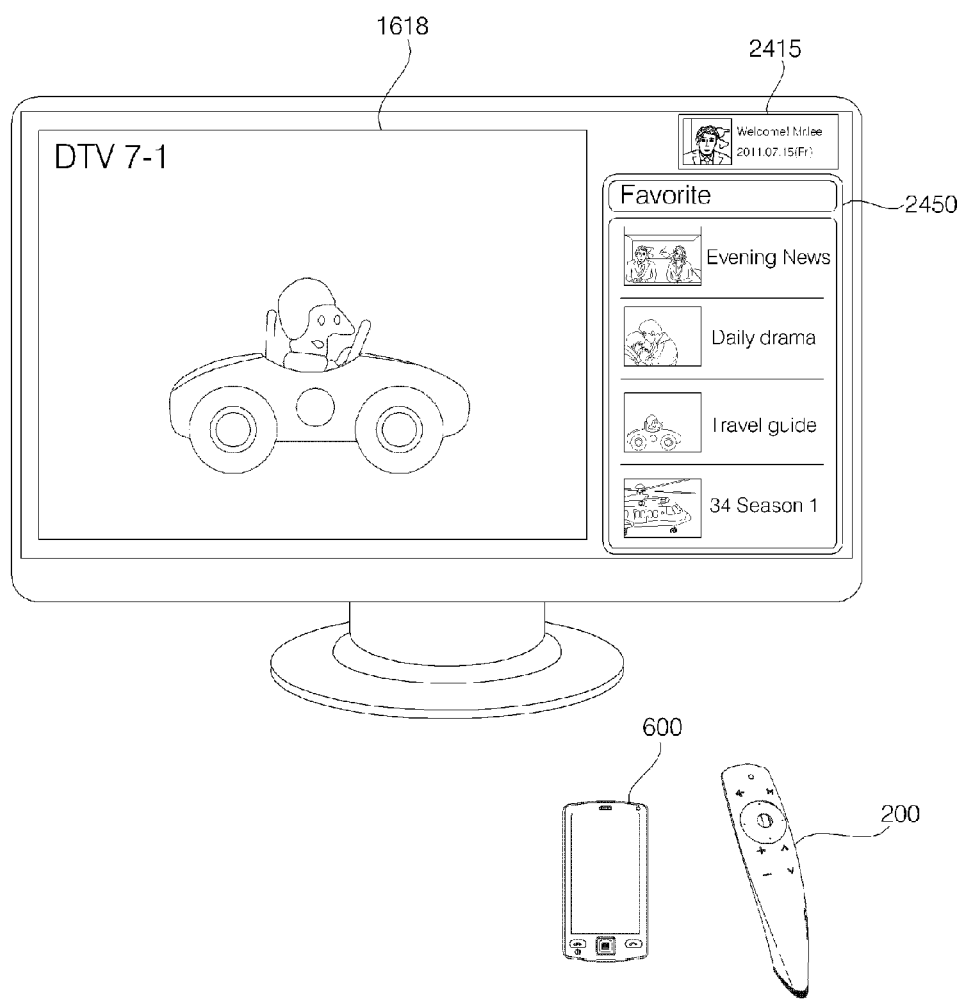

FIG. 24G illustrates another example in which the user of the mobile terminal has logged in to the image display device 100 while a broadcast image 1610 is being displayed.

In the example illustrated in FIG. 24G, an object 2415 indicating personal information of the user is displayed on the display 180. A favorite channel list 2450 set by the user may be additionally displayed.

Although a broadcast image 1615, the size of which has been reduced compared to that of FIG. 24E, is displayed in the example illustrated in FIG. 24G, the object 2415 and the lists 2430 and 2440 may be displayed overlaying a broadcast image 1615 without changing the size of the broadcast image 1615.

The object may be generated by the OSD generator 340 in the controller 170 of the image display device 100.

Although FIGS. 24A to 24G illustrate examples in which near field communication starts between the mobile terminal 600 and the remote control device 200 such that device information of the mobile terminal 600 is transmitted to the image display device 100 via the remote control device 200, near field communication may also start between the mobile terminal 600 and the image display device 100 such that device information of the mobile terminal 600 is directly transmitted to the image display device 100, thereby performing login.

The image display device 100 may also display a different menu or perform a different operation depending on whether the electronic device with which the image display device 100 performs near field communication is the mobile terminal 600 or the remote control device 200.

Figure 25A:
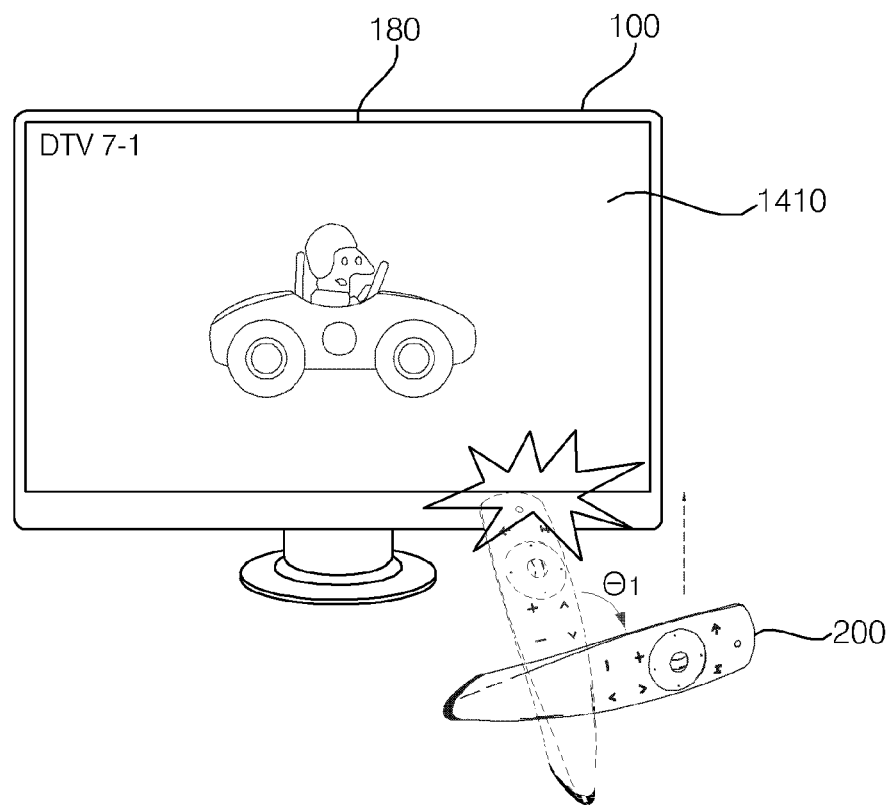

FIG. 25A illustrates an example in which device information of the remote control device 200 is transmitted to the image display device 100 while near field communication is performed between the image display device 100 and the remote control device 200. Specifically, FIG. 25A illustrates an example in which first rotation information θ1 or first position information from among the device information is transmitted from the remote control device 200 to the image display device 100.

Since the remote control device 200 is a common electronic device which can be used by a number of users, the remote control device 200 may display a common menu(s) or perform a common operation(s).

Figure 25B:
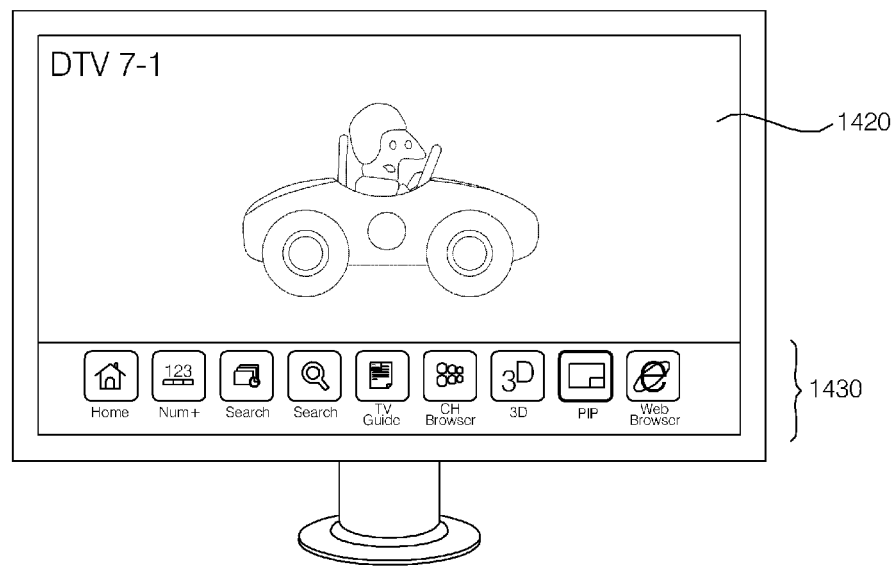

Upon receiving the first rotation information θ1 or the first position information, the controller 170 of the image display device 100 may perform a control operation for displaying a first menu 1430 on the display 180 according to the received first rotation information θ1 or first position information as shown in FIG. 25B. The first menu 1430 may be generated by the controller 170, specifically, by the OSD generator 340.

The first menu 1430 may be displayed overlapping a broadcast image 1420. Here, the broadcast image 1420 may be displayed in a reduced size due to the first menu 1430.

Figure 25C:
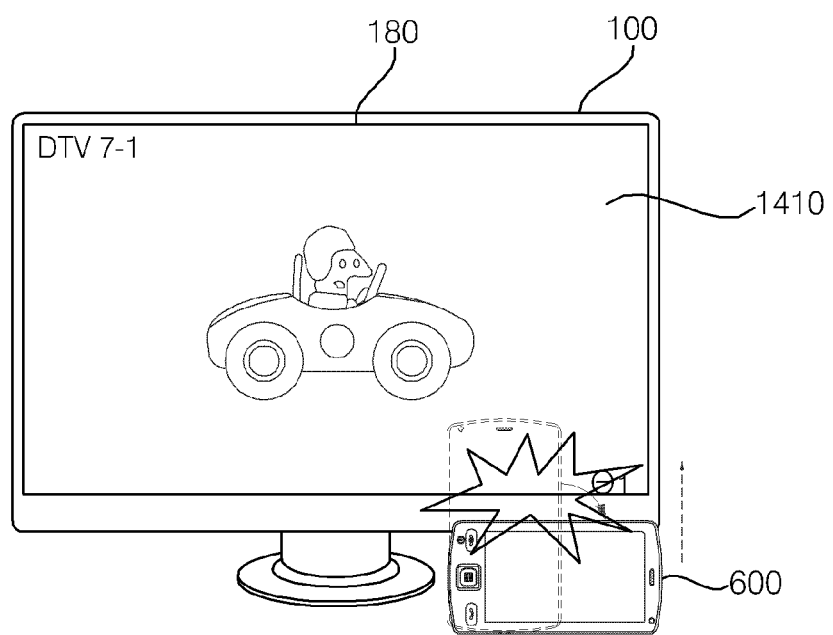

Next, FIG. 25C illustrates an example in which device information of the mobile terminal 600 is transmitted to the image display device 100 while near field communication is performed between the image display device 100 and the mobile terminal 600. Specifically, FIG. 25A illustrates an example in which first rotation information θ1 or first position information from among the device information is transmitted from the mobile terminal 600 to the image display device 100.

Since the mobile terminal 600 is an individual electronic device which can be used by a specific user, the mobile terminal 600 may display a menu(s) for the user or perform an operation(s) for the user.

Figure 25D:
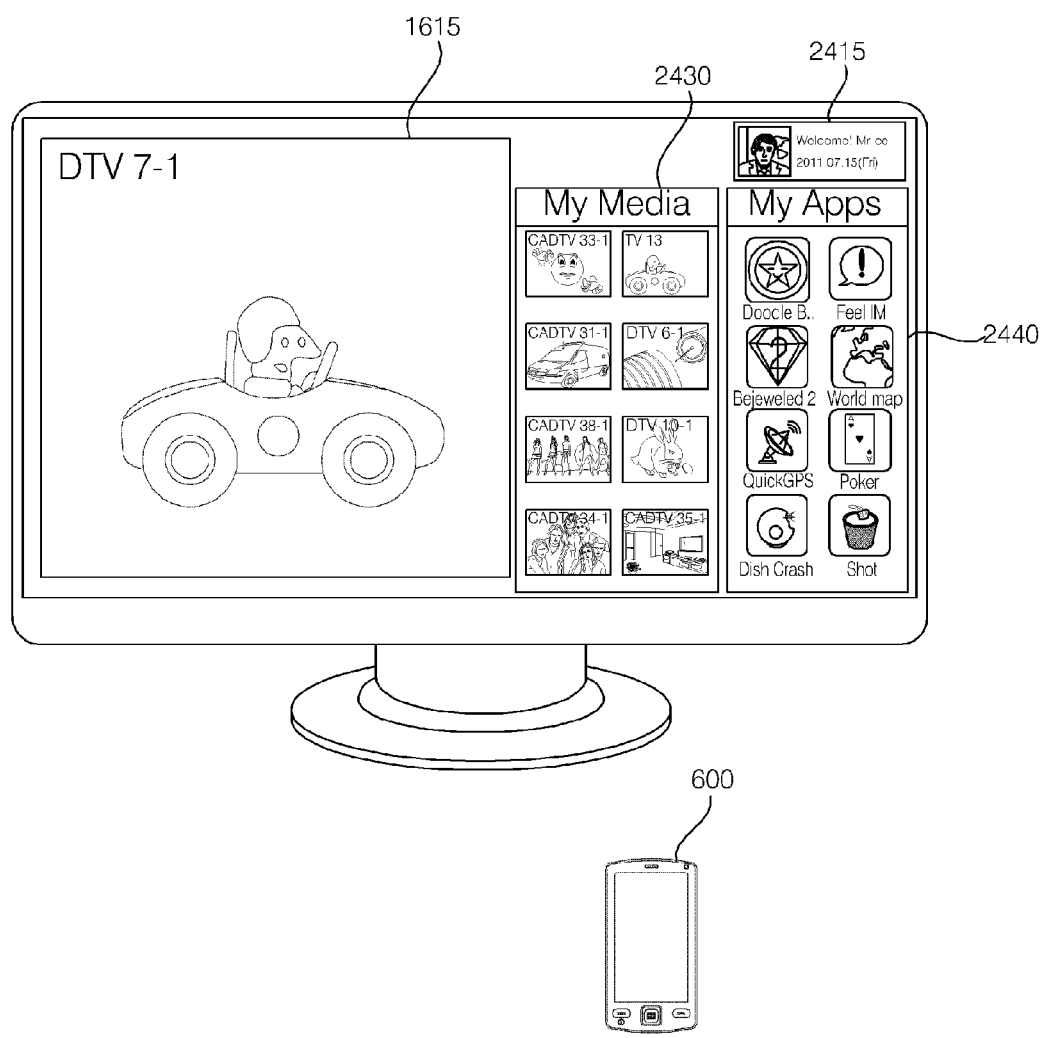

Upon receiving the first rotation information θ1 or the first position information, the controller 170 of the image display device 100 may perform a control operation for displaying an object 2415 indicating personal information of the user, a media list 2430 and an application list 2440 set by the user, and the like on the display 180 according to the received first rotation information θ1 or first position information as shown in FIG. 25D.

According to the embodiments of FIGS. 25A to 25D, the controller 170 of the image display device 100 may determine whether the received device information is device information of the remote control device 200 or device information of the mobile terminal 600 and may perform a control operation for displaying a different menu or performing a different operation depending on the determination even when the same rotation information has been received.

Although FIGS. 25A to 25D illustrate examples in which the first rotation information θ1 or the first position information is transmitted to the image display device 100, a different menu may be displayed or a different operation may also be performed based on the second rotation information θ2 or the second position information in the case in which the second rotation information θ2 or the second position information is transmitted to the image display device 100.

FIGS. 26A to 26D illustrate examples in which different operations are performed when the remote control device 200 first performs near field communication with the image display device 100 and the mobile terminal 600 then performs near field communication with the image display device 100.

Figure 26A:
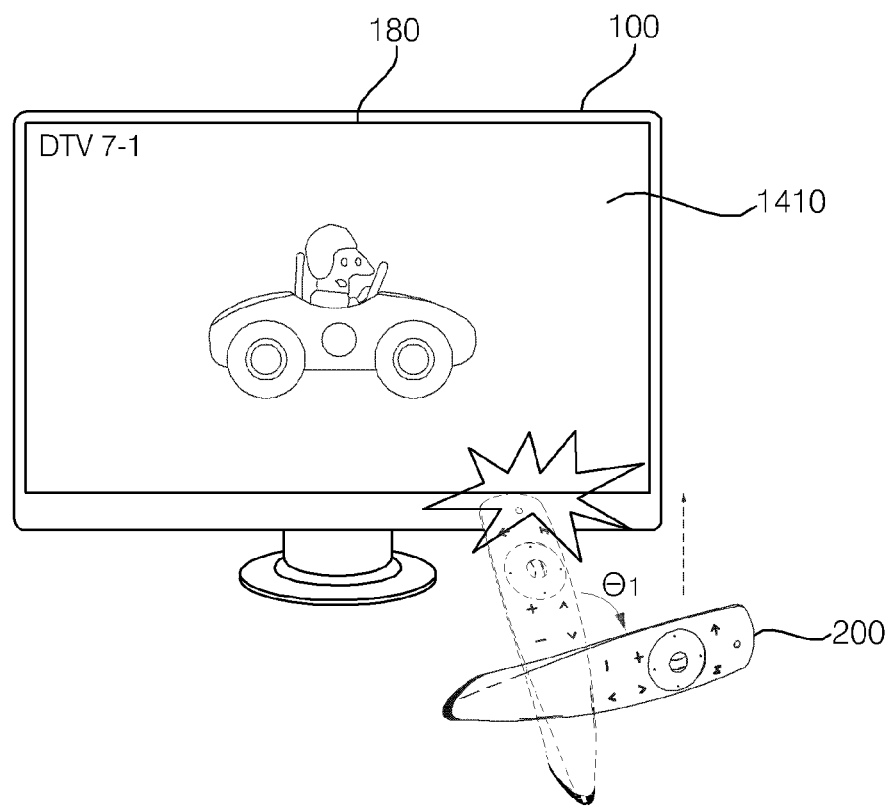

As shown in FIG. 26A, when near field communication is performed between the image display device 100 and the remote control device 200 while a broadcast image 1410 is being displayed, first rotation information θ1 or first position information from among the device information of the remote control device 200 may be transmitted to the image display device 100.

Figure 26B:
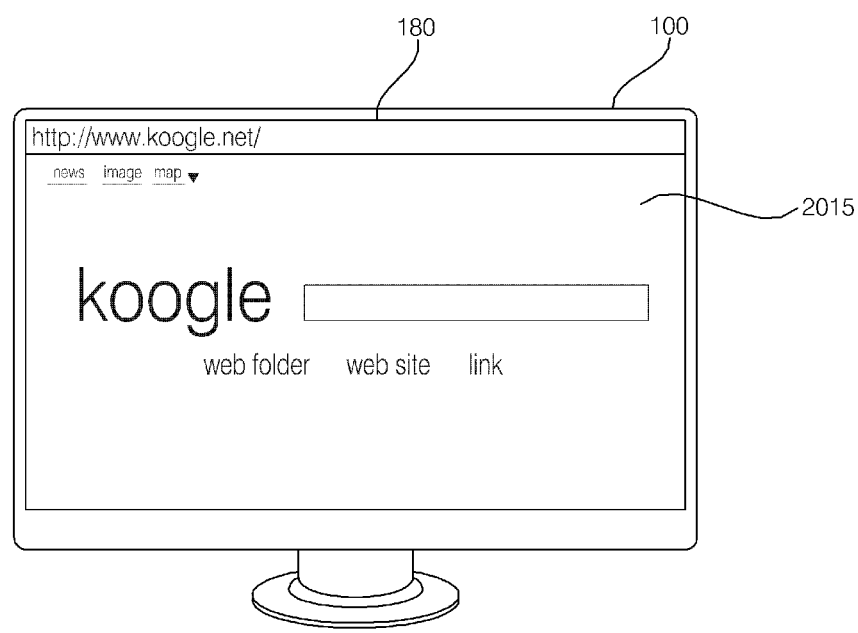

Upon receiving the first rotation information θ1 or the first position information, the controller 170 of the image display device 100 may perform a control operation for displaying a web screen 2015 according to the received first rotation information θ1 or first position information as shown in FIG. 26B.

Figure 26C:
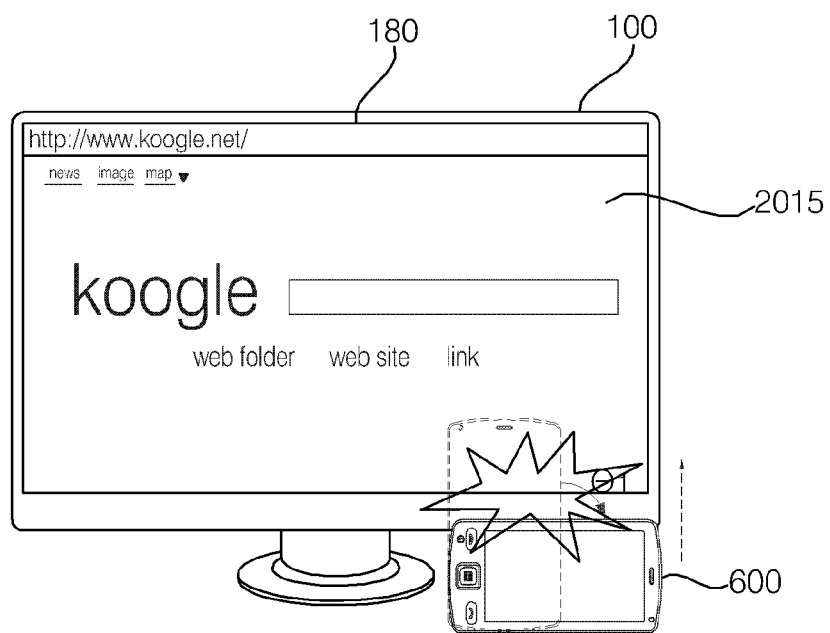

Thereafter, as shown in FIG. 26C, when near field communication is performed between the image display device 100 and the mobile terminal 600 while a web screen 2015 is being displayed, first rotation information θ1 or first position information from among the device information of the mobile terminal 600 may be transmitted to the image display device 100.

Figure 26D:
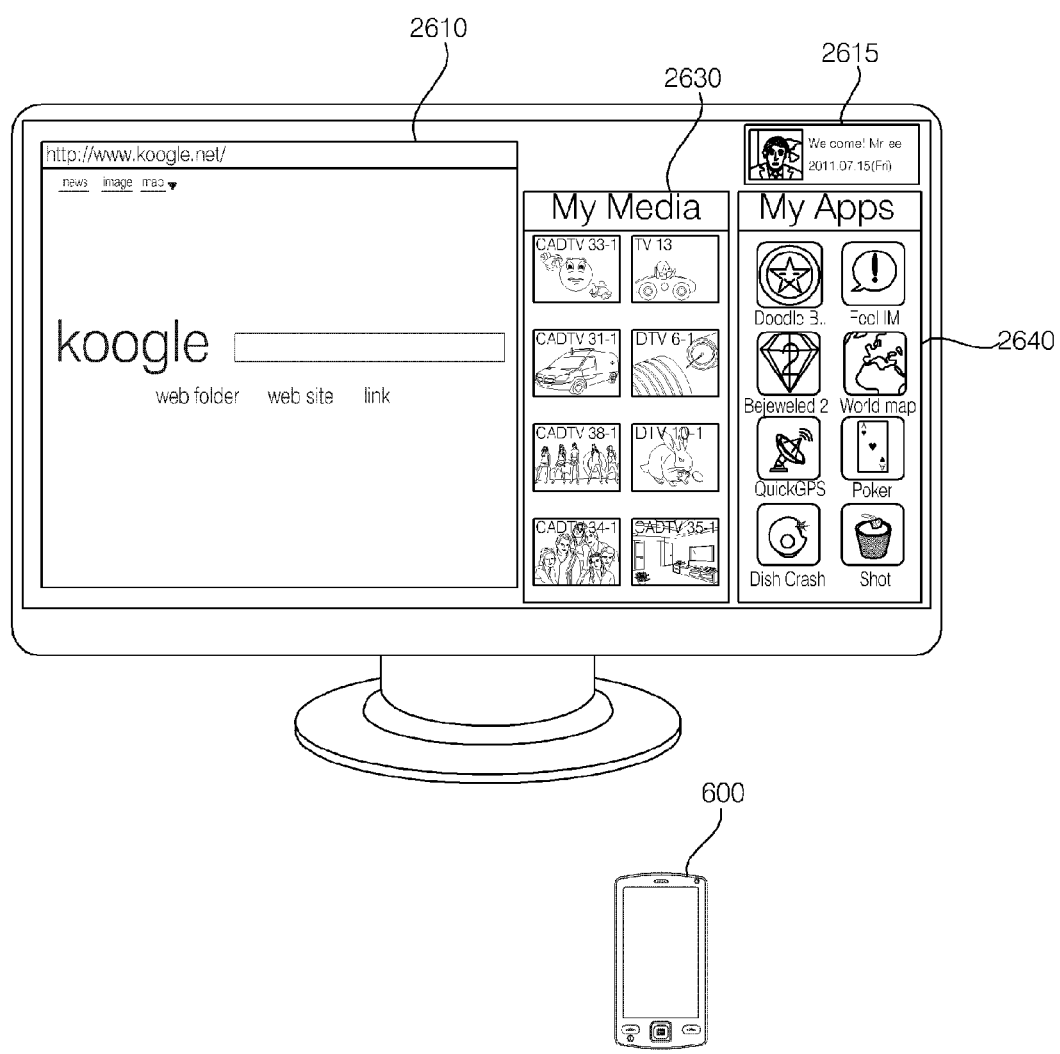

Upon receiving the first rotation information θ1 or the first position information, the controller 170 of the image display device 100 may perform a control operation for displaying an object 2615 indicating personal information of the user, a media list 2630 and an application list 2640 set by the user, and the like, in addition to the web screen 2610, on the display 180 according to the received first rotation information θ1 or first position information as shown in FIG. 26D.

The mobile terminal 600 may also store personal information of a plurality of users. According to an embodiment of the present invention, when near field communication is performed between the mobile terminal 600 and the image display device 100, information of each user may be identified according to rotation information or position information of the mobile terminal 600 and the identified information of each user may then be transmitted to the image display device 100.

FIGS. 27A to 27D illustrate examples in which, when near field communication is performed between the mobile terminal 600 and the image display device 100, information of each user is identified according to rotation information or position information of the mobile terminal and an operation corresponding to the identified information of each user is performed.

Figure 27A:
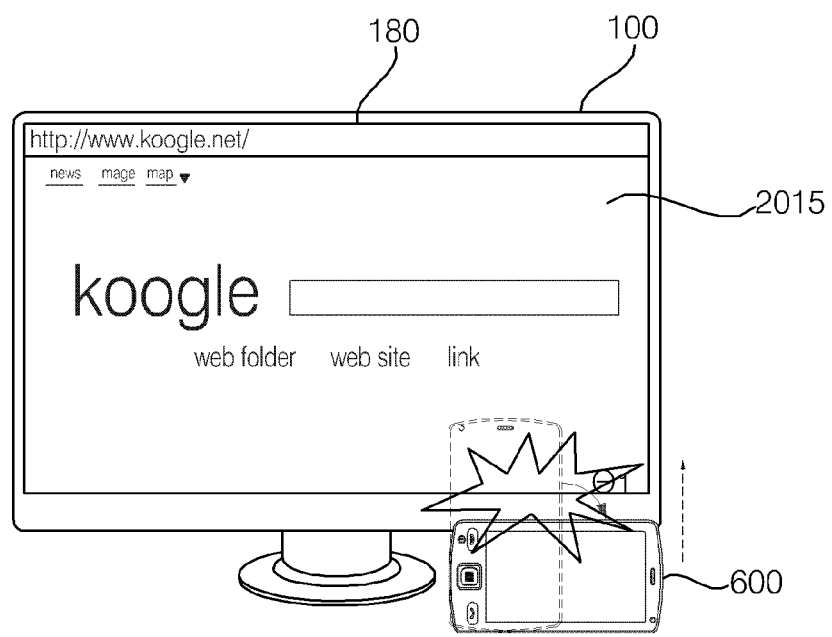

First, FIG. 27A illustrates an example in which, when near field communication is performed between the image display device 100 and the mobile terminal 600 while a web screen 2015 is being displayed, first rotation information θ1 or first position information from among the device information of the mobile terminal 600 is transmitted to the image display device 100.

Accordingly, information of a first user from among information of a plurality of users stored in the mobile terminal 600 may be transmitted to the image display device 100. Alternatively, an operation corresponding to the information of the first user from among the information of the plurality of users stored in the image display device 100 may be performed.

Figure 27B:
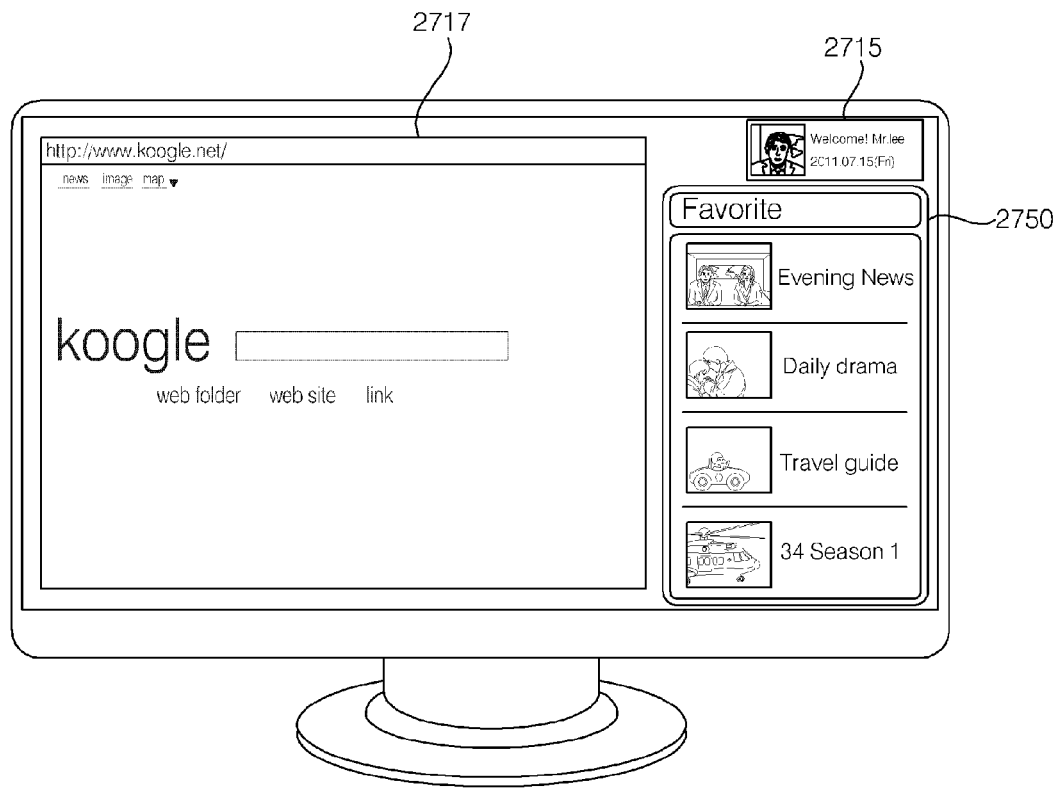

Accordingly, an object 2715 indicating the information of the first user and a favorite channel list 2750 of the first user in addition to a web screen 2717 may be displayed according to the first rotation information θ1 as shown in FIG. 27B.

Figure 27C:
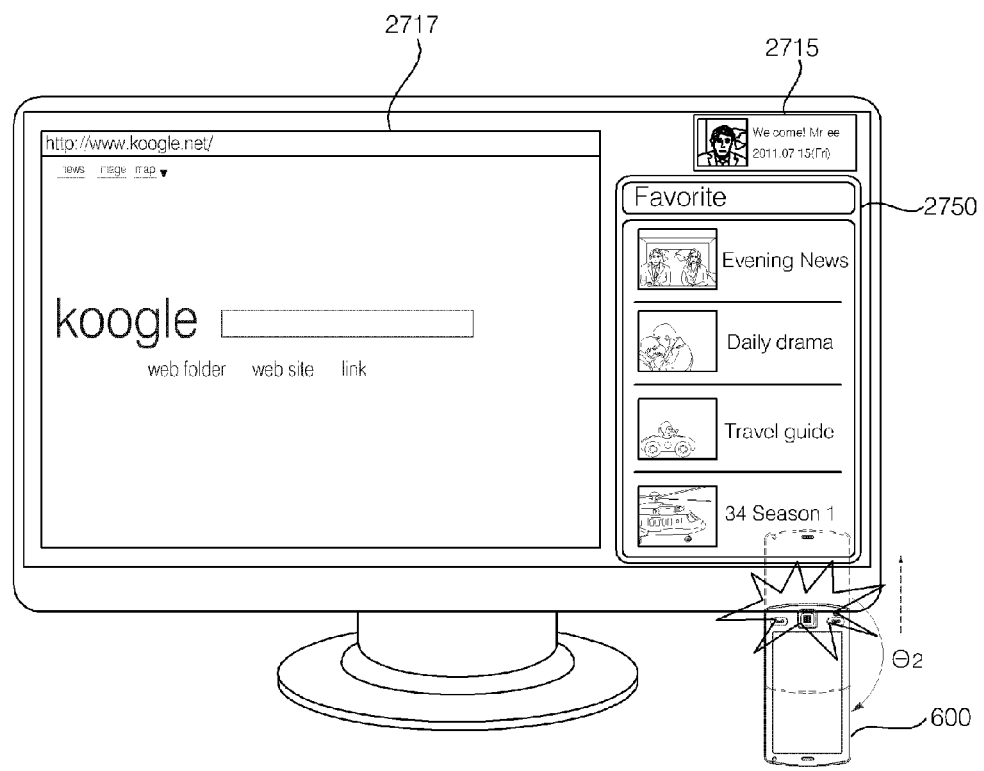

Next, FIG. 27C illustrates an example in which, when near field communication is performed between the image display device 100 and the mobile terminal 600 while an object 2715 indicating information of a first user is being displayed, second rotation information θ2 or second position information from among the device information of the mobile terminal 600 is transmitted to the image display device 100.

Accordingly, information of a second user from among information of a plurality of users stored in the mobile terminal 600 may be transmitted to the image display device 100. Alternatively, an operation corresponding to the information of the second user from among the information of the plurality of users stored in the image display device 100 may be performed.

Figure 27D:
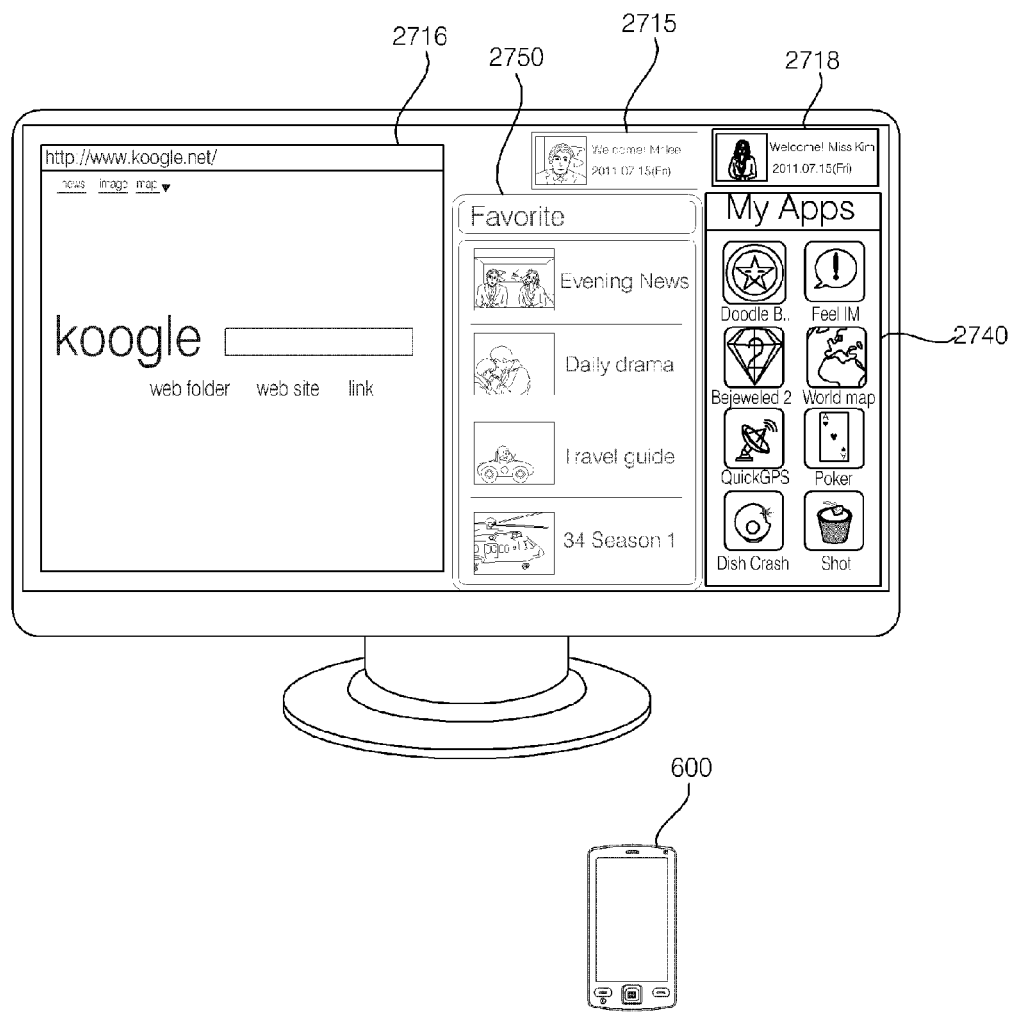

Accordingly, an object 2718 indicating the information of the second user and an application list 2740 of the second user in addition to a web screen 2716 may be displayed according to the second rotation information θ2 as shown in FIG. 27D.

Here, since the object 2718 indicating the information of the second user and the application list 2740 of the second user are activated, the object 2715 indicating the information of the first user and the favorite channel list 2750 of the first user may be deactivated. That is, the object 2715 indicating the information of the first user and the favorite channel list 2750 of the first user may be opaquely displayed to indicate that the second user cannot access corresponding regions.

FIGS. 27A to 27D illustrate examples in which a menu corresponding to a different user is displayed or an operation corresponding to a different user is performed when different rotation information or different position information is transmitted to the image display device 100 in the case in which near field communication is performed with the image display device 100 through a single mobile terminal 600a. However, when near field communication is performed with the image display device 100 through a different mobile terminal, a menu corresponding to the different user may also be displayed or an operation corresponding to the different user may also be performed.

FIGS. 28A to 28D illustrate an example in which near field communication is performed between a first mobile terminal 600a and the image display device 100 and an example in which near field communication is performed between a second mobile terminal 600b and the image display device 100.

Figure 28A:
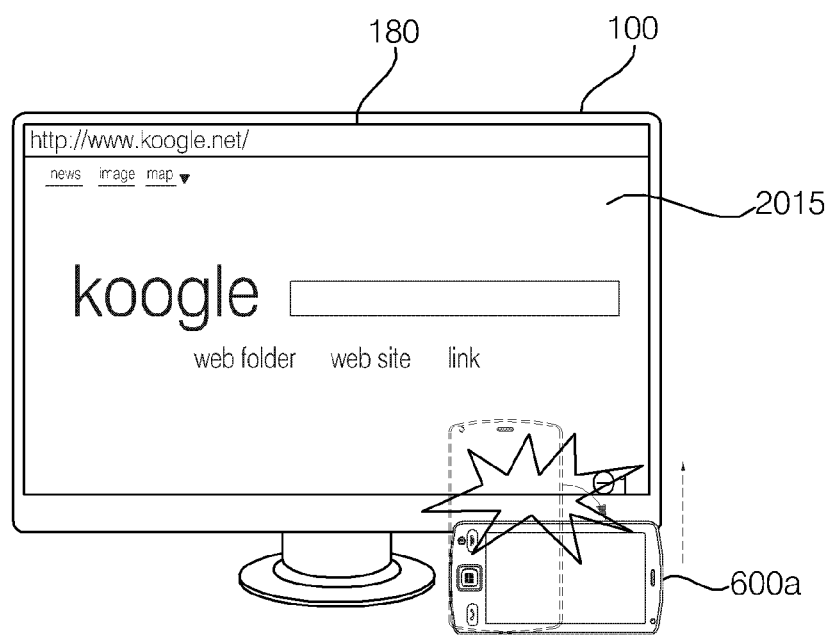
Figure 28B:
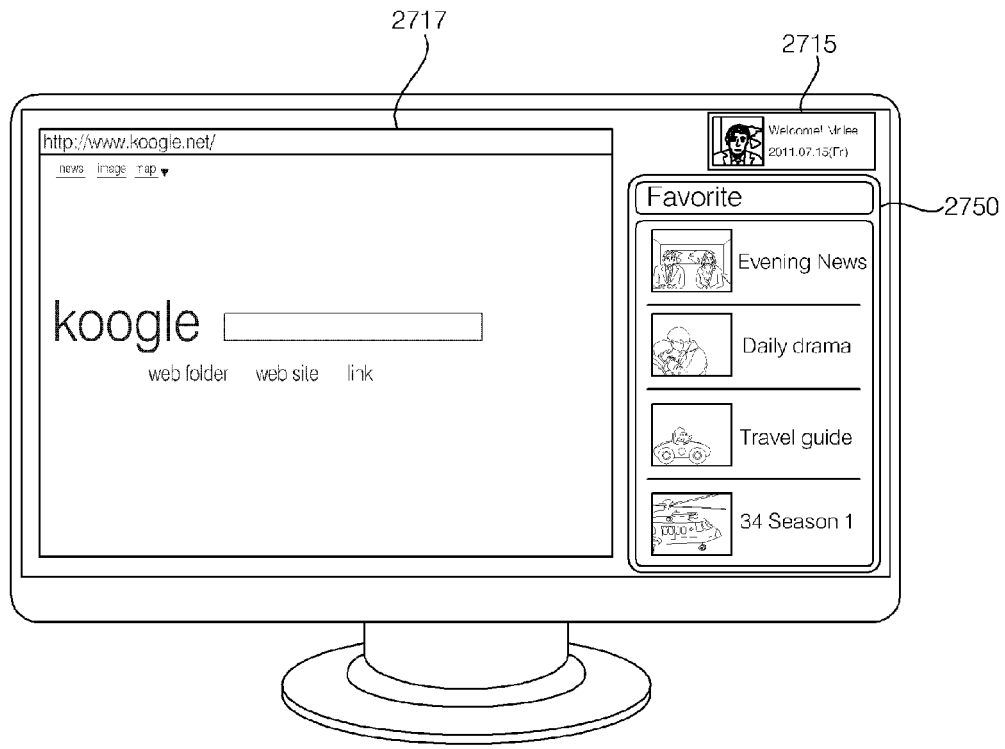

As shown in FIG. 28A, when near field communication is performed between the image display device 100 and the first mobile terminal 600a while a web screen 2015 is being displayed, first rotation information θ1 or first position information from among device information of the first mobile terminal 600a may be transmitted to the image display device 100. Accordingly, an object 2715 indicating information of a first user and a favorite channel list 2750 of the first user, in addition to a web screen 2717, may be displayed according to the first rotation information θ1 from the first mobile terminal 600a as shown in FIG. 28B.

Figure 28C:
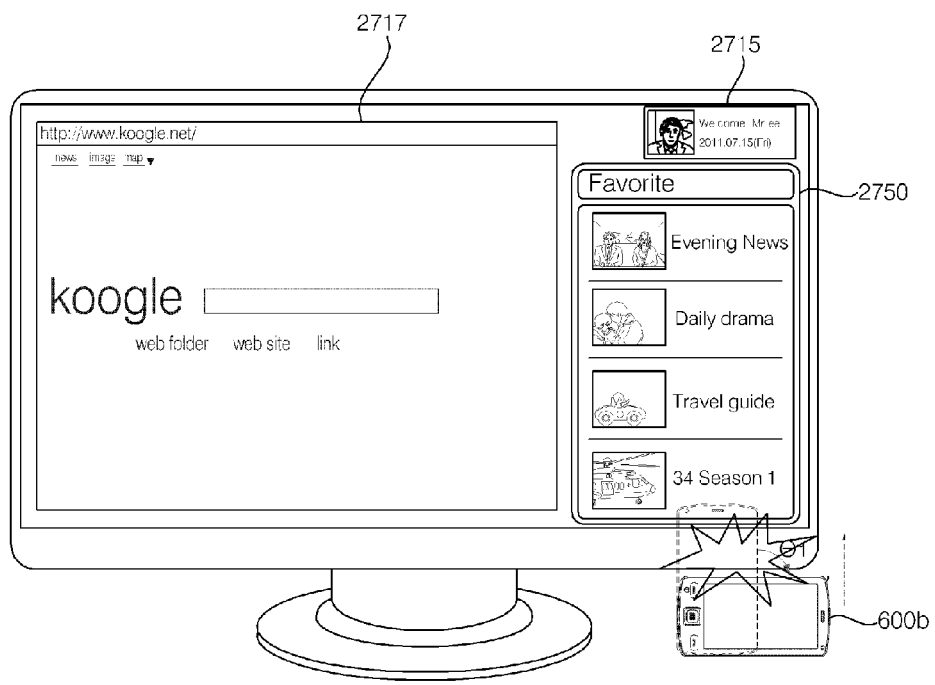
Figure 28D:
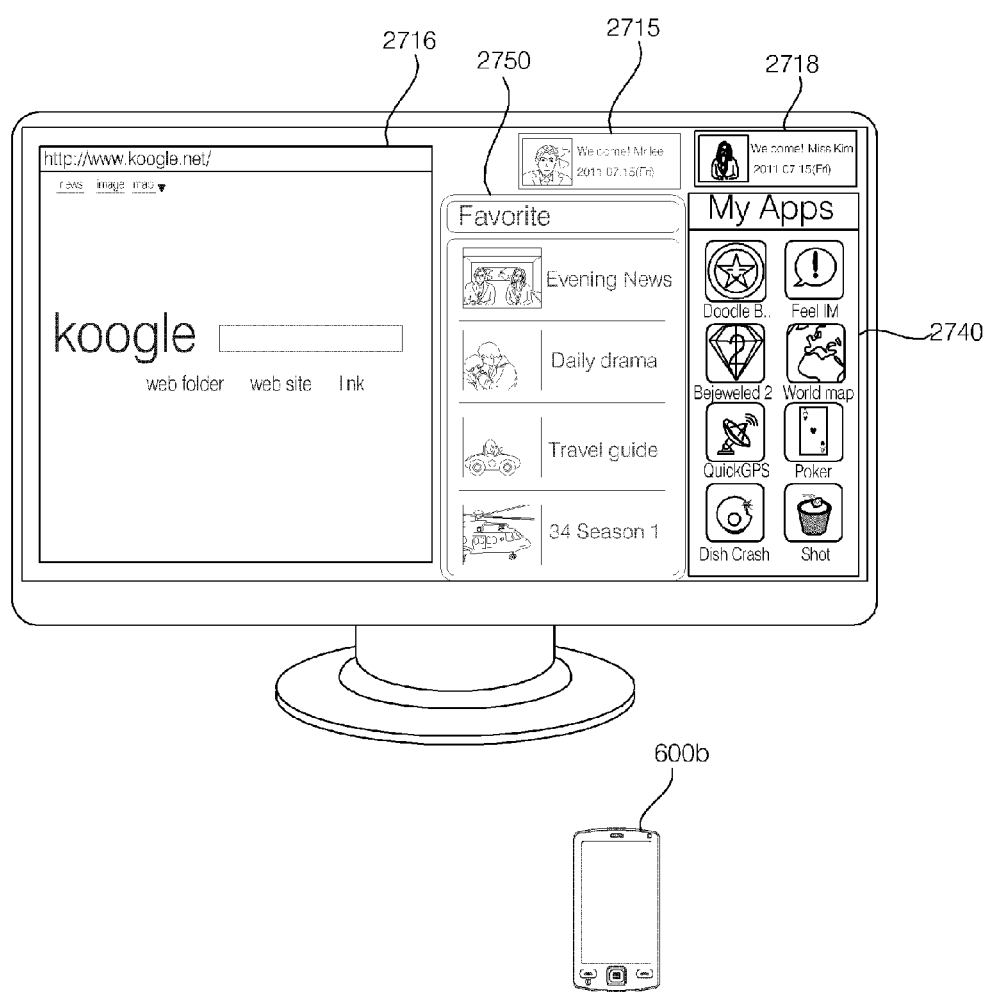

As shown in FIG. 28C, when near field communication is performed between the image display device 100 and the second mobile terminal 600b while an object 2715 indicating information of a first user, first rotation information θ1 or first position information from among device information of the second mobile terminal 600b may be transmitted to the image display device 100. Accordingly, an object 2718 indicating information of a second user and an application list 2740 of the second user, in addition to a web screen 2716, may be displayed according to the first rotation information θ1 from the second mobile terminal 600b as shown in FIG. 28D.

Although FIGS. 14A to 28D illustrate examples in which the mobile terminal rotates in a direction perpendicular to the ground (or floor) while being kept parallel to the image display device, the mobile terminal may also rotate in a direction parallel to the ground (or floor) while being kept perpendicular to the image display device. In addition, when the mobile terminal rotates in any direction in the 3D space, it is also possible to display a corresponding menu or perform a corresponding operation according to corresponding rotation information.

Although FIGS. 14A to 28D illustrate examples in which, as near field communication starts, device information including motion information or position information is transmitted to the image display device through near field communication, pairing may be automatically performed between the mobile terminal 600 and the image display device 100 through near field communication and the image display device 100 may receive motion information or position information through a communication scheme different from the NFC scheme such as a Wi-Fi scheme, a Bluetooth scheme, an RF communication scheme, an IR communication scheme, a DLNA scheme, or a ZigBee scheme.

As is apparent from the above description, the present invention has a variety of advantages. For example, it is possible to improve user convenience by starting data communication through near field communication with a mobile terminal and then displaying a different menu or performing a different operation according to motion information or position information from the mobile terminal.

Especially, it is possible to provide a menu or the like suitable for user convenience by displaying a different menu or performing a different operation according to an attribute of a displayed screen and taking into consideration motion information or position information from the mobile terminal In addition, since it is possible to perform a login operation of an image display device according to continuous motion information or position information from a mobile terminal, it is possible to reliably perform login.

The image display device and the method for operating the same according to the present invention are not limited in application to the configurations and methods of the embodiments described above and all or some of the embodiments may be selectively combined to implement various modifications.

The method for operating the image display device according to the present invention can be embodied as processor readable code stored in a processor readable medium provided in the image display device. The processor readable medium includes any type of storage device that stores data which can be read by a processor. Examples of the processor readable medium include Read Only Memory (ROM), Random Access Memory (RAM), CD-ROMs, magnetic tapes, floppy disks, optical data storage devices, and so on. The processor readable medium can also be embodied in the form of carrier waves such as signals transmitted over the Internet. The processor readable medium can also be distributed over a network of coupled processor systems so that the processor readable code is stored and executed in a distributed fashion.

Although the present invention has been illustrated and described above with reference to the specific embodiments, the present invention is not limited to the specific embodiments and it will be apparent to those skilled in the art that various modifications can be made to the embodiments without departing from the scope of the present invention as disclosed in the accompanying claims and such modifications should not be construed as departing from the spirit or scope of the present invention.

What is claimed is:

1. A method for operating an image display device which can perform near field communication with a mobile terminal, the method comprising:
displaying an image on a display;
receiving device information including motion information or position information of the mobile terminal based on the near field communication; and
displaying a corresponding menu on the display or performing a corresponding operation according to the received motion information or position information,
wherein the device information is received from the mobile terminal via a remote control device of the image display device when the mobile terminal is positioned around the remote control device of the image display device within a predetermined distance.

2. The method according to claim 1, wherein the menu or operation varies according to the received motion information or position information.

3. The method according to claim 1, wherein the menu or operation varies according to an attribute of a screen displayed on the display.

4. The method according to claim 1, wherein the device information further includes personal information of a user of the mobile terminal, and
the menu or operation varies according to the user of the mobile terminal.

5. The method according to claim 1, wherein receiving the device information includes receiving the device information from the mobile terminal when the mobile terminal has approached the image display device within the predetermined distance.

6. The method according to claim 1, wherein, according to the received motion information or position information, a home screen is displayed or volume control is performed, or channel adjustment is performed or broadcast program information is displayed when the displayed image is a broadcast image.

7. The method according to claim 1, wherein the corresponding operation is a login according to the received motion information or position information.

8. The method according to claim 7, wherein the login is performed when specific continuous motion information or position information has been received.

9. The method according to claim 7, further comprising displaying a setting screen of a user who has performed the login on the display after performing the login.

10. The method according to claim 7, wherein the login is to login to the image display device, login to a server connected to the image display device, or login to a web server subscribed to by personal information of the user.

11. An image display device comprising:
a display;
an interface unit for receiving device information including motion information or position information of a mobile terminal from the mobile terminal or a remote control device; and
a controller for performing a control operation for displaying a corresponding menu on the display or performing a corresponding operation according to the received motion information or position information, wherein the device information is received from the mobile terminal via a remote control device of the image display device when the mobile terminal is positioned around the remote control device of the image display device within a predetermined distance.

12. The image display device according to claim 11, wherein the interface unit includes a near field communication module for performing data communication with the mobile terminal through near field communication.

13. The image display device according to claim 11, wherein the controller performs a control operation for varying the menu or operation according to the received motion information or position information.

14. The image display device according to claim 11, wherein the controller performs a control operation for varying the menu or operation according to an attribute of a screen displayed on the display.

15. The image display device according to claim 11, wherein the interface unit further receives personal information of a user of the mobile terminal, and the controller performs a control operation for varying the menu or operation according to the user of the mobile terminal.

16. The image display device according to claim 11, wherein the controller performs a control operation for performing login according to the received motion information or position information.

17. The image display device according to claim 11, wherein the controller performs a control operation for displaying a setting screen of a user who has performed the login on the display after performing the login.

18. An image display device which can perform near field communication with a mobile terminal, the image display device comprising:

a display;

an interface unit for receiving device information including motion information or position information of the mobile terminal based on the near field communication; and a controller for performing a control operation for displaying a corresponding menu on the display or performing a corresponding operation according to the received motion information or position information, wherein the device information further includes personal information of a user of the mobile terminal, and the menu varies according to the user of the mobile terminal.

19. The image display device according to claim 18, wherein the interface unit receives the device information from the mobile terminal via a remote control device of the image display device when the mobile terminal is positioned around the remote control device of the image display device within a predetermined distance.

\* \* \* \* \*